(12) United States Patent
Kornfield et al.

(10) Patent No.: US 9,127,096 B2
(45) Date of Patent: Sep. 8, 2015

(54) METHODS AND SYSTEMS FOR SYNTHESIS OF AN ULTRA HIGH MOLECULAR WEIGHT POLYMER

(75) Inventors: Julia A. Kornfield, Pasadena, CA (US); Artemis Ailianou, Pasadena, CA (US); Sara Ronca, Loughborough (GB); Sanjay Rastogi, Eindhoven (NL); Giuseppe Forte, Loughborough (GB)

(73) Assignees: CALIFORNIA INSTITUTE OF TECHNOLOGY, Pasadena, CA (US); LOUGHBOROUGH UNIVERSITY (GB)

( * ) Notice: Subject to any disclaimer, the term of this patent is extended or adjusted under 35 U.S.C. 154(b) by 0 days.

(21) Appl. No.: 13/276,304

(22) Filed: Oct. 18, 2011

(65) Prior Publication Data

US 2012/0095168 A1 Apr. 19, 2012

Related U.S. Application Data

(60) Provisional application No. 61/394,187, filed on Oct. 18, 2010.

(51) Int. Cl.
*C08F 2/08* (2006.01)
*C08F 10/02* (2006.01)
*C08G 69/02* (2006.01)
*C08F 110/02* (2006.01)
*C08F 210/16* (2006.01)
*C08L 75/04* (2006.01)

(52) U.S. Cl.
CPC .............. *C08F 10/02* (2013.01); *C08G 69/02* (2013.01); *C08F 110/02* (2013.01); *C08F 210/16* (2013.01); *C08L 75/04* (2013.01)

(58) Field of Classification Search
CPC ............... C08F 2/14; C08F 2/16; C08F 2/18; C08F 2/20; C08F 2/22; C08F 2/24; C08F 2/30; C08F 2/32
USPC ........................................................ 525/126
See application file for complete search history.

(56) References Cited

U.S. PATENT DOCUMENTS 3,770,712 A * 11/1973 Schwab .......................... 26/201
4,098,980 A *  7/1978 Markle et al. ................ 526/201
4,792,588 A * 12/1988 Suga et al. .................... 525/240
4,965,131 A    10/1990 Nair et al.
5,298,356 A *  3/1994 Tyagi et al. ................ 430/109.3

(Continued)

FOREIGN PATENT DOCUMENTS

WO         2010/060555         6/2010

OTHER PUBLICATIONS

Saldivar-Guerra et al. Handbook of Polymer Synthesis, Characterization, and Processing. John Wiley and Sons, Feb. 28, 2013. Evidentiary reference.*

(Continued)

*Primary Examiner* — Mike M Dollinger
(74) *Attorney, Agent, or Firm* — Steinfl & Bruno LLP

(57) ABSTRACT

A method for controlling the physical state of an ultra-high molecular weight polymer to make the ultra-high molecular weight polymer suitable for further processing, and related polymers compositions methods and systems, wherein the method comprises combining a catalyst, monomers, and an additive, for a time and under condition to allow synthesis of a nascent polymer and co-crystallization of the nascent polymer with the additive.

17 Claims, 36 Drawing Sheets

(56) References Cited

U.S. PATENT DOCUMENTS

| | | | |
|---|---|---|---|
| 5,364,904 A | | 11/1994 | Farmer et al. |
| 5,756,607 A | * | 5/1998 | Lux et al. ................ 526/127 |
| 5,780,565 A | * | 7/1998 | Clough et al. ............ 526/206 |
| 6,221,983 B1 | * | 4/2001 | Geprags et al. ............ 526/74 |
| 7,005,480 B2 | * | 2/2006 | Kinsho et al. ............. 525/390 |
| 2004/0039115 A1 | * | 2/2004 | Ishida ..................... 525/53 |
| 2007/0149652 A1 | | 6/2007 | Yoon et al. |
| 2009/0163679 A1 | * | 6/2009 | Do Nascimento et al. ..... 526/65 |
| 2010/0143719 A1 | * | 6/2010 | Kidd et al. ............... 428/402 |
| 2011/0111244 A1 | * | 5/2011 | Schellekens et al. ........ 428/522 |

OTHER PUBLICATIONS

Saito, J. et al. "Living polymerization of ethylene with a titanium complex containing two phenoxy-imine chelate ligands". Angewanth Chemistry International Edition, 2001, 40, 2918-2920.

Rastogi, S. et al. "Heterogeneity in polymer melts from melting of polymer crystals". Nature Materials 2005, 4, 635-641.

Rastogi, S. et al. "Disentangled State in Polymer Melts; a Route to Ultimate Physical and Mechanical Properties." Macromol. Mater. Eng. 2003, 288, 964-970.

Rastogi, S. et al. "The role of the amorphous phase in melting of linear UHMW-PE; implication for chain dynamics" J. Phys.: Condens. Matter 2007, 19, 205122-205131.

PCT International Search Report mailed on May 23, 2012 for PCT Application No. PCT/US2011/056788 filed on Oct. 18, 2011 in the name of California Institute of Technology et al.

PCT Written Opinion mailed on May 23, 2012 for PCT Application No. PCT/US2011/056788 filed on Oct. 18, 2011 in the name of California Institute of Technology et al.

Alt, H. G and Koppl, A. W. "Effect of the Nature of Metallocene Complexes of Group IV Metals on Their Performance in Catalytic Ethylene and Propylene Polymerization". *Chem. Rev.* 2000, vol. 100, Issue 4, pp. 1205-1221.

Coates, G. W. "Precise Control of Polyolefin Stereochemistry Using Single-Site Metal Catalysts" *Chem. Rev.*, 2000, vol. 100, Issue 4, pp. 1223-1252.

PCT International Search Report mailed on May 23, 2012 for PCT Application PCT/US2011/056788 filed on Oct. 18, 2011 in the name of California Institute of Technology et al.

PCT Written Opinion mailed on May 23, 2012 for PCT Application PCT/US2011/056788 filed on Oct. 18, 2011 in the name of California Institute of Technology et al.

Ishihara, N. et al. "Stereospecific Polymerization of Styrene Giving the Syndiotactic Polymer" *Macromolecules* 1988, 21, 3356-3360.

Grassi, A. et al. "Microstructure of Isotactic Polypropylene Prepared with Homogeneous Catalysis: Stereoregularity, Regioregularity, and 1,3-Insertion" Macromolecules 1988, 21,617-622.

R. J. Young; P. A. Lovell, *Introduction to Polymers* 1991, pp. 248-249.

R.J. Young et al. *Introduction to Polymers*, Oxford university press 1991.

Chern, C. S. Principles and Applications of Emulsion Polymerization, Wiely 2008, p. 226.

C. Subrannaniann, Chapter 2 of *Morphology, Crystallization and Melting Behaviors of Random Copolymers of Ethylene with 1-Butene, 1-Pentene and 1- Hexene*, Ph.D. Thesis, Virginia Polytechnic Institute & State University, 1999.

Chen et al. "Comparison of Sennicrystalline Ethylene—Styrene and Ethylene-Octene Copolymers Based on Comonomer Content" *Journal of Polymer Science: Part B: Polymer Physics*, 2001, 39, 1578-1593.

\* cited by examiner

METHODS AND SYSTEMS FOR SYNTHESIS OF AN ULTRA HIGH MOLECULAR WEIGHT POLYMER

CROSS REFERENCE TO RELATED APPLICATIONS

The present application claims priority to U.S. Provisional Application No. 61/394,187, filed on Oct. 18, 2010 which is incorporated herein by reference in its entirety.

STATEMENT OF GOVERNMENT GRANT

This invention was made with government support under DMR0710662 awarded by the National Science Foundation. The government has certain rights in the invention.

FIELD

The present disclosure relates to polymer materials and related synthesis. In particular, the present disclosure relates to methods and systems for synthesis of ultra-high molecular weight polymers and related polymers, compositions, methods and systems.

BACKGROUND

A polymer is a large molecule (macromolecule) composed of repeating structural units. These subunits are typically connected by covalent chemical bonds. Although the term polymer is sometimes taken to refer to plastics, it actually encompasses a large class comprising both natural and synthetic materials with a wide variety of properties.

Most commonly, a polymer is a molecule comprising a continuously linked backbone of a polymer consisting mainly of carbon atoms. An example is polyethylene whose repeating unit is based on ethylene monomers and exists in various forms of various molecular weights. Oxygen is also commonly present in various polymer backbones, such as those of polyethylene glycol, polysaccharides (in glycosidic bonds), and DNA (in phosphodiester bonds).

Polymers can have different lengths and molecular weight assume different structures based on the arrangement and microscale ordering of the polymer chains in space. Many factors affect structure formation including molecular weight and chemical nature of the repeating units and therefore achieving control of polymer morphology has been challenging, in particular with reference to synthesis of polymers having high molecular weight.

SUMMARY

Provided herein are products, methods and systems that in several embodiments allow control of polymer morphology of ultra-high molecular weight polymer. More particularly, provided herein are products, methods and systems that in several embodiments, allow to control structure formation of a ultra-high molecular weight polymer during synthesis of the polymer, and/or physical and chemical properties of the synthesized polymer.

According to a first aspect, a method to synthesize an ultra-high molecular weight polymer is described. The method comprises combining polymer monomers, an additive and a catalyst with a solvent in a mixture comprising a liquid phase. In the method, the additive is a colloidal stabilizer capable of a crystal forming interaction with a nascent polymer comprising the monomers. In the method, the additive is also chemically inert with respect to the catalyst, the monomers, the nascent polymer and the ultra-high molecular weight polymer, and the catalyst is suitable for polymerization of the monomers. In the method the combining is performed in the liquid phase for a time and under conditions to allow synthesis of the nascent polymer, and co-crystallization of the nascent polymer with the additive to provide a colloidal suspension of the ultra-high molecular weight polymer.

According to a second aspect, an ultra-high molecular weight polymer obtainable by a polymerization method herein described and related compositions, methods and systems are herein described.

According to a third aspect, a system which can be used to synthesize an ultra-high molecular weight polymer is described. The system comprises at least two of a catalyst, monomers, and an additive. In the system, the additive is a colloidal stabilizer capable of a crystal forming interaction with a nascent polymer comprising the monomers; the additive is also chemically inert with respect to the catalyst, the monomers, the nascent polymer and the ultra-high molecular weight polymer. In the system, the catalyst is suitable for polymerization of the monomers. In the system, the at least two catalyst, monomers and additive are for simultaneous, combined or sequential use a method herein described.

The methods and systems herein described allow in several embodiments to control the material properties of the produced ultra-high molecular weight polymer such as viscosity of the ultra-high molecular weight polymer in a melt or even in solution.

The methods and systems herein described allow in several embodiments to expand the range of application of an ultra-high molecular weight polymer by producing the polymer in a predetermined morphology and in particular to control the size of ultra-high molecular weight polymer particles produced by the method.

The methods and systems herein described allow in several embodiments, allowing subsequent processing associated with a desired application wherein the ultra-high molecular weight polymers are combined with additional material such as colorant, fillers and additional polymers identifiable by a skilled person.

The methods and systems herein described allow in several embodiments production of ultra-high molecular weight polymers allowing production of materials with enhanced characteristics, such as strength toughness, moisture absorption, friction. In particular in some embodiments, methods herein described.

The methods and systems herein described allow in several embodiments generation of new materials with previously unpaired characteristics, ease of processing, and/or energy savings.

The methods and systems herein described allow in several embodiments production in a solution of ultra-high molecular weight polymers that are suitable to subsequent blending and compounding operations. In particular in some embodiments, compounding of ultra-high molecular weight polymers can be performed from a suspension or dried powder.

The polymers, methods and systems herein described can be used in connection with applications wherein control of polymer morphology is desired, including but not limited industrial scale heterogeneous polymerization, homogeneous polymerization in reactors catalysis, flow processes such as film blowing and injection molding, protective coatings, manufacturing of nanoparticles for controlled delivery of other molecules including but not limited to monomers, catalysts and surfactants, and additional applications identifiable by a skilled person.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 4B illustrates the nanostructure of a nascent UHMW-PE using 0.2% concentration of copolymer in reactor, resulting in 16.7 wt % of copolymer EB-5 in the resulting nascent polymer.

FIG. 4C illustrates the nanostructure of a nascent UHMW-PE prepared using 0.5% concentration of copolymer in reactor, resulting in 26.7 wt % of copolymer EB-5 in the resulting nascent polymer.

FIG. 4D illustrates the nanostructure of a nascent UHMW-PE prepared using 1% concentration of copolymer in reactor, resulting in 44 wt % of copolymer EB-5 in the resulting nascent polymer.

DETAILED DESCRIPTION

Figure 1:
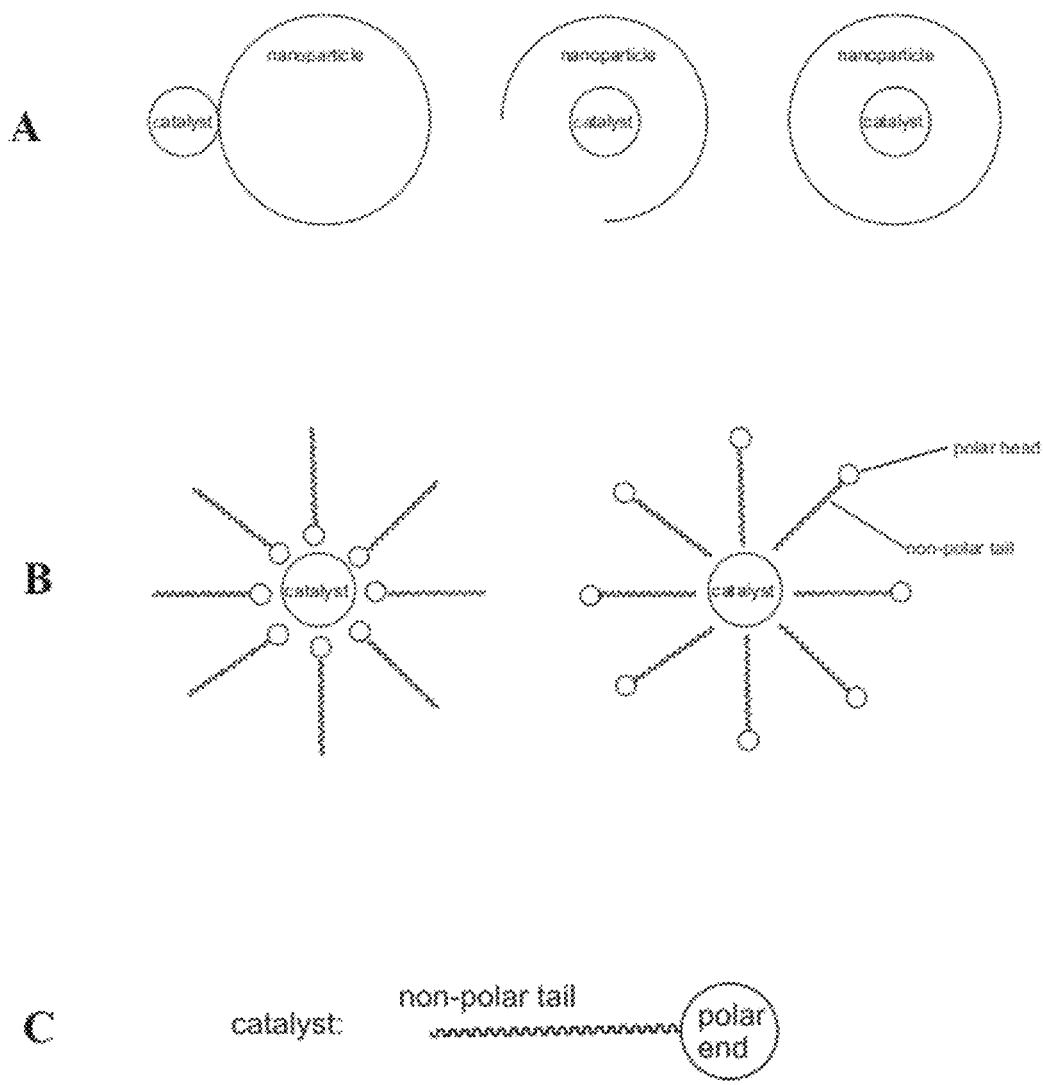
FIG. 1 shows exemplary catalysts of the present disclosure comprising homogeneous catalysts, surfactant-dispersed catalysts, or nanoparticle supported catalysts which can be selected based on the particular polymer to be prepared.

Methods and systems are herein described to synthesize an ultra-high molecular polymer that in several embodiments allow production of polymers with a controlled structure.

The term "polymer" as used herein indicates a large molecule (macromolecule) comprising of repeating structural units connected with covalent bonds usually thought to form a chain. The physical properties of a polymer are the result of the chemical nature of the structural units and their arrangement in space. Typically, polymers in the sense of the present disclosure are synthetic polymers obtainable through chemical polymerization of combining many small molecules known as monomers into a covalently bonded chain. Exemplary synthetic polymers include but are not limited to polyethylene, polystyrene, nylon, polyethylene terephthalate, polyethylene glycol, polyacrylamide and additional polymers identifiable by a skilled person.

The term "ultra high molecular weight polymer" polymer refers to a polymer chain which has either a very high molecular weight and/or a large number of repeating monomer units. The term is relative and can be used to describe a molecular weight of a polymer beyond which processing of the polymer can be difficult due to extensive chain entanglement. The degree of entanglement is characterized by the ratio of the polymer molecular weight and the entanglement molecular weight of the polymer varies with the structure of the repeat unit. For example, the entanglement molecular weight of polyethylene is approximately 1,500 g/mol and that of polystyrene is approximately 18,000 g/mol. Typically, an ultra-high molecular weight polymer comprises at least 75,000 monomers. For example, with respect to polyethylene, an ultra high molecular weight is one that exceeds $2 \times 10^6$ g/mol, corresponding to more than 1000 times the entanglement molecular weight. For polystyrene, a comparable degree of entanglement would be associated with chains having molecular weight of approximately $2 \times 10^7$ g/mol. Values for the entanglement molecular weight have been determined and tabulated for many polymers.

The term "intermolecular attractions" as used herein is defined to mean attractions that hold two or more or molecules together. Intermolecular attractions can include but are not limited to hydrogen bonding, dipole-dipole interactions, and Van der Waals forces.

Polymer "structure", "configuration" or "morphology" in the sense of the present disclosure relates to the physical arrangement of monomer residues along the backbone of the chain as well as the three dimensional arrangement of the resulting polymer on the nanometer or micron levels. Structure has a strong influence on the various properties of a polymer including solubility, electrostatic charge, reactivity, phase behavior and mechanical properties such as viscosity, strength, toughness, and brittleness. Structure determines the physical and chemical interaction between a polymer and another monomer, polymer, or solvent. For example, polyethylene (PE) takes on exceptional properties when the chains are extremely long. Therefore, ultra-high molecular weight (UHMW) polyethylene, typically referring to molar masses greater than 2,000,000 g/mol, is recognized as distinct from conventional polyethylenes that have molar masses of 200,000 g/mol or less. Exemplary properties of UHMW PE suitable in various industrial application comprise exceptional toughness, extremely low moisture absorption, very low coefficient of friction, and extremely high resistance to abrasion (in some forms, UHMW PE is more resistant to abrasion than steel). In particular, since the 1960s, UHMWPE has been the material of choice for total joint arthroplasty in orthopedic implants. UHMWPE fibers are widely used in ballistic protection.

In some embodiments, synthesis of the ultra-high molecular weight polymer can be performed by combining monomers, a catalyst suitable for polymerization of the monomers and an additive.

The term "polymer monomer" in the present disclosure refers to a molecule that can react with identical molecules or different molecules by forming new covalent bonds with one another thus forming a polymer chain comprising a series of repeat units derived from reacted monomers. In particular the monomers should be able to form at least two new covalent bonds such that a monomer can be connected to the polymer chain through a first new covalent bond and the polymer-incorporated monomer can propagate the polymer chain by forming a new covalent bond with another monomer. A covalent bond refers to chemical bond between two atoms where there electrons in the chemical bond are shared between the two atom, the sharing of the electrons may be equal as in a non-polar covalent bond or not equal as in a polar covalent bond. For example, polymer monomer of the present disclosure can be an alkene to form an alkane polymer such as polyethylene, polypropylene, or polystyrene.

The term "catalyst" in the sense of the present disclosure indicates substance capable of changing and in particular increasing the rate of a polymerization reaction. Catalysts can be very complex molecules or very simple molecules. Exemplary catalysts in the sense of the present disclosure comprise homogeneous catalysts, surfactant-dispersed catalysts, or nanoparticle supported catalysts and can be selected based on the particular polymer to be prepared. A homogeneous catalyst is a catalyst which is soluble in the phase (usually a liquid) in which the polymerization reactants are also soluble. The homogeneous catalyst can be a metal catalyst, organocatalyst, or organometallic catalyst, and can be a single site catalyst.

The term "additive" as used herein indicates a colloidal stabilizer chemically inert with respect to the catalyst the nascent polymer and the ultra-high molecular weight polymer and capable of crystal forming interaction with a nascent polymer comprising the monomers.

The term "colloidal stabilizer" in the present disclosure refers to species comprising a solvophilic portion and a crystalphilic portion, the solvophilic portion being soluble in the solvent and the cystalphilic portion being capable of interacting with a crystal by a "crystal forming interaction". In particular, the term refers to a first species, the colloidal stabilizer, which can interact by way of crystal forming interaction with another species which is capable of crystalliztion under a given condition, which can lead to formation of a co-crystal, the co-crystal incorporating the crystalphilic portion of the colloidal stabilizer into the a crystal formed by the other species and the solvophilic portion overhanging the co-crystal and able to interact with solvent allows the "colloidal stabilizer" to inhibit or delay aggregation of the initial particles into progressively larger one. The term "colloid" refers a physical state of a mixture where the mixture comprises a first substance which is microscopically dispersed throughout a second substance and can maintain the state of having the microscopically dispersed substance, avoiding precipitation and/or flocculation for an amount of time. For example, a colloidal stabilizer can be used to provide a colloidal suspension of particles dispersed throughout a liquid in which the particles dispersed in the liquid, in the absence of a colloidal stabilizer, can precipitate and/or flocculate.

In particular, an additive in the sense of the present disclosure has structural features that allow a partial solubility of the additive in the reaction medium at the reaction condition.

The term "chemically inert" as used herein refers to species that do not chemically react with components of a mixture in which the species is in contact with. In particular, the term refers to a species that does not undergo a chemical reaction with components of a mixture in which the species is in contact with and in which a chemical reaction takes place. The term "chemically react" refers to breaking and/or forming of chemical bonds. For example, a chemically inert species of the present disclosure can be an additive which does not chemically react by way of breaking and/or forming chemical bonds with the components of the mixture in which the additive is in contact with under given conditions, even if the additive is capable chemically reacting under other conditions and/or with other components. In particular, an additive in the sense of the present disclosure typically does not dissociate to make acid or base, does not degrade, does not change activity of the catalyst, e.g. by adsorption or absorption.

The term "crystal forming interaction" in the sense of the present disclosure refers to an interaction between two species (e.g. additive and polymer) which can lead to formation of a co-crystal comprising the two species. For example, a crystal forming interaction between an additive and a polymer can lead to a co-crystal comprising the additive and the polymer wherein the additive is anchored into the crystal structure of the polymer. In particular, an additive in the sense of the present disclosure has structural features that allow co-crystallization of the additive with the nascent polymer to form polymer crystals during synthesis of the ultra-high molecular weight polymer.

The term "nascent polymer" as used herein refers to a polymer which has not undergone further processing such as melting, blending, or extrusion. The nascent can refer to a polymer at various stages of length in a polymerization reaction. For example, it can refer to a polymer which has a molecular weight of approximately 50,000 g/mole, up to $2 \times 10^6$ g/mole, or greater than $2 \times 10^6$ g/mole.

In some embodiments, an additive can comprise moieties that can co-crystallize with the nascent polymer and colloid stabilizing moieties which allow the co-crystallized nascent polymer to remain in the solution as a colloid. In particular in some embodiments, the crystal forming moiety is capable of attractive interactions with the nascent polymer, the colloid stabilizing moiety is capable of attractive interactions with the solvent and the resulting additive can thus crystallize with the nascent polymer while still interacting with the solvent to provide a stable colloid. In particular, in some embodiments, the crystal forming moiety can be a small part of the additive and the colloid stabilizing moiety can instead be comprised in a larger portion of the additive.

For example, in several embodiments, the additive can have a general formula:

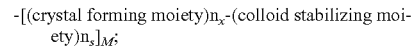

where $n_x \geq$, $n_s \geq$, $M \geq 1$ in any statistical distribution. In particular in some embodiments, $n_x$ can be 1, $n_s$ can be 1, and M can be 1.

In particular, in several embodiments, crystal-forming moieties are selected to allow formation of a stem structure in the additive that can be rooted in the crystal lattice of the nascent polymer as an anchor. Length of the stem and location of the crystal forming moiety in the stem can be controlled to achieve a desired co-crystallization. For example, in embodiments wherein a crystal-forming moiety is at the end of the additive, the crystal-forming moiety can reach the other side of the lamella, although in several cases this configuration is not necessary for effective co-crystallizations. Additionally, in embodiments, wherein crystal forming moieties comprise a stem structure, the crystal forming moiety of additive are typically long enough that the binding energy is approximately greater than 10 kT. In embodiments, wherein a crystal-forming moiety is in the middle of the additive, the moiety can be long enough to span the crystal and allow the flanking moieties to be exposed to solvent to have an efficient interaction with the nascent polymer. Longer crystal forming moieties (e.g. longer polymer blocks see below), can penetrated from one end of the lamellae to the other (typically 20 nm to 30 nm). For example, an end block adapted to be rooted in the crystal can contain approximately 10 or more monomers while a mid-block that is linked to domains for colloidal stabilization on both ends can contain 50 or more monomers.

In some embodiments, colloid stabilizing moieties are capable of performing colloidal stabilization by steric stabilization or electrostatic stabilization. The term "steric stabilization" as used herein indicates stabilization as a result of the spatial conformation of moieties in the additive and synthesized polymer. The term "electrostatic stabilization" as used herein indicates stabilization as a result of opposing electrical charges between the additive and the synthesized polymer. In some embodiments, a steric stabilization can be a result of steric repulsions between portions of the additive on one growing polymer chain with another growing polymer chain, thus preventing aggregation among the high molecular weight growing polymers. Solvents, that can be used for this type of stabilization include but are not limited benzene, toluene, hexane, and heptane.

In some embodiments, electrostatic colloidal stabilization is performed in connection with use of polar solvents such as sulfuric acid, nitric acid, hydrofluoric acid (acids) and sodium hydroxide, ammonium hydroxide (bases) or ionized water. Exemplary electrostatic interactions comprise a surfactant-like interaction wherein the additive comprises a polar end, such as either a cation or an anion, and a nonpolar end. The nonpolar end can crystallize with the growing polymer and thus anchor the polar ends to the growing polymer to provide repulsions by electrostatic interactions, i.e. positively charged polar ends or negatively charged polar ends, to minimize and in particular prevent aggregations between growing polymer chains.

In several embodiments, the colloid stabilizing moiety of the additive remains exposed to the solution at the desired reaction conditions without modifying other reaction parameters.

In some embodiments, the additive is copolymer and the crystal forming moiety and colloid stabilizing moiety can be formed by blocks of the copolymer. In particular, in several embodiments, a copolymer can have the general formula

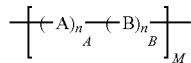

wherein A is a solvophilic block, which is a moiety having affinity for the solvent; B is a crystalphilic block which is a moiety capable of crystal forming interaction with the nascent polymer; and M is any positive integer.

In some embodiments A is a moiety of formula

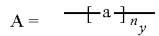

wherein a is a monomer repeating units of A, where $n_y$ is any positive integer.

In particular in some embodiments, the solvophilic block A can be selected based on its ability to interact with the solvent which can be based on compatible intermolecular attractions with the solvent and/or ability to be solvated by the solvent. One skilled in the art could determine a block which can be solvophilic based, for example, on polarity, hydrophobicity, hydrophilicity and/or solubility.

Candidate molecular structures for the solvophilic block A can be screened using simple experiments that can be performed by a skilled person. For example, varying amounts of a polymer or oligomer that is being considered for use as the solvophilic block can be dissolved under the conditions that will be used for the polymerization reaction, that is in the desired solvent at the desired temperature and pressure, and visual inspection can be used to detect possible precipitation of the additive in the relevant timescale of the reaction. In some embodiments, no detectable precipitation at the relevant time scale indicates a solvophilic block.

In some embodiments B is a moiety of formula

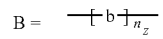

wherein b=monomer repeating units of B, where $n_z$ is any positive integer.

In some embodiments, the crystalphilic block B can be selected based on the crystalphilic block's intermolecular attractions, such as intermolecular attractions which are compatible with the crystal and/or based on the ability of the crystalphilic block to be rooted in the crystal. For a given ultra-high polymer to be synthesized, the repeat units of that polymer can be used in the crystalphilic block. One skilled in the art can determine a block which can be crystalphilic based, for example, on polarity, hydrophobicity, hydrophilicity and/or crystal lattice structure. For example, a skilled person with knowledge of the crystallization of isotactic polypropylene would know that a small number of ethylene comonomer units can be compatible with co-crystallization, in contrast to hexane comonomer units that are strictly rejected from isotactic polypropylene crystals. As another example, a skilled person with knowledge of the crystallization of syndiotactic polystyrene would know that sequences of several consecutive syndiotactic repeat units will enable a crystal forming interaction, in contrast to sequences of hemi-isotactic or atactic repeat units that are rejected from syndiotactic polystyrene crystals.

In particular crystalphilic block can selected based on information such as the details of the crystal structural of various common polymers of Table 1 from Introduction to polymers R. J Young P A Lovell Oxford university press 1991.) herein included for guidance purposes only.

TABLE 1

Details of the crystal structures of various common polymers

| Macromolecule | Crystal System Space group Mol. Helix | Unit cell axes | Unit cell angles | No. units | $\rho_c$ (g cm$^{-3}$) |
|---|---|---|---|---|---|
| Polyethylene I —CH$_2$— | Orthorhombic Pnam 1*2/1 | 7.418 4.946 2.546* | 90° 90° 90° | 4 | 0.9972 |
| Polyethylene II —CH$_2$— | Monoclinic C2/m 1*2/1 | 8.09 2.53* 4.79 | 90° 107.9° 90° | 4 | 0.998 |
| Polytetrafluoroethylene I —CF$_2$— | Triclinic P1 1*13/6 | 5.59 5.59 16.88* | 90° 90° 119.3° | 13 | 2.347 |
| Polytetrafluoroethylene II —CF$_2$— | Trigonal P3$_1$ or P3$_2$ 1*15/7 | 5.66 5.66 19.50* | 90° 90° 120° | 15 | 2.302 |
| Polypropylene (iso) —CH$_2$—CHCH$_3$— | Monoclinic P2$_1$/c 2*3/1 | 6.66 20.78 6.495* | 90° 99.62° 90° | 12 | 0.946 |
| Polystyrene (iso) —CH$_2$—CHC$_6$H$_5$— | Trigonal — R 3 c 2*3/1 | 21.9 21.9 6.65* | 90° 90° 120° | 18 | 1.127 |
| Polypropylene (Syndio) —CH$_2$—CHCH$_3$— | Orthorhombic C222$_1$ 4*2/1 | 14.50 5.60 7.40* | 90° 90° 90° | 8 | 0.930 |

TABLE 1-continued

Details of the crystal structures of various common polymers

| Macromolecule | Crystal System Space group Mol. Helix | Unit cell axes | Unit cell angles | No. units | $\rho_c$ (g cm$^{-3}$) |
|---|---|---|---|---|---|
| Poly(vinyl chloride) (Syndrio) —CH$_2$—CHCl— | Orthorhombic Pbcm 4*1/1 | 10.40 5.30 5.10* | 90° 90° 90° | 4 | 1.477 |
| Poly(vinyl alcohol) (atac) —CH$_2$—CHOH— | Monoclinic P2/m 2*1/1 | 7.81 2.51* 5.51 | 90° 91.7° 90° | 2 | 1.350 |
| Poly(vinyl fluoride) (atac) —CH$_2$—CHF— | Orthorhombic Cm2m 2*1/1 | 8.57 4.95 2.52* | 90° 90° 90° | 2 | 1.430 |
| Poly(4-methyl-1-pentene) (iso) —CH$_2$—CH—           \|           CH$_2$—CH(CH$_3$)$_2$ | Tetragonal — P 4 2*7/2 | 20.3 20.3 13.8* | 90° 90° 90° | 28 | 0.822 |
| Poly(vinylidene chloride) —CH$_2$—CCl$_2$— | Monoclinic P2$_1$ 4*1/1 | 6.73 4.68* 12.54 | 90 123.6° 90° | 4 | 1.957 |
| 1,4-Polyisoprene (cis) —CH$_2$—CCH$_3$=CH—CH$_2$— | Orthorhombic Pbac 8*1/1 | 12.46 8.86 8.1* | 90° 90° 90° | 8 | 1.009 |
| 1,4-Polyisoprene (trans) —CH$_2$—CCH$_3$=CH—CH$_2$— | Orthorhombic P2$_1$2$_1$2$_1$ 4*1/1 | 7.83 11.87 4.75* | 90° 90° 90° | 4 | 1.025 |

In some embodiments, the solvophilic block (A), can comprise repeating units a which can be prepared by polymerization of monomers a'.

In some embodiments, the crystalphilic block (B), can comprise repeating units b which can be prepared by polymerization of monomers b'.

Typical monomers that can be used as a' and/or b' can comprise the following set of monomers:

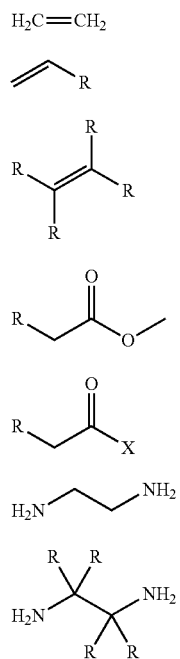

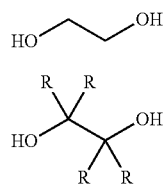

R groups can be independently selected from alkyl (0-10 C, branched or unbranched), phenyl, aryl, alkoxy, thiol, thioether, amino, alkylamino, and additional groups identifiable by a skilled person. A skilled person will be able to identify the groups and blocks that allow crystalphilic and solvophilic interactions with a desired nascent polymer in a given solvent under the reaction condition of choice. Specifically, a skilled person who is selecting the polymerization catalyst can select R groups that will not poison the selected catalyst or undergo chemical reaction in the presence of the catalyst.

In particular, monomers (1) and (2) can serve as either solvophilic or crystalphilic blocks in a non-polar solvent depending on the polymer. In certain embodiments, wherein the mixture includes non-polar solvent typical monomers for a crystalphilic block (B) include, but are not limited to monomers (1)-(5), (8), and (9). In certain embodiments, where polar solvents are used, monomers such as (6) and (7) can serve as monomers for a solvophilic block. In embodiments, wherein the solvent is supercritical CO2, solvophilic bloc (B) can comprise silicone and fluoropolymer repeat units.

In some embodiments, the additive can be a block copolymer additive and in particular a diblock, triblock, or other multi-block copolymer. Diblock copolymers can be made using living or pseudo-living polymerization techniques. For example, a living cationic or living anionic polymerizations. Pseudo-living polymerizations include controlled radical polymerization such as atom transfer radical polymerization (ATRP) and reversible addition fragmentation chain transfer (RAFT) polymerization. Block copolymers can also be prepared by chemoselective coupling of individual blocks. Methods for preparing block copolymers as well as other copolymers including, graft copolymers, alternating copolymers, statistical copolymers and gradient copolymers are identifiable by a skilled person.

In some embodiments, the molecular structure of the additive can be selected based on the polymer to be produced (crystal forming moiety and, in general, portions of the additive molecules are capable of co-crystallizing with the polymer) and based on the solvent and temperature of the reaction medium (colloid stabilizing moiety and, in general, portions of the additive molecules are solvated by the reaction medium). The choice of additive structure will be made by one skilled in the art of polymer production based on considerations that include cost (for example, statistical copolymers can have lower cost than block copolymers), kinetics of co-crystallization (for example, diblock additives can co-crystallize more rapidly than statistical copolymers), size of the product particles (for example, A'-B'-A' or triblock and multi-block copolymers and statistical copolymers can connect multiple lamellae into each particle, whereas diblock copolymers and B'-A'-B' triblock do not).

In some embodiments, a block copolymer additive can comprise a crystalphilic or solvolphilic block of an additive such as polyurethane, polyethylene, polycarbonate, polyesters, nylons, polypropylene, polystyrene, PET, polyacrylonitiles, polybutadiene, polyethers, and polybutylene and any derivative thereof but are not limited to such. See, for example, polymers (10)-(13), which can be prepared from any one of the monomers (1)-(9), but are not limited to those monomers.

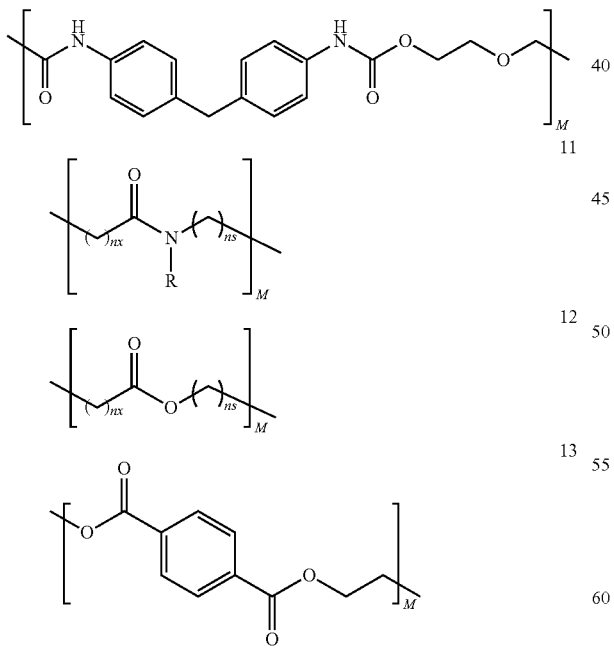

In some embodiments, additives comprise derivatives of polymer additives herein described wherein the referenced polymer include substitution of a hydrogen for alkyl (0-10 C, branched or unbranched), alkenyl, alkynyl, phenyl, aryl, alkoxy, thiol, thioether, amino, alkylamino, and additional groups identifiable by a skilled person.

Exemplary additive formed by block copolymers comprise polymers of formulas (14) to (25)

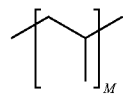

14

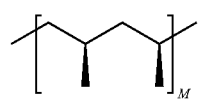

15

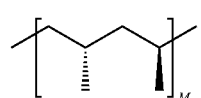

16

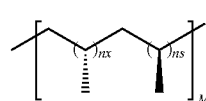

17

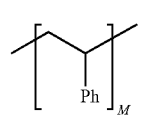

18

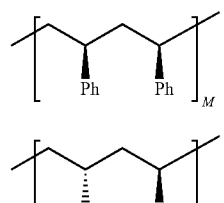

19

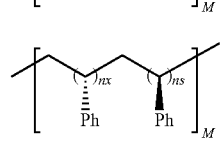

20

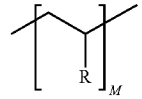

21

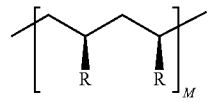

22

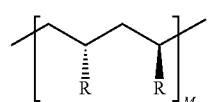

23

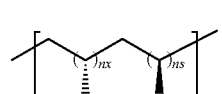

24

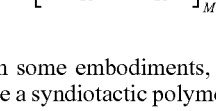

25

In some embodiments, copolymer blocks can also comprise a syndiotactic polymer (see e.g. polymers (16), 20, 24), an isotactic polymer (see e.g. polymers (15), (19), (23) or an atactic polymer (see e.g. polymers (17), (21), (35)) derived from monomers having diastereotopic faces (see monomers (2) and (3), for example).

Exemplary copolymers which can be suitable as additive are polyethylene, polypropylene, polyurethane, polyethylene terephthalate, and nylon polymers.

In some embodiments, the solvent can be supercritical $CO_2$, in which case solvophilic blocks can include polydimethylsiloxane and polyperfluoropropyleneoxide. In some embodiments, carbon dioxide can be chosen as the solvent for carrying out the polymerization due to desirable features of $CO_2$ that include low cost, non-toxic, non-flammable and availability in high purity. Separation of $CO_2$ from the colloidal suspension of ultrahigh polymer occurs cleanly when $CO_2$ reverts to the gaseous state upon depressurisation. In some embodiments, the low reactivity of $CO_2$ allows synthesis of polymers using transition metal catalysis under conditions identifiable by a skilled person.

The molecular structure of the additive can be selected based on the polymer to be produced (portions of the additive molecules are capable of co-crystallizing with the polymer) and based on the solvent and temperature of the reaction medium (portions of the additive molecules are solvated by the reaction medium).

The solvophilic portion and crystalphilic portion of the additive can be independently selected. The solvophilic portion can be selected based on its solubility in the solvent. The crystalphilic moiety can be selected based on its ability to participate in a crystal forming interaction with the polymer. The ability to participate in a crystal forming interaction can be two-fold. The additive should have an affinity for the polymer and thus be able to interact with it, for example by way of intermolecular attractions. The additive should also be able to fit into the polymer's crystal structure.

One skilled it the art can determine a structural moiety that capable of having intermolecular attractions with a particular polymer structure, for example, based on which functional groups present in the polymer. Functional groups can include but are not limited to alkane, alkene, alkyne, alcohol, amine, carbonyl, ketone, aldehyde, carboxylic acid, ester, amide, carboxylate, ether, etc.

One skilled in the art can also determine possible structures that can fit into the polymer's crystal structure based on crystal structure data for known polymers [R. J. Young; P. A. Lovell, *Introduction to Polymers* ($2^{nd}$ edition), 1995, page 248-249].

A polymer that "fits" into a crystal structure can be one that has a crystalphilic portion which is long enough to become anchored in the crystal and/or can be accommodated in the crystal structure in a semi-irreversible manner. Semi-irreversible in this case refers to an interaction between two components of a co-crystal which is not destroyed, broken, or disrupted by solvation but can be destroyed, broken, or disrupted by a phase change such as melting the co-crystal.

In methods herein described monomers, additive and catalyst are combined with a solvent in a mixture comprising a liquid phase. In particular, the mixture can comprise at least one liquid phase where the nascent polymer can be dispersed. In some embodiments, the mixture is entirely in a liquid phase. In some embodiments, a liquid phase can be comprised in the mixture together with other phases such as another liquid phase, (e.g. miscible or immiscible), or a gas phase.

In particular, principles of colloidal stabilization can be applied in liquid and supercritical fluid solvents. Homogeneous dispersion of catalysts can be achieved in liquid and supercritical fluid solvents by choice of a soluble catalyst, a surfactant that solubilizes the catalyst or a nanoparticle carrier that is readily dispersed in the solvent.

In some embodiments, the monomers are gas phase monomers, and the gaseous monomers can be bubbled into the solution or can be contacted with the solution by preparing a sealed vessel comprising the solution in contact with a gas phase, the gas phase comprising the gaseous monomers.

In some embodiments, the monomers form a solid phase at ambient conditions, and the monomers can be added by a portion-wise addition of the solid phase monomers or by a dropwise addition of the monomers, as a solution of monomers in a solvent.

In some embodiments, the monomer can be added at once, depending on the specific polymer synthesis and reaction conditions.

In some embodiments, the monomers form a liquid phase at ambient conditions, and the monomers can be added by a dropwise addition of the liquid phase monomers or by a dropwise addition of the monomers, as a solution of monomers in a solvent.

In some embodiments, the additive can be soluble in the solution or be able to be dispersed in the solution, such as a micelle or other structure identifiable by a skilled person. In particular, in some embodiments the additive can be soluble in the solvent at a temperature below the melting point of the polymer to be prepared and below a temperature at which the polymer to be produced dissolves in the solvent.

In some embodiments, the solvent used to prepare a solution of monomers can be the same solvent or a different solvent from the one used to prepare the solution comprising the additive and the catalyst.

In the method the combining is performed for a time and under condition to allow synthesis of a nascent polymer and co-crystallization of the nascent polymer with the additive in the liquid phase.

In particular, in several embodiments, various polymerization reactions can be performed, comprising Ziegler-Natta polymerizations, and in particular the Ziegler Natta polymerization which use both metallocene and non-metallocene catalyst, identifiable by a skilled person upon reading of the present disclosure.

In some embodiments, once one selects a polymer to be prepared a suitable catalyst can be selected based on its ability to catalyze the desired polymerization reaction. The catalyst can dictate the solvent and temperature that should be used to maintain catalytic activity. For example, an additive can be selected based on its ability to co-crystallize with the selected polymer by having a crystalphilic block. In some embodiments, a possible crystalphilic block for the additive can be predicted based on a similarity of the structures to be co-crystallized and can be further guided by looking for known co-cyrstallizable structures. ["Polymer Crystallization", Jerold Schultz 2001 Oxford University Press]. In some embodiments, a solvophilic block can be selected based on solubility in the solvent (look at solubility alone) the ability to attach them as a copolymer (additive). The lengths of each piece selected based on the dimension of the crystal (for the crystalphilic part) and for the solvophilic, (length gives you more separation and thus smaller particles) and can affect solubility.

In the method, the time and condition are also selected to allow co-crystallization of the nascent polymer with the additive.

The term "co-crystallization" as used herein refers to an interaction between two species which results in the formation of a co-crystal. The term "co-crystal" in the present disclosure refers to a crystalline structure comprising two or more components. In particular, a co-crystal is made up of two or more components which can interact by way of non-covalent interactions. The non-covalent interactions can include but are not limited to, van der Waals, dipole-dipole, H-bonding, and pi interactions. For example, a co-crystal can result from a portion of a first molecule interacting with a second molecule by way of non-covalent interactions during crystallization of the first molecule to result in incorporation of the second molecule into a crystal structure of the first molecule. In some embodiments, the first molecule can be an additive molecule and the second molecule can be a polymer, wherein the polymer is larger than the additive, and the additive is anchored into the crystal structure of the polymer.

Figure 2:
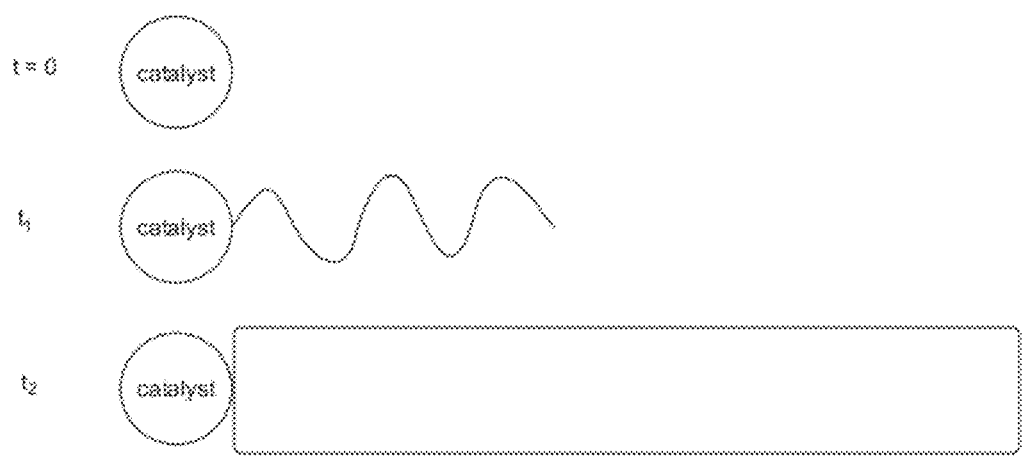
FIG. 2 shows a schematic of an initial reaction of a monomer with a catalyst to initiate a polymerization where unimolecular crystals begin to grow from the catalyst.

A schematic illustration of the co-crystallization process which is not intended to be limiting and is provided herein for guidance purposes only, is shown in FIG. 2 illustrating unimolecular nascent polymer crystals forming from a catalyst as a result of a polymerization reaction. As shown in the illustration of FIG. 2 a monomer can react with a catalyst to initiate a polymerization where unimolecular crystals begin to grow from the catalyst (See t=1, FIG. 2). The additive should be present no later than $t_1$ during polymerization and can be present anytime before $t_1$. At $t_2$ a unimolecular nascent polymer crystal. A further illustration of the controlled structure resulting from the interaction between additive and nascent polymer is provided in FIG. 3A and FIG. 3B with reference to ultra-high molecular weight polyethylene (see below).

Detection of the resulting co-crystal structure can be performed with techniques identifiable by a skilled person. In particular, the combination of WAXD, SAXS, and SEM imaging can provide detailed information regarding the structural features of the resulting nascent polymer and ultra-high molecular polymer as these techniques can provide Angstrom scale, nanoscale, and microscale structural information, respectively. (Examples 4, 5 and 6).

Additional information on the polymer structure can be provided by detection of physical and chemical properties of the ultra-high molecular weight polymer, such as viscosity (e.g. linear viscosity) and other properties that are also detectable using procedures identifiable by a skilled person. For example viscoelastic measurements by rheometry can detect the presence of long chains and their association into slow-relaxing structures. Viscoelastic measurements of nascent polymer samples as well as nascent polymer blends can also show the properties of the polymer sample or the polymer blend. Further, linear viscoelastic measurements can indicate a minimum or maximum amount of a polymer which would provide a particular property of interest.

In particular, in methods and systems herein described the co-crystallization of the nascent polymer with the additive is performed to provide a colloidal suspension of the ultra-high molecular weight polymer.

The term "colloidal suspension" as used herein refers to a mixture comprising a first substance which is microscopically dispersed throughout a second substance. The first substance can be solid particles and the second substance can be liquid. The colloidal suspension can further comprise macroscopically dispersed particles or additional phases. For example, a colloidal suspension can comprise a solvent and particles microscopically dispersed in the solvent. In particular, the particles can further comprise larger macroscopically dispersed particles and/or a solid precipitate which is not dispersed throughout the second substance.

In some embodiments, colloidal suspensions as described herein can be solutions comprising ultra-high polymer particles in different states. In particular, in some embodiments, colloidal suspension can comprise more finely dispersed nanoparticles and/or more colloidal particles. The extent to which a colloidal particles or more finely dispersed particles are obtained is based on particle size and thus depends on a rate of polymerization. Suitable techniques to detect the state and size of the particles comprise SAXS, WAXD, SEM (see e.g. Examples 3 to 6) and additional techniques identifiable by a skilled person.

The following table shows how a solvent and a copolymer can be selected based on a target high molecular weight polymer

TABLE 2

| A (target polymer) | B (solvent) | A' (crystal forming moiety) | B' (colloid stabilizing moiety) |
|---|---|---|---|
| Polyethylene | Heptane | Alkyl tails having 20 or more carbons | Ethylene copolymer with 10% butene with Mw 10 kg/mol |
| isotactic Polypropylene (iPP) | Toluene | $-(iPP)_{30}-$ | $-(aPP)_{30}-$ |
| Syndiotactic Polypropylene (sPP) | Toluene | $-(sPP)_{50}-$ | (hemi-isotactic PP)$_{30}$ |
| Syndiotactic Polystyrene (sPS) | Toluene | $-(sPS)-_{50}$ | $-(aPS)-_{50}$ |
| Polylactide | THF | $-(PLLA)_{40}-$ | $- PEO_{30}-$ |

For example if polymer A (e.g. polyethylene) is selected, a possible solvent (B) can be for example toluene, which would direct towards using an additive comprising A' as a crystal forming moiety and B' as a colloidal stabilizing moiety.

One skilled in art would be able to extrapolate the exemplary indications in Table 2 to determine other suitable combinations of polymer, solvent, and additives in view of the present disclosure. In particular, in some embodiments, an appropriate selection of a combination of polymers, additives, solvent can be performed in view of the physical and chemical properties of the polymer additive and solvent. More particularly, given one of the solvent, polymer and additive, the other reagent will be selected with physical and chemical properties that allow polymerization and co-crystallization of the additive with the polymer at desired reaction conditions.

For a particular polymer to be produced (examples are given in the first column of Table 2), one skilled in the art selects a polymerization catalyst based on its activity, specificity (e.g., control of tacticity) and stability. The choice of catalyst places constraints on the choice of solvent and the temperature (e.g., the temperature must be below a maximum acceptable temperature imposed by the stability of the catalyst; the temperature must be above a minimum acceptable temperature dictated by the rate of reaction). An example of a criterion for selection of the solvent is that it dissolve (or disperses) the catalyst.

For example, if the nascent polymer to be prepared is polyethylene, polystyrene, or polypropylene, or another polyolefin or hydrophobic polymer, the solvent can be selected from non-polar hydrophobic solvents such as toluene, n-pentane, n-heptane, etc. The solvent should also be selected based on its ability to dissolve (or disperse) the catalyst.

The catalyst can be selected from single sites catalysts [Coates, G. W Chem. Rev. 2000, 100, page 1123-1252]. In particular, the catalyst can be selected from cationic metal single site catalysts and/or metallocene single site catalysts [Alt, H. G and Koppl, A. W Chem. Rev. 2000, 100, page 1205-1221]. The catalyst can be selected based on its ability to retain catalytic activity at a temperature in which provides solubility of the additive in the solvent, for example, approximately in a range of −20 to 50° C.

In a case where prochiral monomers such as styrene and propene, are used and a desired tacticity of a resulting polymer is desired, catalysts can be selected from stereospecific polymerization catalysts identifiable by one skilled in the art. The polymerization catalysts include but are not limited to syndiospecific polymerization catalysts [Ishihara, N. et al. *Macromolecules,* 1988, 21, page 3356-3360] and isospecific polymerization catalysts [Grassi, A. et al. *Macromolecules,* 1988, 21, page 617-622].

An example of a criterion for selecting the temperature to use in the polymerization is that it be below a threshold that causes catalyst decomposition. Another criterion that can be imposed is that the temperature be high enough to provide a desired rate of reaction. One skilled in the art also chooses the solvent and temperature to provide solubility of the monomer in the reaction medium. In the method of the disclosure, the reaction temperature is below the temperature at which the polymer dissolves or melts.

The molecular structure of the additive is chosen based on the polymer to be produced (crystal forming moiety and, in general, portions of the additive molecules are capable of co-crystallizing with the polymer) and based on the solvent and temperature of the reaction medium (colloid stabilizing moiety and, in general, portions of the additive molecules are solvated by the reaction medium).

In some embodiments, control of the resulting polymer structure can be performed in view of rate of polymerization and additive concentration. In particular regimes of behavior of the nascent polymers as a function of additive concentrations and polymerization rate can be used to control size and type of particles that are formed. In particular, in methods and systems herein described a colloidal suspension of ultra-high molecular weight polymer ranging from finely dispersed nanoparticles (colloidal suspension of submicron particles of the cocrystallized additive and ultra-high molecular weight polymer) to a colloidal suspension of particles up to about 100 microns in size of the cocrystallized additive and ultra-high molecular weight polymer.

In particular, according to an embodiment, for a desired particle state candidate additive concentrations can be identified based a determined rate of polymerization, and an additive concentration associated to the desired particle state can be identified by performing polymerization, detecting the corresponding particle state and comparing the detected particle state with the desired particle state.

In an another approach, according to an embodiment, for a desired particle state candidate rate of polymerization can be identified based a determined additive concentration, and a rate of polymerization associated to the desired particle state can be identified by performing polymerization, detecting the corresponding particle state and comparing the detected particle state with the desired particle state.

Accordingly, in some exemplary embodiments, wherein screening additive concentrations to use with a given reaction condition (catalyst, solvent and temperature) is performed, a first set of experiments can examine concentrations of 0.1% to 10% to determine that the proposed additive is readily dispersed in the reaction medium and to confirm that the additive itself does not react in the presence of the catalyst. Once the solubility of the candidate additive has been confirmed, preliminary reactions can be performed. In comparison to reactions with no additive, the appearance of the product can be examined for two well-separated concentrations of additive (for example, 0.1% and 1% of additive in the reaction medium). If the reaction product appears milky for one of these two additive concentrations, the candidate additive is appropriate for further examination, as described in the following paragraphs.

The specific form of colloidal suspension at a certain additive concentration depends on the rate of polymerization. The particle size observed in the reactor product obtained using the additive (described in the previous paragraph) can be examined and, if it is smaller than desired, the experiment can be repeated using conditions adjusted to increase the size of the nascent particles. For example, a faster rate of polymerization can lead to formation of larger particles, while a slower rate of precipitation can lead to smaller particles. Thus, rate of polymerization can be used to control particle size. The rate of polymerization can be controlled, for example, by rate of addition of monomers to a reactor, temperature, and catalyst as will be understood by a skilled person.

In some embodiments, given a particular rate of polymerization, concentration of the additive can be selected to control an extent to which colloidal particles are formed versus an extent to which finely dispersed nanoparticles are formed. For example, a higher concentration of additive can lead to a higher additive to polymer ratio, thus leading to a more finely dispersed nanoparticles of product, while a lower concentration can lead to a lower additive to polymer ratio giving rise to larger colloidal.

Additional parameters affecting the resulting particle are concentration of the monomers and temperature, which are interrelated due to their effects on the rate of polymerization as will be understood by a skilled person. For example adjusting concentration of the monomers can be performed to control rate of polymerization and thus particle size. Also adjusting temperature can be performed to achieve a desired level of solubility of the additive and/or the catalyst in the solvent. Further adjustment of temperature can be performed to control a rate of polymerization.

In some embodiments, concentration of the additive can be selected based on the polymerization rate and the desired physical state of the product. For example several material properties of the produced ultra-high molecular weight polymer (e.g. viscosity), can be determined based on the amount of polymer additive present in the reactor during polymerization. One skilled in the art understands that the relative rate of chain growth compared to the rate of co-crystallization with the additive will determine the number of additive molecules per area of the lamellar crystallites that form during crystallization of the growing chains. Consequently, the concentration of the additive and the rate of polymerization can be used to achieve a desired physical state of the product formed by a particular catalyst in a particular solvent at a particular temperature. The rate of polymerization can be controlled by the monomer concentration or the rate of supplying monomer to the reaction medium.

Figure 30:
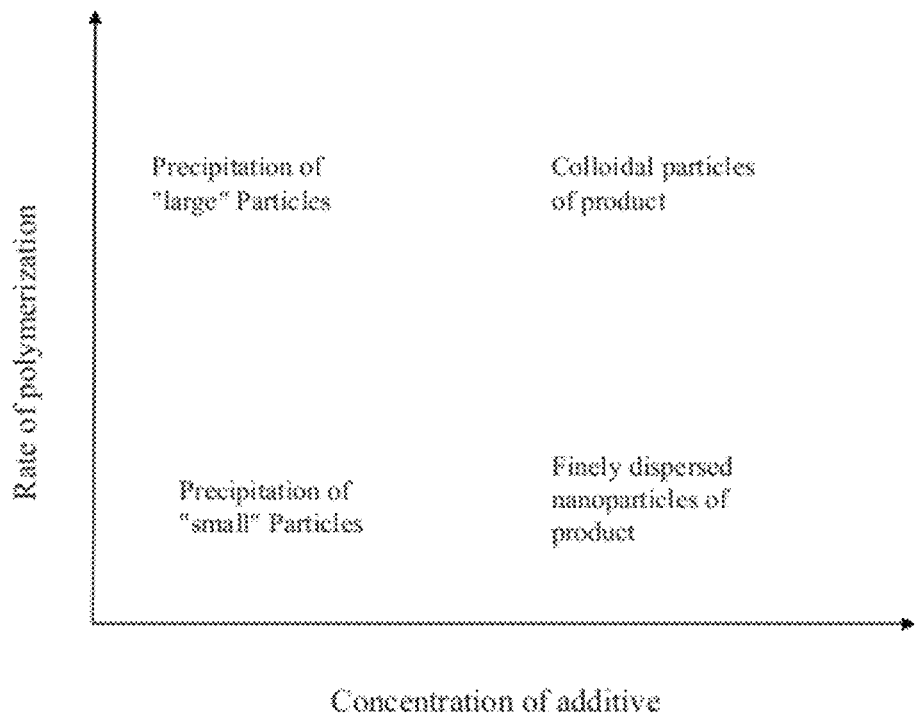
FIG. 30 shows a diagram illustrating regimes of behavior of nascent polymers as a function of additive concentrations and polymerization rate according to an embodiment of the present disclosure. In particular, in the diagram of FIG. 30 four particular state of ultra-high molecular weight polymers are illustrated that are associated with specific combination of polymerization rate (y axis) and additive concentration (x axis), wherein the specific values of polymerization rate and additive concentration depend on the specific combination of polymer, solvent additive and catalyst according to embodiments of the present disclosure.

General trends that can be used in several embodiments for identifying suitable rate of polymerization and additive concentration to obtain ultra-high molecular weight polymers in a desired state, are shown in FIG. 30. According to the exemplary illustration of FIG. 30, at relatively low additive concentration (left side of schematic diagram of the parameter space, FIG. 30), the number of additive molecules incorporated per unit area of lamellar crystal is relatively low; consequently, some attraction between the lamellae remains and clusters of lamellae can become relatively large. Increasing the additive concentration (moving from left to right across the parameter space of FIG. 30) provides a means to systematically increase the number of additive molecules incorporated per unit area of the growing lamellae and, therefore, to systematically decrease the size of the resulting product particles.

In the illustration of FIG. 30, at low rates of reaction (lower region of parameter space of FIG. 30), more additive molecules are incorporated per unit area of the growing lamella, helping to keep them apart from one another. Increasing the rate of reaction (moving from the bottom to the top of the parameter space of FIG. 30) provides a means to systematically decrease the number of additive molecules incorporated per unit area of the growing lamellae and, therefore, to systematically increase the size of the resulting particles.

Accordingly, in certain embodiments, for a given molecular structure of the additive, some experimentation can be required to identify the concentration and corresponding rate of polymerization that gives the desired physical state of the product according to procedures herein described. In particular, following identification of a candidate rate of polymerization and concentration associated with a desired structure of the resulting ultra-high molecular weight polymer experiments can be performed to identify the specific concentration associated with the desired state. In this exemplary embodiment, the diagram in FIG. 30 can be used to guide the selection of experimental conditions and the interpretation of the results.

In various methods and systems herein described, combining monomers, the additive, and the catalyst with the solvent according to methods and systems herein described can be performed according to procedures that are identifiable by a skilled person.

For example, in some embodiments, combining the monomers, the additive, and the catalyst with the solvent can comprise preparing a solution of the additive in the solvent or preparing a solution of the additive and the catalyst in the solvent. Temperature can be adjusted to achieve a desired level of solubility of the additive and/or the catalyst in the solvent. In embodiments, where a solution of the additive in the solvent is prepared, the catalyst can be added thereafter, either before or after adjusting temperature if the temperature is adjusted. Following preparing the solution of additive and the catalyst, monomers can be added. In some embodiments where a solution of the additive and the catalyst is prepared, the monomers can be added thereafter following a possible adjustment of temperature.

In some embodiments, combining the monomers, the additive, and the catalyst with the solvent can comprise preparing a solution of the additive and the monomers and then adding the catalyst to the solution so prepared. In particular, catalysts suitable for those embodiments are radical initiators as will be understood by a skilled person.

In some embodiments, combining monomers, an additive and a catalyst with a solvent can be performed by providing two separate solutions of two different monomers, a first solution comprising a first solvent and a first monomer and the second solution comprising a second solvent and a second monomer, wherein the first solvent is immiscible with the second solvent. The method further comprises contacting the solutions to form a biphasic mixture where monomers can be contacted at the interface between the two liquid phases and the catalyst can be present in one of the two liquid phases, both of the liquid phases, or at the interface between the two liquid phases.

In some embodiments, a solution comprising the catalyst, the additive, and solvent is prepared followed by addition of monomers for polymerization.

In some embodiments, following preparing the solution of additive and the monomers, the catalyst can be added. The catalyst can be added dropwise as a solution, a suspension, a colloid, or can be added a solid.

Suitable catalysts that can be used for polymerizations according to the present disclosure can include but is not limited to a homogeneous catalyst, a surfactant-dispersed catalyst, and a nanoparticle-supported catalyst. The catalyst does not need to be homogeneous but it is usually capable of dispersion in solution.

In some embodiments the catalyst is a metal catalyst, wherein the wording "metal catalyst" indicates a class of catalysts that uses a complex that has a metal atom including but not limited to iron, copper, titanium to carry out the polymerization reaction. Exemplary catalysts suitable in methods and systems herein described are Ziegler-Natta titanium catalysts, metallocene, post-metallocenes catalysts activated by MAO and other industrially used catalysts identifiable by a skilled person. "Organocatalyst" indicates the molecule that increase the rate of chemical reaction and are composed of the elements carbon, hydrogen and sulfur and other non-metal compounds found in organic molecules. Organometallic catalyst indicates the molecule that increases the rate of chemical reaction and is composed of the elements carbon, hydrogen and sulfur, and other non-metal compounds found in organic molecules, and has at least one metal moiety.

In some embodiments the catalyst is a surfactant dispersed catalyst, wherein a "surfactant-dispersed catalyst" indicates the situation where the catalyst interacts with a surfactant to remain in the reaction medium but does not interact in way that alters its reactivity. Exemplary surfactant dispersed catalysts comprise metal catalyst, organocatalyst, or organometallic catalyst, and can be a single site catalyst. The surfactant-dispersed catalyst can comprise a micelle such as structure a micelle (4) or a reverse micelle (5) or structure and (6) of FIG. 1 wherein the catalyst is the surfactant itself such as 6.

In some embodiments the catalyst is a nanoparticle supported catalyst, wherein a nanoparticle-supported catalyst can comprise a nanoparticle attached to a catalyst, a nanoparticle encompassing a catalyst, or a nanoparticle surrounding a catalyst as illustrated in (1), (2) and (3) of FIG. 1, respectively. The nanoparticle-supported catalyst can be a metal catalyst, organocatalyst, or organometallic catalyst, and can be a single site catalyst.

In some embodiments, the additive can be present at a concentration of 1% or less with respect to solvent.

In some embodiments, the additive can be selected from the group consisting of: block copolymer, graft copolymer, statistical copolymer and gradient copolymer. In some of those embodiments, the copolymer is a statistical copolymer comprising 90% or more repeat units that are the same as those of the polymer to be synthesized. In some embodiments, the copolymer has a molar mass between about 1000 and about 100,000 g/mol.

In some embodiments, the colloidal suspension comprises co-crystallized particles of the additive and the ultra-high molecular weight polymer are less than 100 microns in size.

In some embodiments, the additive is present in amount ranging from 1-50% by weight with respect to total mass of the ultra-high molecular weight polymer comprised in the colloid suspension.

In some embodiments, the additive and the catalyst with the solvent exemplary of an industrial scale preparation of a nascent polymer can comprise using a continuous-stirred tank reactor (CSTR). In terms of chemical reactions, CSTR can provide a continuous flow of reactants and products. A CSTR can be adapted to combine the monomers, the additive and the catalyst in a set order and at a set rate of addition of the additive, the catalyst, and/or the monomers. The temperature of a CSTR can be adjusted to achieve a desired effect on solubility and/or rate of polymerization. In particular, in some embodiments, polymerization reaction and additive concentration can be selected to minimizing increase of the viscosity and in particular preventing the viscosity from increasing to an unacceptable level e.g. level associated with fouling of the reactor.

In some embodiments, ultra-high molecular weight polymer formed by methods herein described are born in solution and transition to a colloid with controlled morphology which is maintained following further processing when precipitated, blended, filled, or subjected to other processing operations identifiable by a skilled person.

In some embodiments, the ultra-high molecular weight polymer thus formed in solution can be filtered and a filtrate collected, the filtrate comprising the nascent polymer co-crystal. Exemplary ultra-high molecular weight polymers obtainable with the method herein described comprise ultra-high molecular weight polyethylene, ultra-high molecular weight isotactic polypropylene, ultra-high molecular weight polylactide and various ultra-high molecular weight thermoplastic polymers.

In particular, in some embodiments, methods herein described further comprise filtering the colloidal suspension and collecting a solid filtrate, the solid filtrate comprising the polymer. In some embodiments, methods herein described further comprise separating some of the solvent from the colloidal suspension and collecting the desired ultra-high molecular weight suspension at a desired concentration.

The terms "ultra-high molecular weight polyethylene" and "UHMW-PE" as used herein are defined to mean a thermoplastic polyethylene polymer with an average molecular weight above approximately $1.5 \times 10^6$ g/mol.

The terms "high-density polyethylene" and "HDPE" as used herein are defined to mean a conventional thermoplastic polyethylene polymer with an average molecular weight between approximately $2.5 \times 10^5$-$5.0 \times 10^5$ g/mol and a sufficiently low degree of short chain branching to attain a high crystallinity (hence, a high density) in the solid state.

The term "thermoplastic polymer" as used herein is defined to mean a polymer material which can become malleable upon heating and solidify upon cooling, thus allowing the polymer material to be remolded.

In particular, in several embodiments the ultra-high molecular weight polymer can comprise polyurethane, polyethylene, polycarbonate, polyesters, nylons, polypropylene, polystyrene, PET, polyacrylonitiles, polybutadiene, polyethers, and polybutylene and any derivative thereof but are not limited to such. See, for example, polymers (10)-(13), and (26).

In particular, in several embodiments the ultra-high molecular weight polymer can comprise polyethylene, polypropylene, polystyrene, poly-1-butene and polylactide and any derivative thereof but are not limited to such. See, for example, polymers (10)-(13), and (26).

In several embodiments the ultra-high molecular weight polymer can also comprise a syndiotactic polymer such as syndiotactic polypropylene (see also e.g. polymers (16), (20), (24)) or an isotactic polymer such as isotactic polypropylene (see also e.g. polymers (15), (19), (23)) derived from monomers having diastereotopic faces (see monomers e.g. (2) and (3), for example). As is usually the case for synthesis of ultrahigh molecular weight polymers, the ultra-high chains have sufficient stereo-regularity to crystallize as the chain grows, so that the viscosity of the reaction medium remains low. In the present disclosure, the crystallization of the growing chains also co-crystallizes the additive to keep the catalyst and newly-formed polymer dispersed in the reaction medium.

In several embodiments, the ultra-high molecular weight polymer obtainable by the methods and systems herein described comprise a semiscrystalline nanocomposite where crystal forming moieties of an additive are incorporated in the polymer crystal and colloid stabilizing moieties of the additive interact with a solvent. In some embodiments the resulting nanocomposite typically maintains the high crystallinity of the synthesized polymer. The lamellar crystals of ultra-high molecular weight polymer are covered by a conformal layer of the solvophilic moieties of the additive and are anchored to the crystal by cocrystallization of their crystal-philic moieties into the crystal. Therefore, the solvophilic moieties can be selected to confer desired properties in materials produced by subsequent compounding using the nascent particle. For example, when the nascent particles are made for the purpose of blending with another polymer or polymers, the solvophilic domain of the additive can be designed to serve as a compatilibizer (see below).

In several embodiments, production of the polymer with the desired structure is followed by separating the nascent polymer from the solution. The separation can comprise adding a precipitating and/or flocculating additive to the solution, such as a solvent, followed by performing a filtration to collect the precipitate, the precipitate comprising nascent polymer. Additives that can be used for precipitating and/or flocculating can include methanol and acetone or can be selected based on the difference in solubility between the reaction medium and the precipitation agent due to difference in density, and/or polarity as will be understood by a skilled person.

In some embodiments, the colloidal suspension from the polymerization reactor can be conveyed into a subsequent process to separate most of the solvent from the polymer product (often to recycle the solvent to the polymerization reactor). In some of those embodiments, an additive can be selected to exert kinetic control of particle size as will be understood by a skilled person. A person with skill in the art of industrial-scale solution polymerization can evaluate the residence time and residence time distribution of the fluid in the polymerization reactor. In one embodiment, the additive is used to delay aggregation so that the desired average particle size is reached in a time approximately equal to the mean residence time to be used in the reactor. Further increase in particle size later in the process can occur on a much longer timescale using, for example, a settling tank.

In some embodiments, the colloidal suspension from the polymerization reactor can be conveyed into a subsequent process to separate most of the solvent from the polymer product (often to recycle the solvent to the polymerization reactor). Therefore, a skilled polymer chemist can use the additive to exert kinetic control of particle size. A person with skill in the art of industrial-scale solution polymerization can evaluate the residence time and residence time distribution of the fluid in the polymerization reactor. In one embodiment, the additive is used to delay aggregation so that the desired average particle size is reached in a time approximately equal to the mean residence time to be used in the reactor. Further increase in particle size later in the process can occur on a much longer timescale using, for example, a settling tank. Thus, the procedures described in the following paragraphs can be applied with respect to the time scale of the polymerization reaction and knowledge of the kinetics of the polymerization reaction. For example, for a given catalyst, monomer feed rate, solvent and temperature (low enough that the newly formed chains crystallize as they grow), in the absence of the additive the product begins to precipitate at time $t_1$ and the chains reach the desired ultrahigh molecular weight at time $t_2$. The sample observation time for the following experiments must be between $t_1$ and $t_2$. In particular, the residence time in a reactor operating at the specified conditions will be near $t_2$ such that the product attains the desired molecular weight. Therefore, for example the evaluations of particle size can be performed at a time near $t_2$ with the understanding that the particle size can continue to grow with time after $t_2$. Thus, the procedures described herein, with particular reference to the discussion of Table 2 and FIG. 30 can be applied in some embodiment with respect to the time scale of the polymerization reaction and knowledge of the kinetics of the polymerization reaction. In particular, suitable conditions in the parameter space shown in FIG. 30 indicates represent a band that includes some combinations of relatively slow reaction rate and low additive concentration and some combinations of relatively fast reaction rate and relatively high additive concentration. The following experimental guidelines can be used to find suitable combinations of additive structure and reactor conditions that give a desired particle size, anticipating that the present disclosure can be applied to catalysts and ultra-high molecular-weight polymers that have yet to be discovered.

In some embodiments, the co-crystallization of the additive and the nascent polymer spontaneously forms a colloidal stabilizing layer that delays aggregation or precipitation until it is desired.

The particle size of the dispersed ultra-high molecular weight polymer can be controlled using the method described above. Therefore, the ultra-high molecular weight polymer can be made suitable for subsequent blending and compounding as will be understood by a skilled person. For example, applications comprise compounding ultra-high molecular weight polymer with filler particles (e.g. producing highly filled ultra-high molecular weight polymer); formulating coatings with ultra-high molecular weight polymer; producing polymer blends with ultra-high molecular weight polymer; using ultra-high molecular weight polymer as an additive to tailor processing characteristics; and using UHMW Polymer particles as the rigid phase in composites. The amount of the UHMW polymer to be added to the blend can affect the properties of the blend. A skilled person would be able to determine a suitable ratio depending on a desired property of the blend.

In particular, in some embodiments, the ultra-high molecular weight polymer can be subjected to blending. In particular, a method for blending the nascent polymers comprises mixing the colloidal solution of nascent polymer obtained by any of the disclosed methods with another solution comprising a polymer. Combining the two solutions can comprise adjusting temperature of the solutions, concentration of the solutions, rate of mixing of the solutions, and/or providing reagent in one or both of the solutions to provide solution miscibility if necessary. In some embodiments, a solid or liquid polymer can be added directly to the colloidal solution of nascent polymer.

In some embodiments, following formation of the colloidal suspension of ultra-high molecular weight polymer, another polymerization can be performed directly in the colloidal solution of nascent polymer to provide a polymer blend depending on the catalysts used as it will be understood by a skilled person.

In some embodiments, blending of the colloidal solution comprising nascent polymer with another polymer or polymer solution can provide a uniform polymer blend.

In some embodiments, the colloidal solution comprising nascent polymer can be added to other mixtures. For example, the colloidal solution comprising a nascent polymer can be added to paints or coating formulations further comprising other components. The blending can comprise adding an amount of the colloidal solution comprising nascent polymer under conditions to provide a uniform mixture. Blending can comprise adding the amount of nascent powder with solvent removed to under conditions to provide a uniform mixture.

In several embodiments additional components of compositions and in particular solutions comprising the ultra-high molecular weight polymers herein described in particular when within a colloidal suspension herein described, comprise antiadherents, binders, coatings disintegrants, fillers, colors, glidants, lubricants, preservatives, and sorbents.

In some embodiments, the colloidal solution comprising nascent polymer can be added to other mixtures. For example, the colloidal solution comprising nascent polymer can be added to paints or coating formulations. The blending can comprise adding an amount of the colloidal solution comprising nascent polymer under conditions to provide a uniform mixture. Blending can comprise adding the amount of nascent powder with solvent removed to under conditions to provide a uniform mixture.

Thus in some embodiments, the colloidal suspension comprising nascent polymer can be added to other mixtures, solutions, and/or formulations or the mixtures, solutions, and/or formulations can be added to the colloidal solution comprising nascent polymer. For example, colloidal suspension of a ultra-high molecular weight polymer herein described can be mixes with colorant and/or filler incorporated in the suspension.

In particular, in some embodiments, the ultra-high molecular weight polymer can be used in method comprising mixing the desired ultra-high molecular weight suspension at a desired concentration with another polymer. In some embodiments, the ultra-high molecular weight polymer can be used in method comprising mixing the desired ultra-high molecular weight suspension at a desired concentration with solid particles. In some embodiments, the ultra-high molecular weight polymer can be used in method comprising coating the desired ultra-high molecular weight suspension at a desired concentration onto a substrate. In some embodiments, the ultra-high molecular weight polymer can be used in method comprising spray drying the desired ultra-high molecular weight suspension at a desired concentration and collecting the solid particles. In some embodiments, the ultra-high molecular weight polymer can be used in method comprising mixing the colloid suspension with a different monomer to produce a second polymer using the catalyst present in the colloidal suspension. In some embodiments, the ultra-high molecular weight polymer can be used in method comprising mixing the colloidal suspension with a second polymer solution, precipitating the UHMW polymer with the second polymer and collecting the solid.

In some embodiments colloidal suspension obtained with methods and systems herein described can be used in applications wherein processing difficulties are usually associated with ultra-long polymers due for example to a very high viscosity of the produced polymer and, achievement of colloid stability can be desired. In those embodiments, obtaining ultra-high molecular weight polymer particles with a controlled size and in particular with a reduced size can be desirable. Reference is made in particular, to applications wherein the blending and/or compounding of a resulting ultra-high molecular weight polymer is desired, wherein Particle sizes in the range of from about 0.1 to about 10 microns can be desirable.

In some embodiments, a colloid that's marginally stable can be desirable. For example, a colloid that comprise ultra-high molecular weight polymer particles that precipitate after a controlled time can be desired to apply a ultra-high molecular weight polymer onto particles that then become compacted into a solid with other components such as fillers (e.g. concrete comprising a filler and the ultra-high molecular weight polymers according to proportions identifiable by a skilled person). Additionally, a colloid wherein the ultra-high molecular weight polymer particle precipitate after a controlled time can be also desired in applications where a ultra-high molecular weight polymer is to be mixed with pellets and precipitation of the ultra-high molecular weight polymer at the bottom of a reactor to minimize the amount of ultra-high molecular weight polymer that is carried in the solvent is desired.

In some embodiments, maintenance of the ultra-high molecular weight polymer particles in the colloid is desirable and therefore a more stable colloid is desired. For example, in applications where the ultra-high molecular weight polymer is to be coated onto paper a stable colloidal suspension of the ultra-high molecular weight polymer can be desired to ease coating operations.

Figure 31:
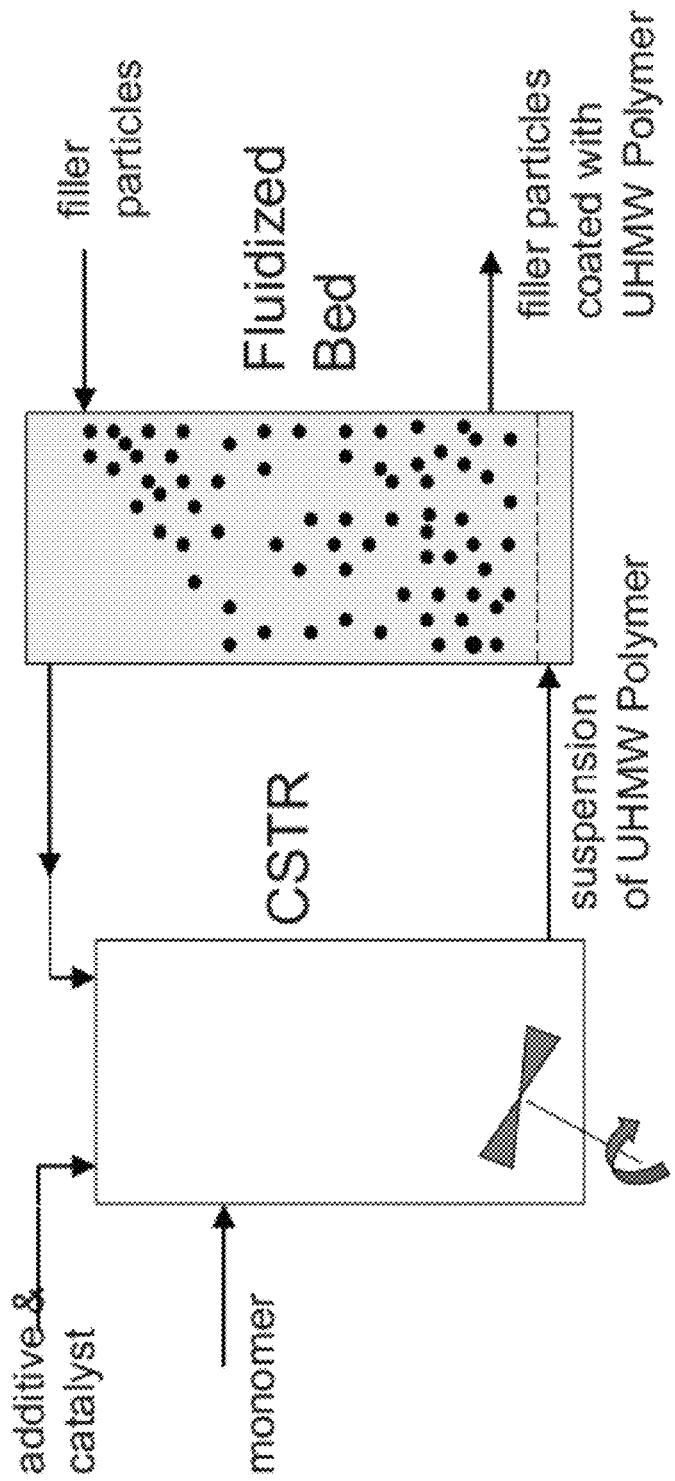
FIG. 31 shows a schematic of a method for preparing a highly filled UHMW polymer using a CSTR reactor.

In some embodiments, a highly filled the ultra-high molecular weight polymer can be prepared. FIG. 31 shows an exemplary method for how the highly filled the ultra-high molecular weight polymer can be prepared using a CSTR reactor. An additive, catalyst, and monomers can be fed into a CSTR reactor to form a suspension of an the ultra-high molecular weight polymer. The CSTR is coupled to a fluidized bed comprising filler particles. In this schematic, the fluidized bed is coupled to the CSTR in two places allowing filler particles from the fluidized bed to flow into the CSTR reactor through the first coupling and allowing the suspension of the ultra-high molecular weight polymer to flow into the fluidized bed in a though a second coupling. This flow is continued until the ultra-high molecular weight particles are coated with the ultra-high molecular weight polymer.

Figure 32:
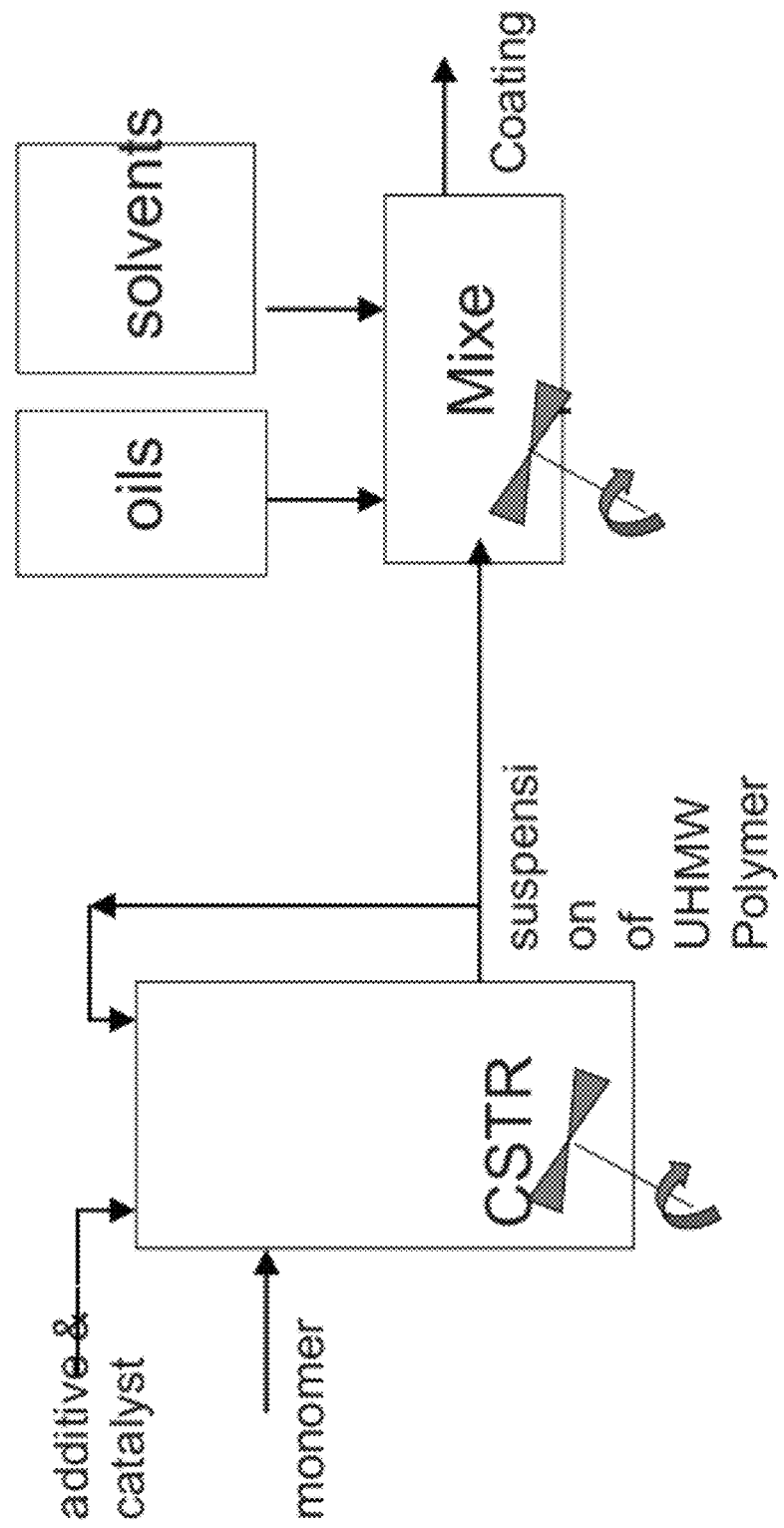
FIG. 32 shows a schematic of a method for preparing formulating coating with an UHMW polymer using CSTR reactor and a mixer.

In some embodiments, formulating a coating with an ultra-high molecular weight polymer can be performed. FIG. 32 shows an exemplary method for formulating a coating. An additive, catalyst, and monomers can be fed into a CSTR reactor to form a suspension of an ultra-high molecular weight polymer which is coupled to a mixer allowing the ultra-high molecular weight polymer to be fed into the mixer. The mixer is further coupled to a source of oils and to a source of solvents allowing the oils and solvents to be fed into the mixer along with the ultra-high molecular weight polymer. Mixing of the three components can be performed in order to provide a coating.

Figure 33:
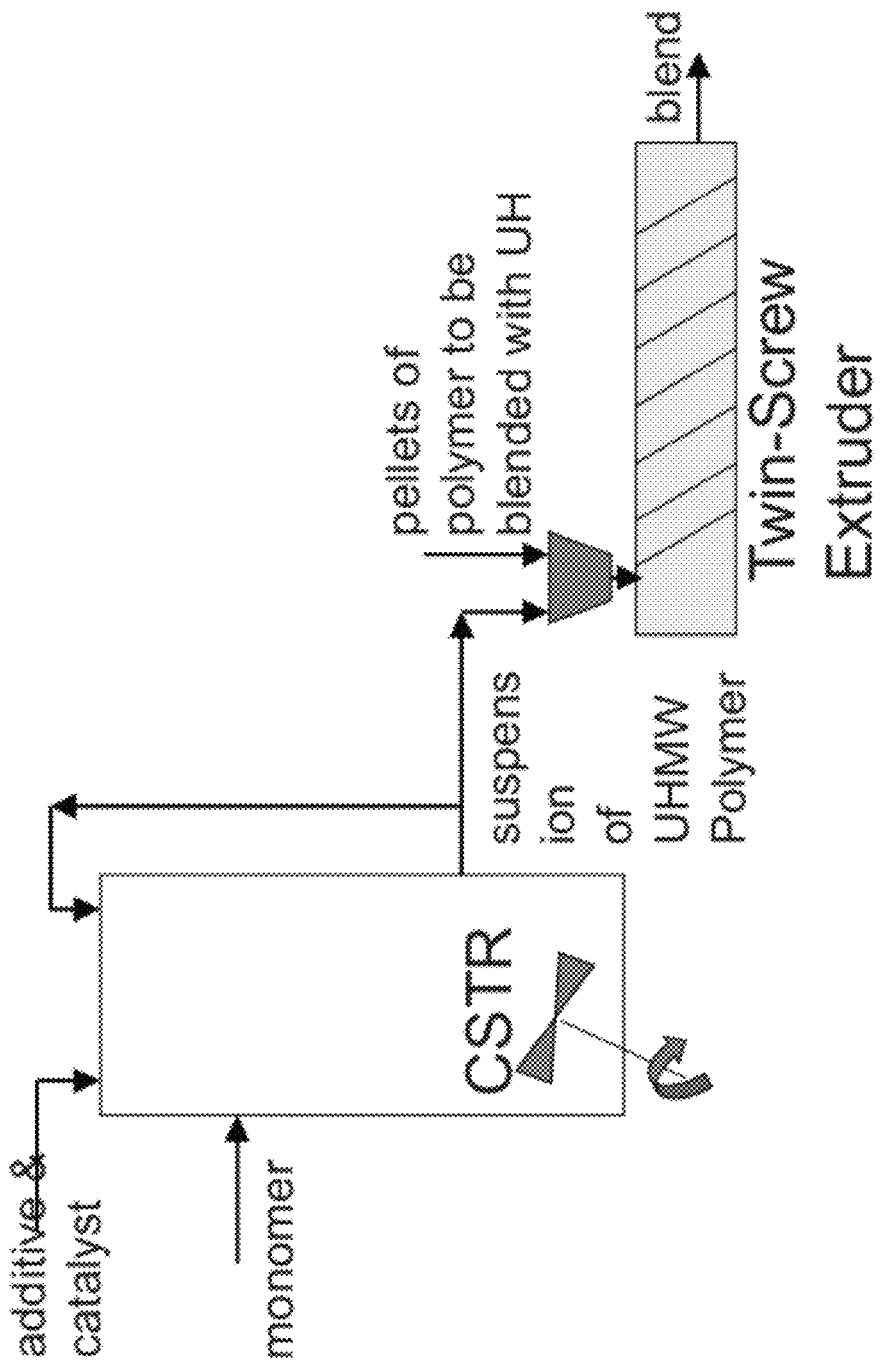
FIG. 33 shows a schematic of a method for preparing polymer blends with an UHMW polymer using a CSTR reactor and twin-screw extruder.

In some embodiments, a polymer blend can be prepared with an ultra-high molecular weight polymer. FIG. 33 shows an exemplary method for how to prepare polymer blend. An additive, catalyst, and monomers can be fed into a CSTR reactor to form a suspension of an ultra-high molecular weight polymer. The CSTR is coupled to twin-screw extruder which allows the ultra-high molecular weight suspension to be fed into the twin-screw extruder. Pellets of a polymer to be blended with the ultra-high molecular weight polymer are also fed into the twin-screw extruder and the blend is thus prepared.

Figure 34:
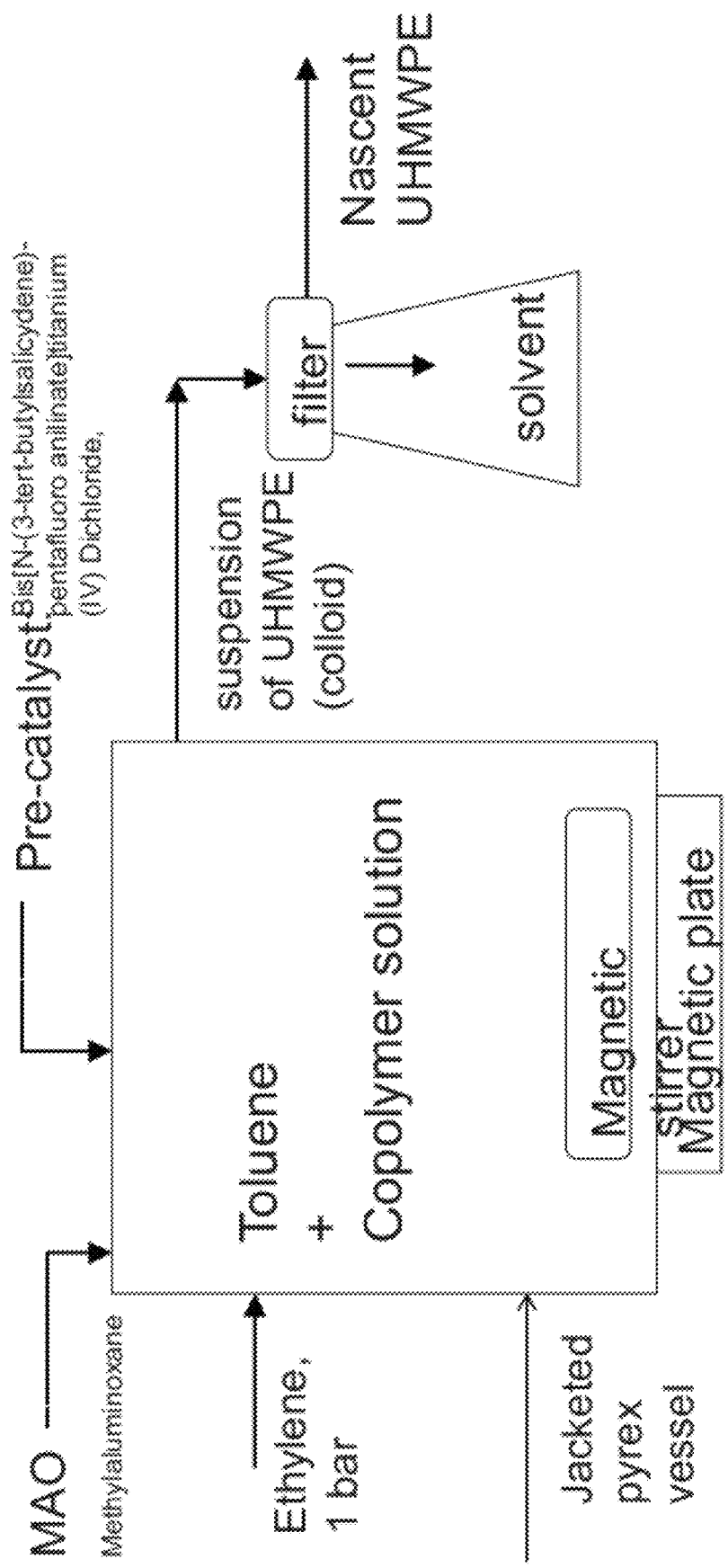
FIG. 34 shows a schematic of a method for preparing UHMW-PE polymers in the presence of a copolymer additive to obtain nascent UHMW-PE.

FIG. 34 shows a schematic of a method for preparing ultra-high molecular weight polymers in the presence of a copolymer additive to obtain nascent UHMW-PE according to some embodiments. A solution comprising toluene and a copolymer is prepared in a jacketed pyrex vessel equipped with a magnetic stirrer and placed on a magnetic stir plate. A precatalyst, MAO, and ethylene are fed into the vessel in a particular order and a polymerization reaction is allowed to proceed under particular conditions. A colloidal suspension of ultra-high molecular weight polyethylene thus obtained can be filtered to provide a solid comprising nascent ultra-high molecular weight polyethylene.

A further description of an exemplary methods systems and compositions herein described is further provided with reference to Ultra High Molecular Weight Polyethylene (UHMW-PE). A skilled person will be able to identify the necessary modifications to adapt the description to other polymers and other controlled structure in accordance with the present disclosure.

Ultra High Molecular Weight Polyethylene (UHMW-PE) is a thermoplastic polymer which can be challenging to process and blend with other polymers. In particular UHMW-PE can be challenging to process and blend in various application due to its high viscosity. Methods for preparing UHMW-PE can lead to intractable materials which can hinder such processing and blending.

In some embodiments, ultra-high molecular weight polyethylene (UHMW-PE) can be prepared as a dispersion in solution, the dispersion being amenable to further processing of the UHMW-PE thus obtained, such as blending with other polymers. Methods for blending the UHMW-PE obtained by said method are also provided. Further, embodiments of the present disclosure describe UHMW-PE and UHMW-PE blends obtainable by the disclosed methods.

A polymerization of ethylene can be used to prepare UHMW-PE. Defect-free UHMW-PE chains grow at a molecular weight in the order of a million in a few minutes using living a single-site catalyst polymerization. At atmospheric pressure and without additive, the synthesis is performed at room temperature or lower such that UHMW-PE crystals precipitate out of solution once they reach a MW of ~200 000 g/mol but keep growing until the reaction is stopped by deactivating the catalyst.

Without the additive, there are two phases present in the reactor; after the polyethylene chains start to precipitate out of solution, they aggregate at the bottom of the reactor.

For a single polyethylene chain of MW $2 \times 10^6$ g/mol, the volume of the monomolecular crystal is given by:

$$V_{CRYSTAL} = \left(\frac{MW}{N_A}\right) \times (\text{density}) \approx \left(\frac{2 \times 10^6 \text{ g/mol}}{6 \times 10^{23} \text{ \#/mol}}\right) \times \left(\frac{1 \text{ cm}^3}{1 \text{ g}}\right) \times \left(\frac{10^7 \text{ nm}}{1 \text{ cm}}\right)^3 = 3.33 \times 10^3 \text{ nm}^3$$

Using a crude approximation of that each crystal is a cube, the above calculation gives that each face of the crystal is a ~15 nm. The dimensions of a visible particle in the aggregate after the polymerization can be approximated as 200 µm×200 µm×0.1 µm and having a volume of 4000 µm³, which is $10^9$ greater than the volume of a single crystal. Even if the visible particles comprise only 1% UHMWPE, each visible particle can have approximately $10^7$ UHMW-PE molecules. The large aggregates are difficult to subsequently blend with other polymers or fillers. Therefore, the inventive method is used to prevent the formation of such large aggregates.

The terms "lamellae" and "lamella" as used herein are defined to mean a gill-like structure comprising, for example, thin layers or sheets of material adjacent to one another.

In order to achieve molecular dispersion of the UHMW-PE, embodiments of the present disclosure provide a system where precipitation can be suppressed by having a soluble ethylene copolymer present during polymerization. This can allow crystallizable segments of the copolymer co-crystallize (i.e. to be included in the crystal growth front) or the entire copolymer molecules act as an inclusion by having the UHMW-PE crystal grows around them. An exemplary formation of a copolymer co-crystal with UHMW-PE is illustrated in Example 7.

In either case the copolymer can act as a brush of non-crystallizable material where the short chain branches can prevent UHMW-PE crystals from precipitating and forming large aggregates. Hence, the copolymer chains can act as colloidal stabilizers to keep single UHMW-PE crystals separated from each other as observed for example in the results reported in Example 2.

Thus the presence of a copolymer during the polymerization of ethylene can prevent flocculation of growing polyethylene chains and allow polyethylene chains to grow independently of one another to their ultimate length. An exemplary successful growth of polyethylene to form UHMW-PE is illustrated in Examples 5-6.

In some embodiments, ethylene gas is polymerized by preparing a mixture comprising a solvent, a homogeneous polymerization catalyst (or a precatalyst and a precatalyst activator) and a copolymer additive, then bubbling the monomer gas through it. The polymerization can be allowed to proceed until UHMW-PE is formed to provide a colloidal suspension comprising a UHMW-PE as a dispersion. Separation of the colloid from the suspension can then provide an isolated sample of nascent UHMW-PE crystals. A separation, for example, can comprise filtration and removal of solvent through evaporation.

In some embodiments, an ethylene polymerization can be performed in the presence of a copolymer additive which can prevent flocculation and allow preparation of a dispersion UHMW-PE which can be amenable to further processing, such as blending with other polymers. A method for blending UHMW-PE prepared by this method is also described.

A polymerization of ethylene in the presence of a copolymer is now described with reference to FIG. 3B. As the polyethylene chains grow during polymerization, compatible portions of a copolymer additive chains can co-crystallize along growing polyethylene chains as shown schematically in FIG. 3B. For example, a compatible portion of copolymer can be a portion of the copolymer without branching than can effectively overlap with and interact with, for example, by way of intermolecular attractions, and thus crystallize with portions of a polyethylene chain. This process can form the "polymer brush" as incipient nanocrystals grow. The "polymer brush" can prevent co-crystallization among UHMW-PE chains and allow dispersion of the growing polyethylene chains in the colloidal solution.

Figure 3A:
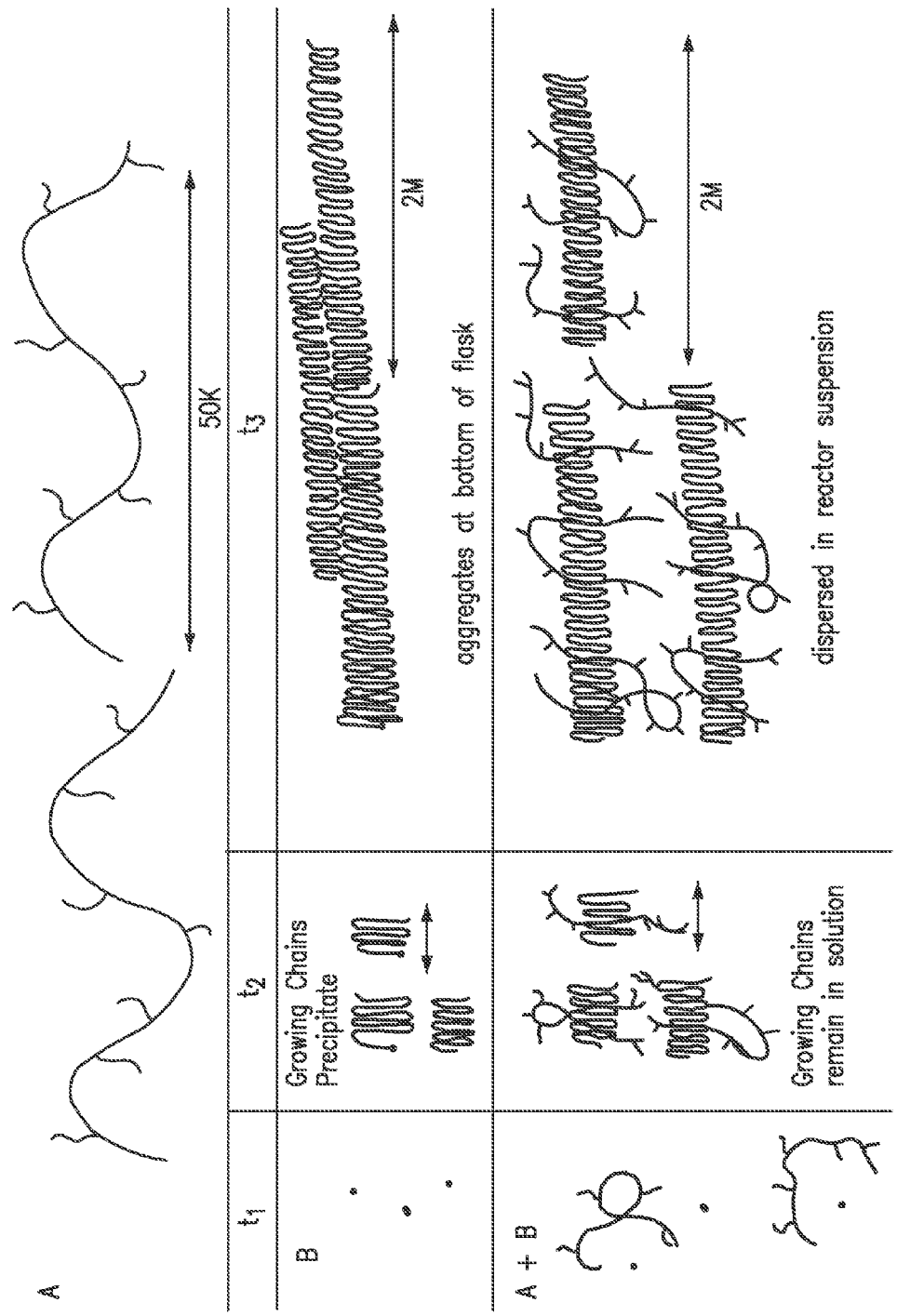
FIG. 3A shows a schematic representation of a progression of a first polymerization reaction to form ultra-high molecular weight polyethylene which is performed without an additive (panel 1) and a second polymerization reaction to form an ultra-high molecular weight polyethylene which is performed with an additive (panel 2).
Figure 3B:
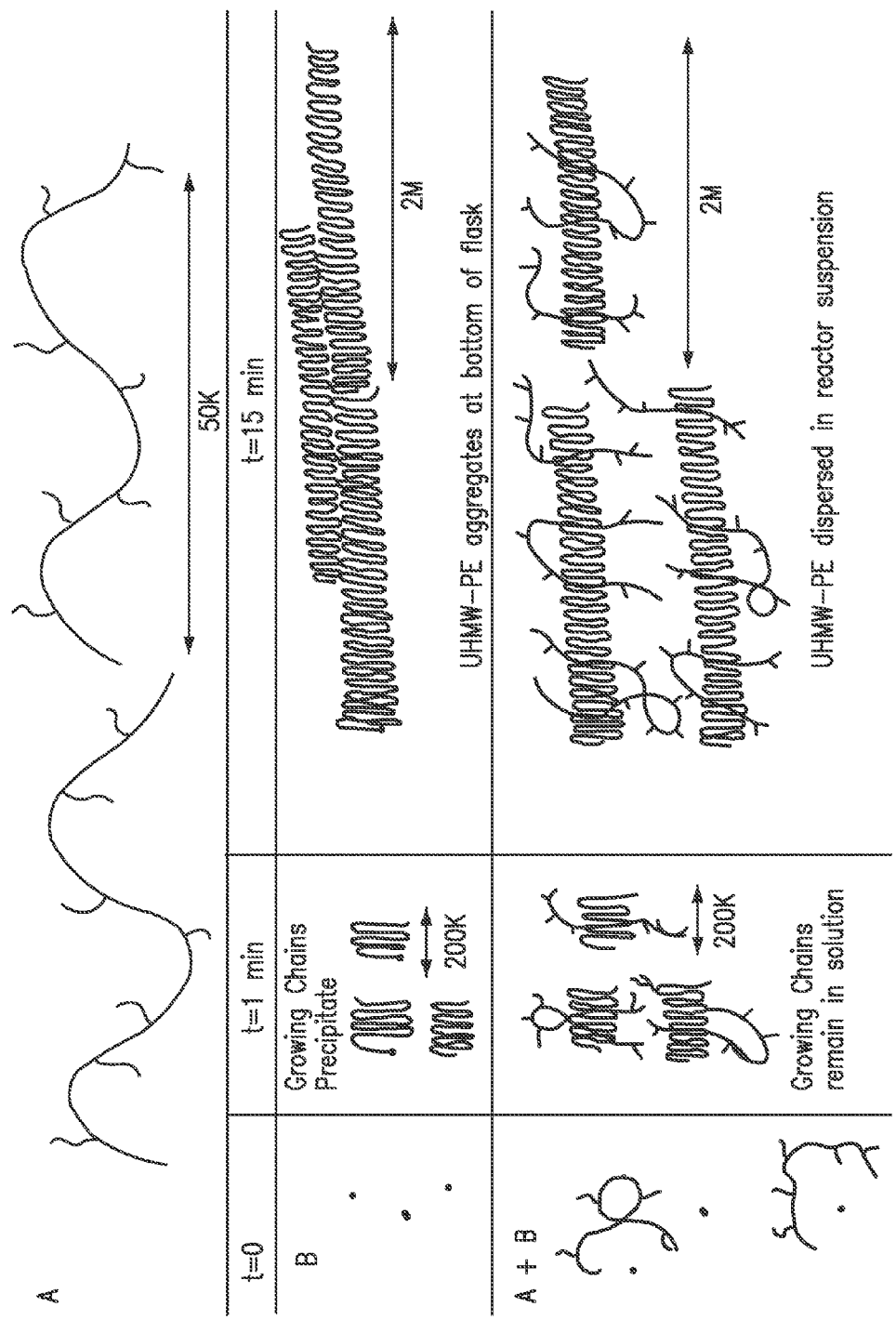
FIG. 3B shows a schematic representation of a progression of a first polymerization reaction to form an ultra-high molecular weight polymer which is performed without an additive (panel 1) and a second polymerization reaction to form an ultra-high molecular weight polymer which is performed with an additive (panel 2).

FIG. 3B (top) shows schematically, the molecular structure of an additive copolymer with short chain branching (e.g., due to butene copolymer). For example, an additive with 2% butene content and an overall molecular weight of approximately $5 \times 10^4$ g/mol is used in some of the examples that follow. FIG. 3B (lower half) shows, in the first column (at t=0), dots which represent catalyst prior to polymerization. The first row illustrates a conventional polymerization without additive and the second row illustrates the initial state with catalyst and additive present. The second column (at t=1 min.) shows growing polyethylene chains: the first row shows how they stick to each other in a conventional polymerization; the second row shows how the cocrystallization protects the surface of the lamella with a polymer brush that repels other lamellae. The third column (at t=15 min., when the time UHMW-PE chains have a molecular weight of approximately $2 \times 10^6$ g/mol) shows that in the conventional method (first row) UHMW-PE aggregates are large and fall to the bottom of a reaction flask; in the second row, cocrystallization with the additive inhibits aggregation and the particles are small enough to remain in suspension.

FIG. 3A shows a schematic representation of a progression of ultra-high-molecular weight a first polymerization which is performed without and additive (panel 1) and a second polymerization which is performed with an additive (panel 2). The additive is shown as (A). Progress of the polymerization reactions over time is indicated from left to right across the panels. The first panel of FIG. 3A shows a catalyst (B) present at $t_1$ (column 1, panel 1). A monomer feed is introduced after $t_1$ and at $t_2$ a polymer chain begins to grow on the catalyst and begins to precipitate (column 2, panel 1). At $t_3$, the precipitating polymer chains begin to aggregate at the bottom of a reaction (column 3, panel 1). The second panel of FIG. 3A shows a catalyst (B) and an additive (A) present at $t_1$ (column 1, panel 2). A monomer feed is introduced after $t_1$ and at $t_2$ a polymer chain begins to grow on the catalyst and does not precipitate (column 2, panel 2). At $t_3$ (column 3, panel 2), the polymer chains remain dispersed in the reactor.

The copolymer can be selected based on properties including, but not limited to chemical inertness to components of the mixture, solubility in the mixture, an amount of copolymer used in the polymerization, and structure of the copolymer.

Solubility of the copolymer can be controlled by structure of the copolymer, type of medium in which the copolymer is to be dissolved, temperature of the medium in which the copolymer is to be dissolved, and concentration of the copolymer. Example 2 shows an exemplary use of copolymer structure, type of medium and temperature of medium to control copolymer solubility.

The amount of copolymer that is present during polymerization can be used to control the dispersion of the incipient polyethylene nanocrystals and overall structure of the resulting co-crystals. In the exemplary embodiments showing polyethylene co-crystals, the amount of copolymer ranges from 0-40% by weight with respect to total mass of the solid polymer thus obtained. Exemplary illustration of the effect of weight % of the copolymer used is discussed in Example 3.

Figure 35:
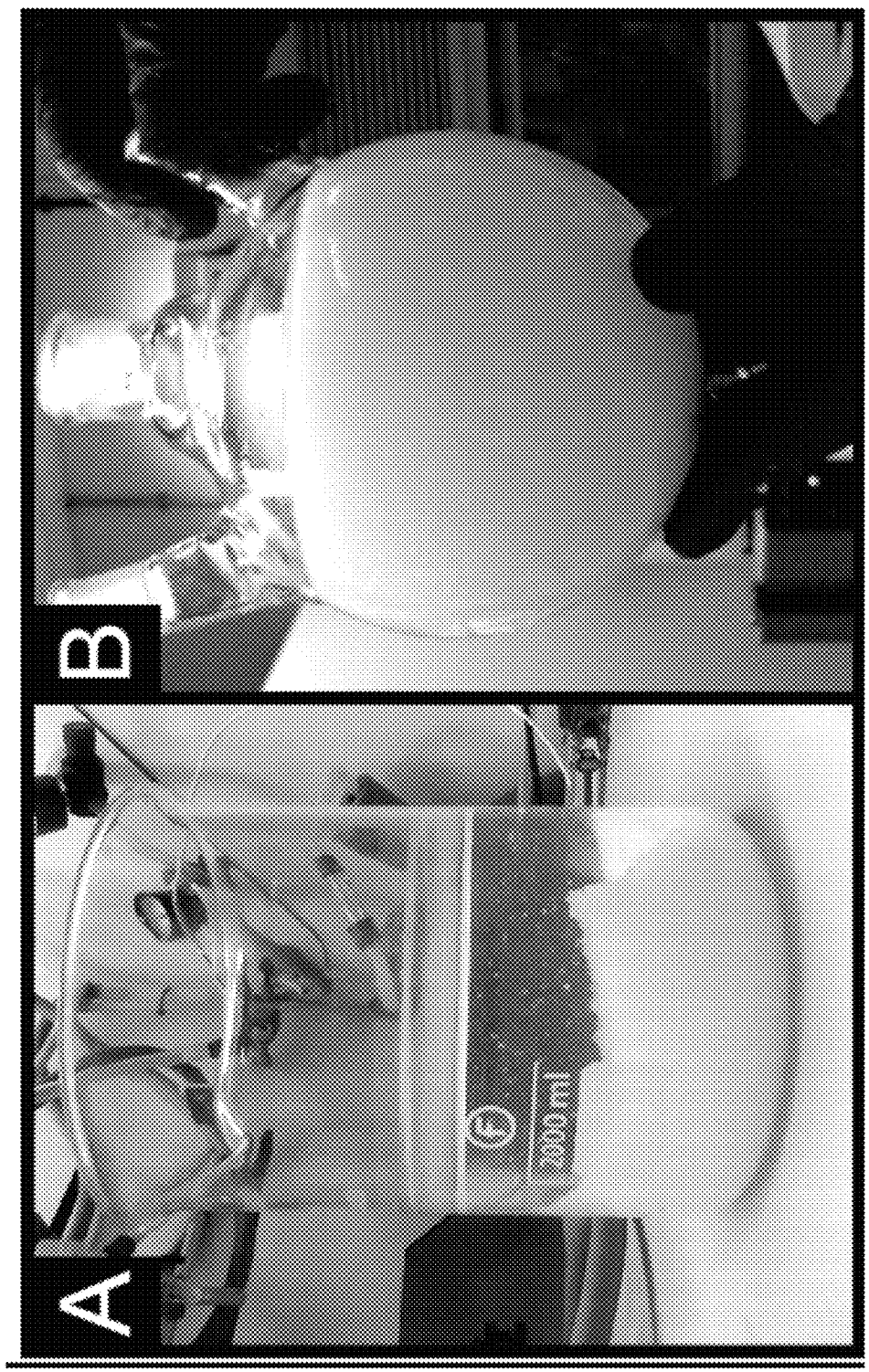
FIG. 35 shows out of reactor photos A and B for a polymerization reaction to form ultra-high molecular weight polyethylene which is performed without an additive (A) and a polymerization reaction to form an ultra-high molecular weight polyethylene which is performed with an additive (B).

Dispersion of incipient polyethylene nanocrystals can be observed visually as a milky suspension. Aggregation of polyethylene chain would otherwise provide flocculation and thus a two-phase system could be observed. Both dispersion and aggregation can be seen in Examples 1 and 2, respectively. FIG. 35 shows out of reactor photos A and B for two polymerization reactions to form ultra high molecular weight polyethylene (UHMW-PE). One polymerization reaction was performed without an additive (A) and the photo shows aggregation of the UHMW-PE crystals formed in the reaction. The other polymerization reaction to form UHMW-PE was performed with an additive (B). The additive in (B) was an ethylene-co-butene copolymer (EB-5). Photo (B) shows a colloidal suspension comprising UHMW-PE that is obtained by performing the polymerization with an additive. FIG. 35 is exemplary a change in physical state that can be observed in nascent UHMW-PE that is prepared with and without an additive.

The copolymer according to some embodiments can comprise two or more different alkene monomers, for example, an ethylene-co-butene copolymer. However, other mixed alkene copolymers can be used. For example, the alkenes monomers can include, but is not limited to straight chain or branched alkenes, ranging from 2-19 carbons. In particular, once the alkene has more than 19 carbons, it' a wax which is solid at room temperature but it may or may not soluble in an organic reaction solvent at different temperatures.

Classes of copolymers that can be used include, but are not limited to, block copolymers, graft copolymers, alternating copolymers, statistical copolymers, gradient copolymers, and periodic copolymers. The copolymers can comprise two different repeating monomer units or more than two different repeating monomer units.

For example, if ethylene and butene are selected as monomers of the copolymer, the copolymer can have the monomers arranged as any of the above-mentioned classes of copolymer (i.e. block, graft, alternating, statistical, gradient, or periodic).

The selection of monomers that comprise the copolymer can be used to control the degree of branching of the resulting copolymer while the class of copolymer (i.e. block, graft, alternating, statistical, gradient, or periodic) can be used to control the distribution of the branching along the copolymer chain. In some embodiments, the copolymer comprises between 0-10% short chain branching.

The degree of branching, the distribution of the branching and the molecular weight of the copolymer can be used to control the ability of the copolymer to crystallize with a growing polyethylene chain, the weight % of the polymer that will crystallize with a growing polyethylene chain, and the solubility and dispersion of the resulting crystallites (mean microscopic crystals) in the mixture. A branched moiety on an additive or copolymer will not crystallize with polyethylene but can act a solvohphilic moiety. In some embodiments, the molecular weight of the copolymer is between 0-100 kg/mol.

In some embodiments, polymer blends of UHMW-PE can be obtained by polymerization in the presence of a copolymer. In some of those embodiments, nascent UHMW-PE prepared by polymerization in the presence of a copolymer is amenable to further processing such as blending with other polymers. For example, ethylene gas can be polymerized in the presence of a solution comprising a polymerization catalyst (or a precatalyst and a precatalyst activator) and a copolymer by preparing a mixture comprising a solvent, a homogeneous polymerization catalyst, ethylene, and a copolymer. The dispersion comprising UHMW-PE thus obtained can be combined with another polymer. For example, a homogeneous solution comprising a polymer can be combined with the dispersion comprising UHMW-PE to provide copolymer blends. A solution comprising the copolymer blend can be filtered and a filtrate collected, the filtrate comprising a solid copolymer blend.

The disclosed method of preparing UHMW-PE and UHMW-PE blends can be amenable to industrial scale synthesis and processing. An industrial scale preparation of UHMW-PE and UHMW-PE can comprise performing a polymerization by providing a mixture comprising a solvent, a homogeneous polymerization catalyst (or precatalyst and a precatalyst activator), ethylene, and a copolymer, performed on a scale adapted to provide between 1 and 100 kG and in particular 50-100 kG, or greater than 100 kG, of a solid comprising UHMW-PE as a dispersion.

In some embodiments, catalysts and/or precatalysts according to the present disclosure can comprise homogeneous catalysts and can be single site catalysts. In particular, precatalysts can be group 4 metal phenoxyimine complexes which are activated by catalyst activator such as MAO for homogeneous synthesis of UHMW-PE.

In some embodiments, UHMW-PE obtained with methods and systems herein described can exhibit properties of other semicrystalline polymers, such as isotactic polypropylene and polylactide, making ultra-long polymer chains.

Further advantages and characteristics of the present disclosure will become more apparent hereinafter from the following detailed disclosure by way of illustration only with reference to an experimental section.

EXAMPLES

The polymers, compositions, methods system herein described are further illustrated in the following examples, which are provided by way of illustration and are not intended to be limiting.

In particular, the following examples illustrate exemplary UHMW-PE and related methods and systems. More particular, Applicants have prepared UHMW-PE samples as example embodiments of the disclosure. The examples below provide validation of the methods for preparing the UHMW-PE and polymer blends thereof and to provide further characterization of the products thus obtained.

A person skilled in the art will appreciate the applicability and the necessary modifications to adapt the features described in detail in the present section, to additional solutions, methods and systems according to embodiments of the present disclosure.

SEM Experiments:

The nascent polymer samples were mounted on stabs, coated with Au/Pd and micrographs were obtained by Scanning Electron Microscopy performed on a Carl Zeiss (Leo) 1530 VP FEG-SEM.

SAXS Experiments:

All experiments were performed at beamline 7.3.3 at Advanced Light Source at Lawrence Berkeley National Lab. Scattering data was collected using an ADSC Quantum 4u CCD with a resolution of 1152×1152 pixels (pixel size 1.632 µm) and a source wavelength, $\lambda$, of 1.371 Å. The detector was placed at a distance of 4.16 m and was calibrated using silver behenate. A Linkam calorimetry stage was used to subject samples pressed in aluminum pans to temperature ramps.

DSC Experiments:

Thermal analysis measurements were performed using a TA instrument Q2000 on approximately 1 mg of sample. The DSC measurements were recorded from 313 K to 433 K during two heating and one cooling cycles at a rate of 10 Kmin$^{-1}$.

Rheometry Experiments:

The precipitated and dried materials were heated at 20° C./min up to 160 C. The temperature was maintained at 160° C. for 5 min in order to erase the thermal history. Subsequently, the polymer was cooled down to 20° C. at a rate of 10° C./min and then immediately heated back to 160° C. with the same heating rate of 10° C./min.

General Polymerization Conditions:

Samples of UHMWPE were synthesized in homogeneous conditions (using a bis-phenoxyamine Ti catalyst in combination with methylaluminoxane) at 50° C. and 1 bar ethylene in presence of different amounts of EXACT (also referred to as EB-5) (previously dissolved in the polymerization medium, toluene) ranging from 0 to 45% copolymer.

Reagents:

All reactions involving air- and moisture-sensitive compounds were performed under a dry nitrogen or argon atmosphere using standard Schlenk techniques and a glove-box. Methylaluminoxane (MAO, 10% w in toluene), and toluene (99.8%, anhydrous) was purchased from Aldrich and precatalyst Bis[N-(3-tert-butylsalicydene)-pentafluoro anilinate]titanium (IV) Dichloride from MCat. Ethylene (3.0 grade) was supplied by BOC.

Example 1

Polymerization Experiment without Copolymer

A 1 L jacketed pyrex vessel equipped with a magnetic stirrer, a thermocouple, an ethylene inlet and a rubber septum was charged with 0.75 L of toluene, 3.5 mL of MAO and saturated with 1 bar partial pressure of ethylene at the desired temperature (50° C.). A solution of precatalyst dissolved in a minimum amount of toluene/MAO solution was injected through the rubber septum to start the polymerisation. The temperature was controlled by means of a thermostat, while the ethylene consumption was monitored by a Buchi press-flowmeter. The formation of tiny polymer particles was already visible after 5 minutes of reaction. The polymerization was quenched after the desired time by injection of methanol. At visual inspection, it was possible to recognize the polymer particles flocculating in the stirred reaction medium. The polymer was filtered, washed with copious amount of acetone and dried in a vacuum oven for one night at 313K.

Example 2

Polymerization Experiment with Copolymer

The desired amount of copolymer was charged in a jacketed pyrex vessel, toluene was added, and the temperature was brought at 80° C. to favour complete dissolution of the copolymer. After 2 h at 80° C. under vigorous stirring, the temperature was lowered to 50° C., MAO and ethylene were added, followed by the precatalyst solution to start the polymerisation as described above. In presence of copolymer, the formation of polymer was indicated by a progressive opacity of the reaction medium. Once the reaction was quenched with methanol, no distinct polymer particles could be identified at visual inspection of the milky suspension. Upon cooling to room temperature, polymer particles precipitated and were filtered, washed and dried as described above.

The ratio of UHMWPE to copolymer in the product was computed from the mass of ethylene polymerized and the mass of copolymer charged to the reactor (typically the reaction time was chosen to provide 10 g of UHMWPE).

Example 3

Nanostructural Features of UHMW-PE

Nanostructural features of the nascent UHMW-PE and nascent UHMW-PE co-crystals were observed by SEM (scanning electron microscope). In particular, the nascent samples were mounted on stubs, coated with Au/Pd and imaged by Scanning Electron Microscopy (SEM) performed on a Carl Zeiss (Leo) 1530 VP FEG-SEM. Thermal analysis measurements were performed using a TA instrument Q2000 on approximately 1 mg of sample. The DSC measurements were recorded from 313 K to 433 K during two heating and one cooling cycles at a rate of 10 Kmin~1. Synchrotron scattering (ALS beamline 733, Lawrence Berkeley National Lab) was used to characterize the first melting of the nascent particles, the subtle changes in the amorphous phase that occur in the melt and crystallization of UHMW-PE from the melt. Scattering data was collected using an ADSC Quantum 4u CCO and a source wavelength, A, of 1371 A. The detector was placed at a distance of 4.16 m and was calibrated using silver behenate.

The structure of resulting nascent UHMW-PE crystals or powders (herein the terms "crystals", "powders", and "particles" are used interchangeably), was examined using electron microscopy and synchrotron x-ray scattering, show that the UHMW-PE crystallites can retain their structure and high thermal stability.

Figure 4:
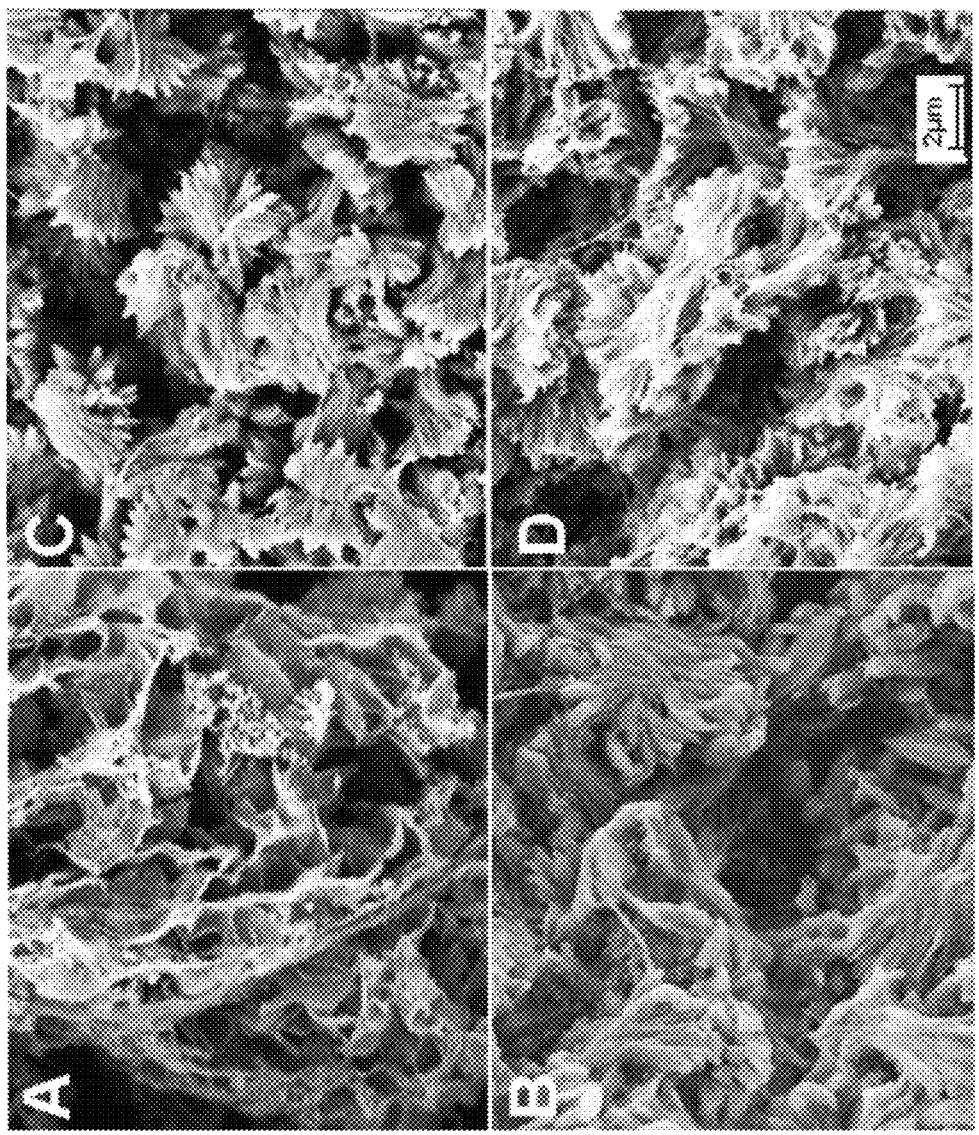
FIG. 4A shows a SEM image of nascent polymer (UHMW-PE) prepared in absence of an additive the internal structure of a large aggregate that form in absence of the additive. In the illustration of FIG. 4A the aggregates are much larger than the field of view of the image and they precipitate to the bottom of the reactor.
FIG. 4B shows an SEM image illustrating a nanostructure of ultra-high molecular weight polymer synthesized according to embodiments herein described. In particular.
FIG. 4C shows an SEM image illustrating a nanostructure of ultra-high molecular weight polymer synthesized according to embodiments herein described. In particular.
FIG. 4D shows an SEM image illustrating a nanostructure of ultra-high molecular weight polymer synthesized according to embodiments herein described. In particular.

In particular, nascent reactor powders show that the sponge-like structure that forms when UHWM-PE associate during polymerization (FIG. 4A) changes to a butterfly-type' structure when the same polymerization is performed in the presence of inert copolymer (FIG. 4B-D). It is known that when UHMW-PE melts, the thermogram at 10° C. min has a peak at 141° C., which is significantly higher than that of typical HDPE (circa 135° C.). The stability of the UHMW-PE lamellae formed in the presence of copolymer was evaluated using a modified protocol for the first melting of the nascent reactor powder: first, all the copolymer crystals were melted sequentially by holding the temperature at 90, 95, 100 and 105° C., followed by heating at 10° C./min to 160° C. The subsequent heating showed a melting peak at 140.8° C.

The subsequent heating showed a melting peak at 140.8° C. indicating that the UHMW-PE lamellae in the butterfly-type structures have similar stability to those formed in the absence of copolymer.

A more detailed analysis of nanstroctural features of UHMW-PE is reported in Example 4 below.

Example 4

Nanostructural Features of UHMW-PEs Prepared in Presence of a Copolymer

Four nascent UHMW-PE polymer samples were prepared by polymerization of ethylene in the presence of 0%, 16.7%, 26.7%, and 44.4% (herein referred to as UH0, UH 16.7, UH 26.7, and UH 44.4), respectively) by weight of copolymer EB-5 (See EB-5, Table 3).

Figure 5:
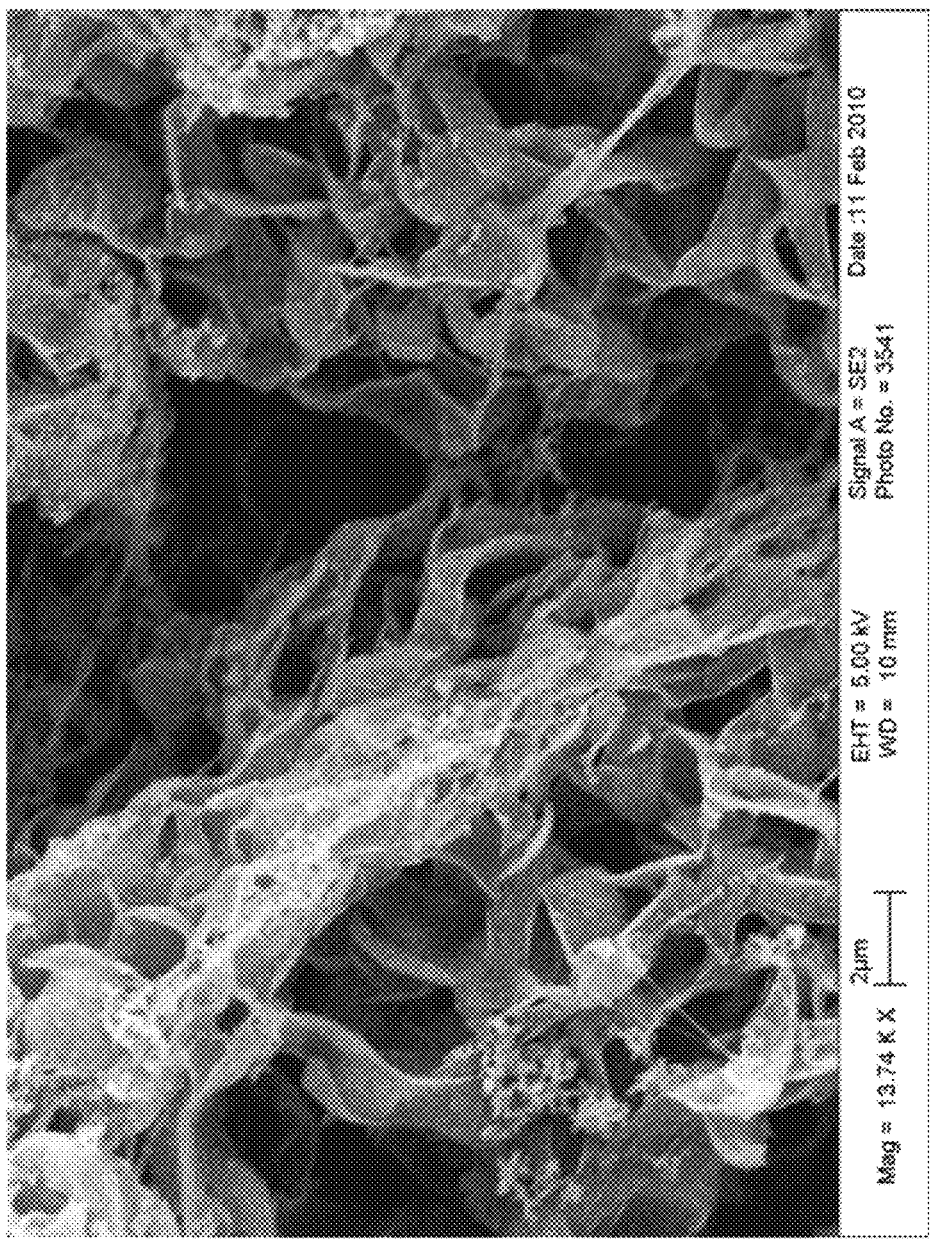
FIGS. 5-8 show an enlarged view of the SEM image FIG. 4A to FIG. 4A respectively.

FIGS. 4A-D show a side by side comparison of SEM images of nascent particles of UHMW-PE prepared by performing a polyethylene polymerization using a bis-phenoxyamine titanium precatalyst with copolymer additives ranging from 0-45% by weight with respect to the total mass of copolymer+ethylene. FIGS. 5-8 show individual SEM images corresponding to those seen in FIGS. 4A-D. The effect of increasing copolymer additive on nascent powder nanostructures can be observed; FIG. 5 showing a less ordered nanostructure with nanostructure order consecutively increasing from FIG. 5 (0% copolymer) to FIG. 6 (16.7% copolymer) to FIG. 7 (26.7% copolymer) to FIG. 8 (44.4% copolymer).

Figure 6:
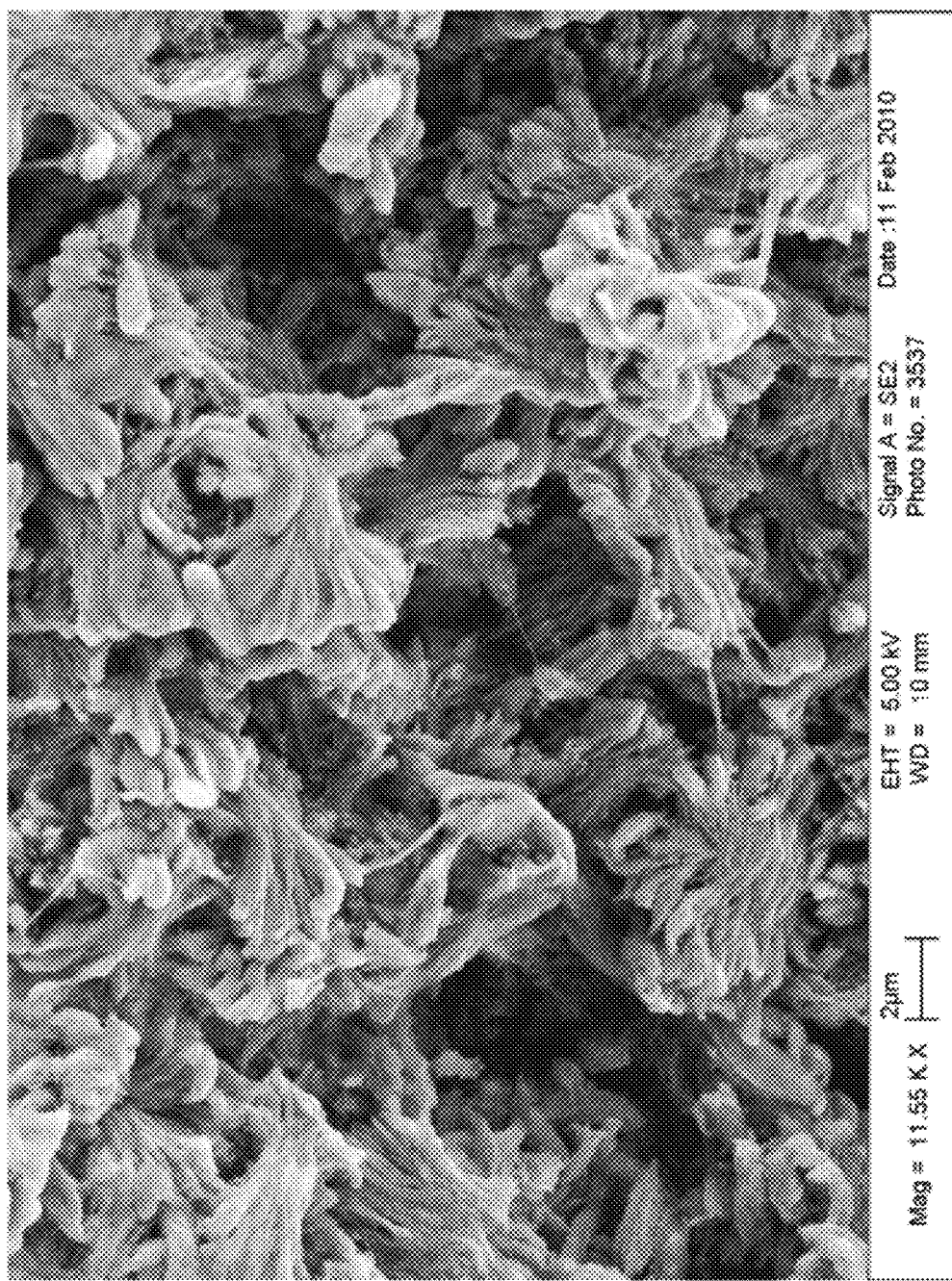
Figure 7:
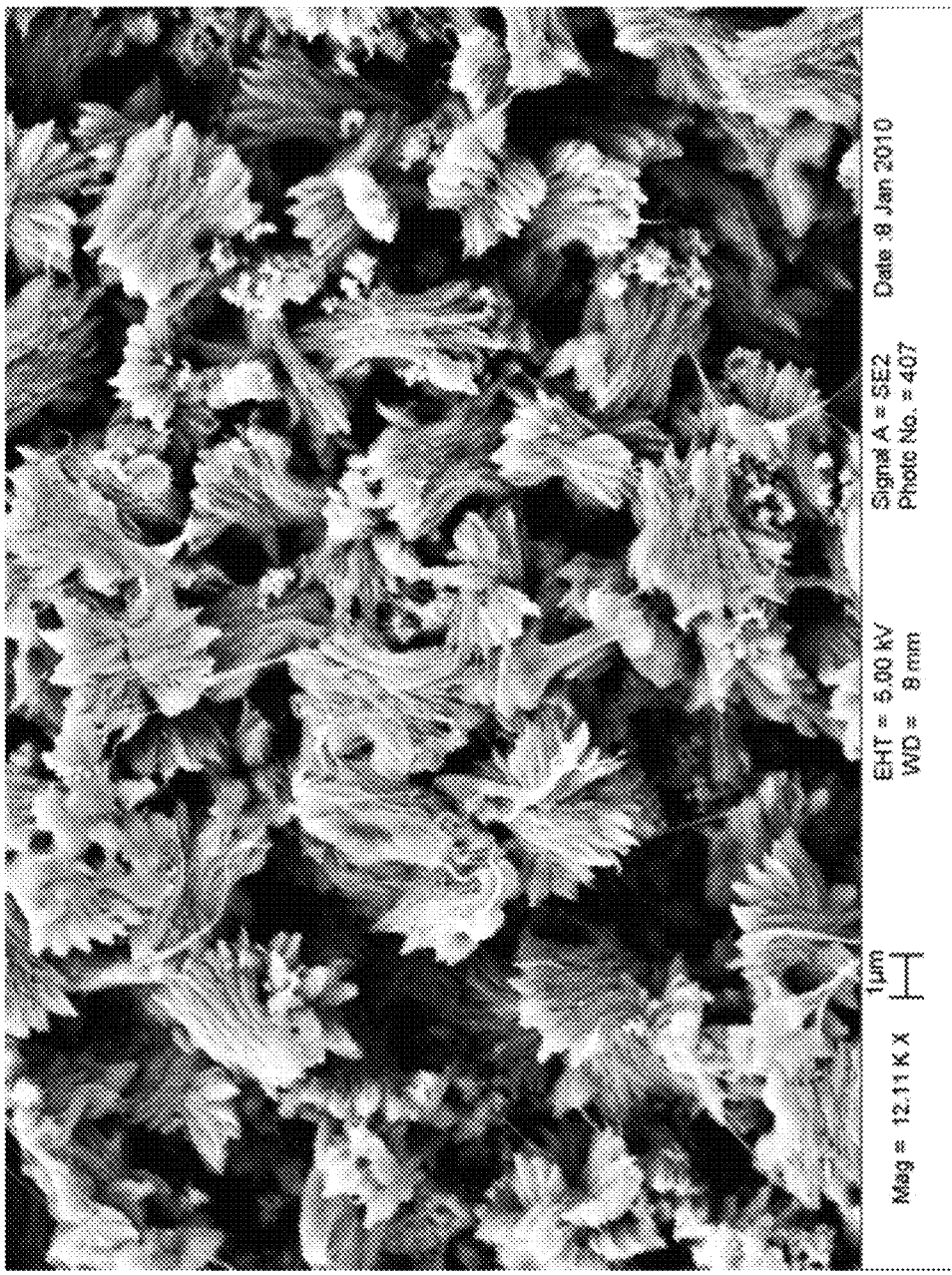
Figure 8:
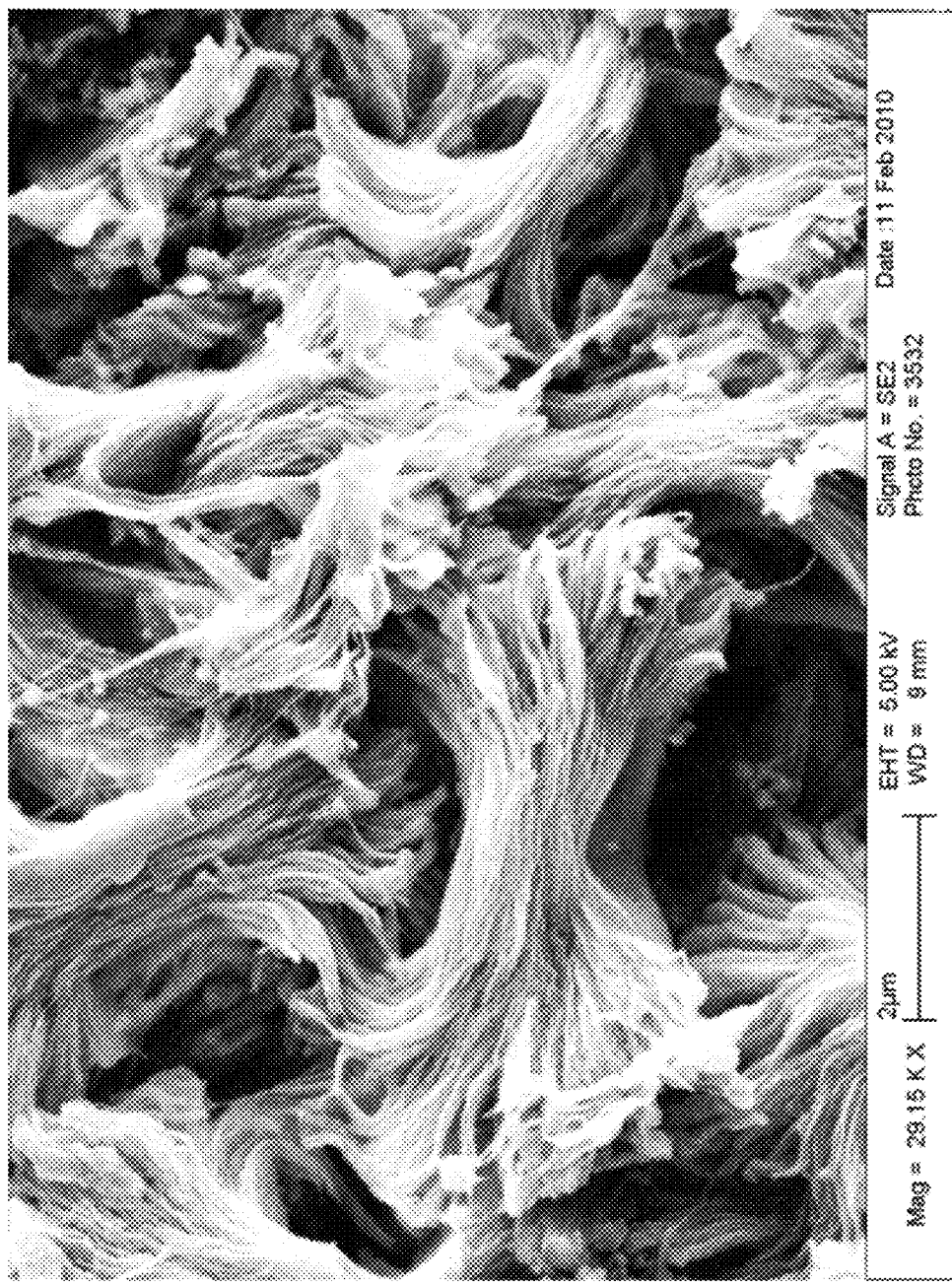

The SEM images of FIG. 5-8 show that nascent UHMW-PE powders with low copolymer content can have a lamellar structure where lamellae become packed in 'butterfly-type' nanostructures with increasing content of the copolymer (from FIG. 5 to of FIG. 6, FIG. 6 showing a 'butterfly-type' nanostructure). As the copolymer continues to increase, a 'knitted-type' structure appears (FIG. 6-8). The features observed with SEM can be estimated to be in the region between 20 and 45 nm.

Based on the SEM images, the copolymer appears to be intimately connected to the lamellae that formed as the UHMW-PE chains grew (no evidence of bulk phase separation). Rather than the abrupt boundaries and junctions between the lamellae in reactor particles formed without copolymer. The lamellae appear to be coated with a conformal layer of elastomer. The morphology of the particles is drastically changed by addition of the copolymer. In contrast to lamellae with very large lateral extent in the absence of copolymer (extending 10 µM or more) as in FIG. 5), lamellae appear to grow on a few microns in the presence of copolymer (FIGS. 6-8) in a "butterfly-type" structure. This morphology can be due to co-crystallization of the UHMWPE with different lengths of the copolymer's un-branched ethylene sequences during polymerization. The longest sequences allow multiple re-entries and thus create a more compact structure and the shorted sequences which participate in only one or two lamellae create the long brushes that result in the wider features.

Example 5

SAXS Data

Small angle x-ray scattering (SAXS) is a technique that is used for the nanostructural characterization of solid and amorphous solid materials. It can be used to show surface features on a scale of approximately 1-100 nm. Therefore, SAXS, as with SEM, can be used to view the microscale features of polymer and can further be used to indicate which parameters (rate of polymerization, additive identity, and additive concentration) should be adjusted and how, in order to achieve a desired effect.

The small angle x-ray scattering (SAXS) intensity profile for UHMW-PE synthesized without copolymer (FIG. 5) is consistent with lamellae that are not stacked. In contrast, a SAXS peak is present in the nascent particles formed in the presence of copolymer (FIG. 8), consistent with the long spacing of the lamellar stacks seen by SEM (estimated to be in the region between 20 and 45 nm). During a first melting, the "sponge-like" UHMW-PE shows little change in SAXS until the temperature reaches 137° C. In contrast, the shape and intensity of the SAXS peak evident in the "butterfly-type" structure begins below 120° C. and is complete by 137° C.

Figure 17:
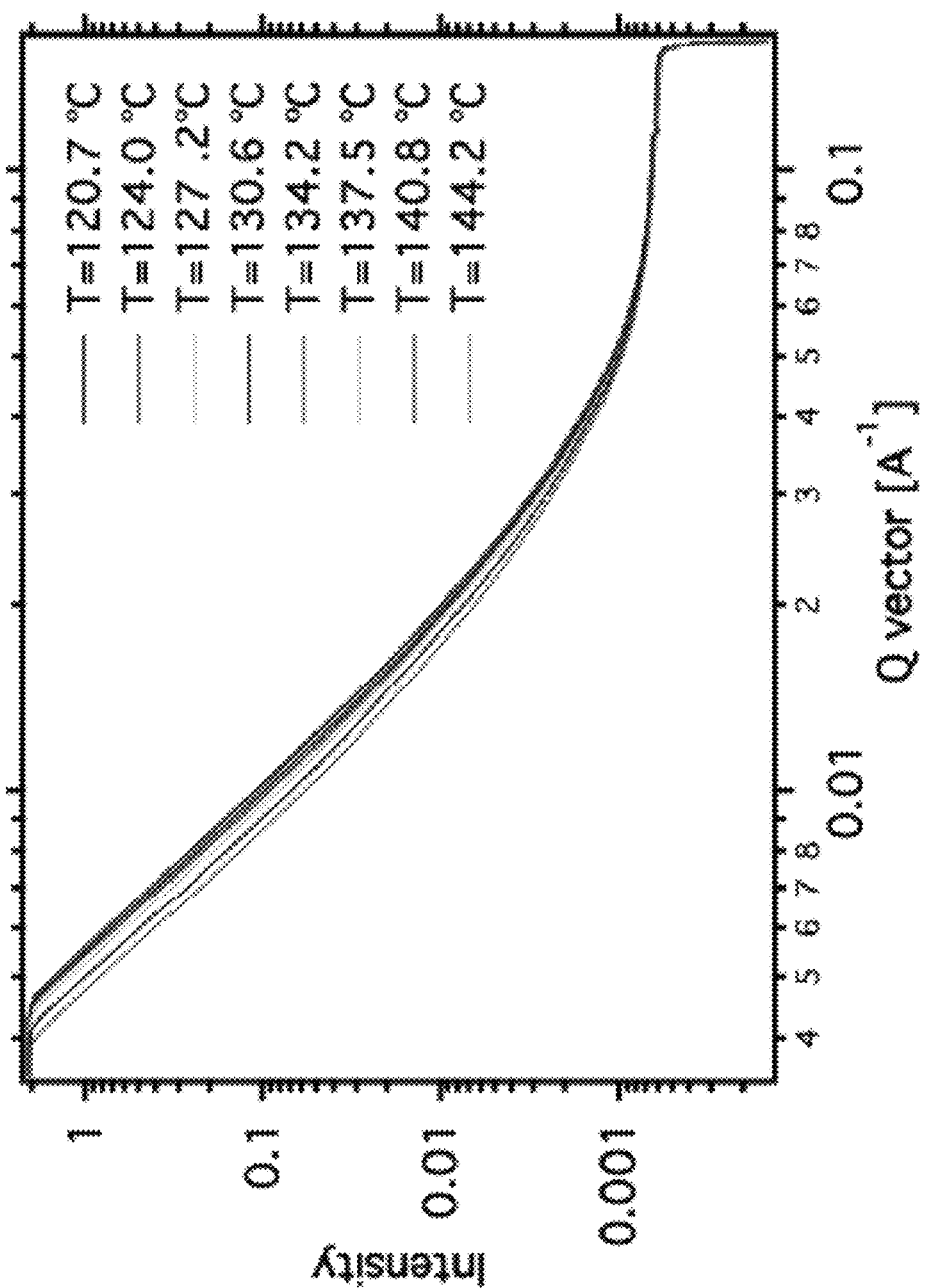
FIG. 17 shows a diagram illustrating SAXS integrated intensity of UHMWPE with 0% copolymer integrated intensity during melting from 120° C. to 150° C.
Figure 18:
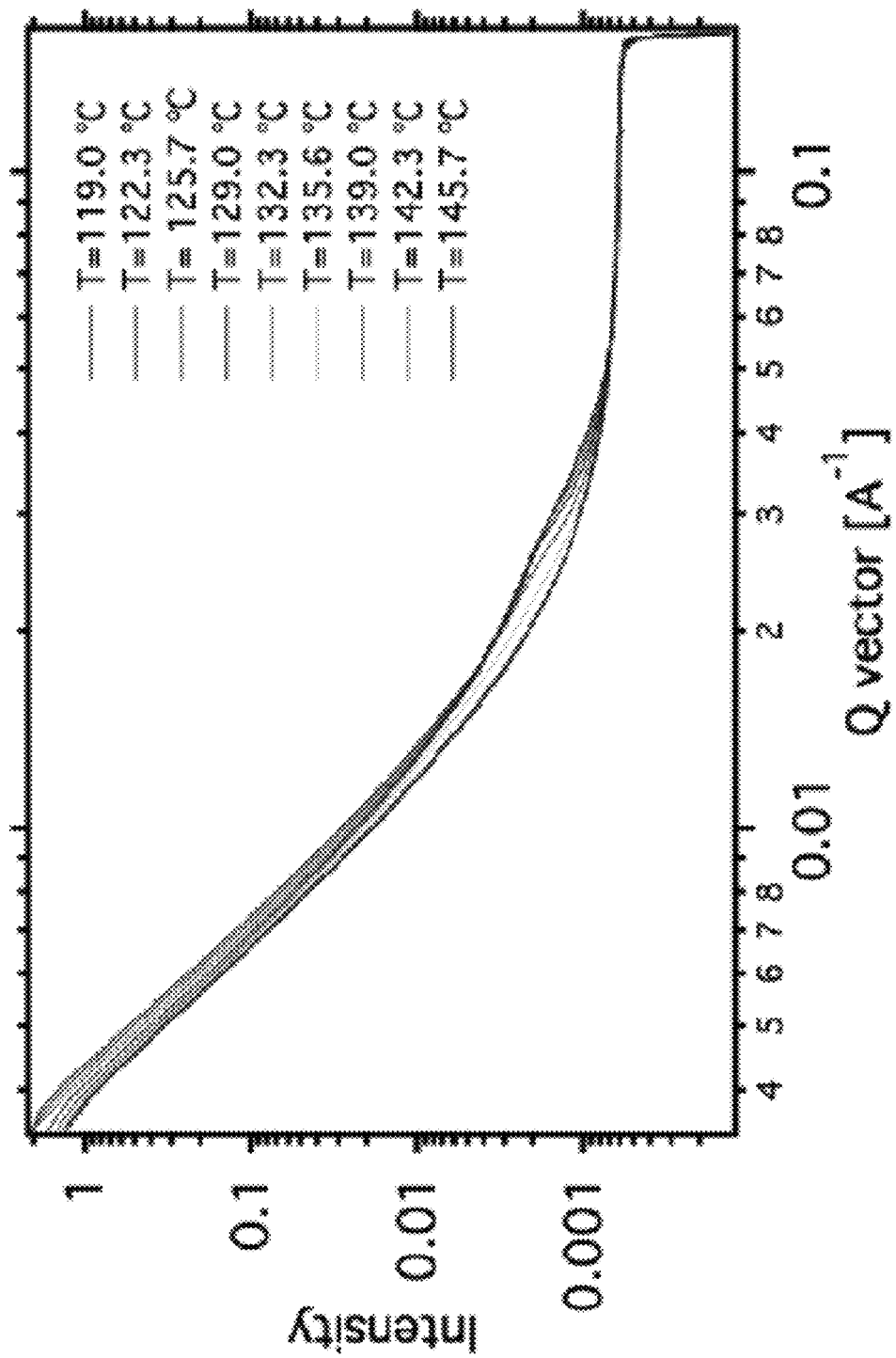
FIG. 18 shows a diagram illustrating SAXS integrated intensity of UHMWPE with 44.4% copolymer integrated intensity during melting from 120° C. to 150° C.
Figure 19:
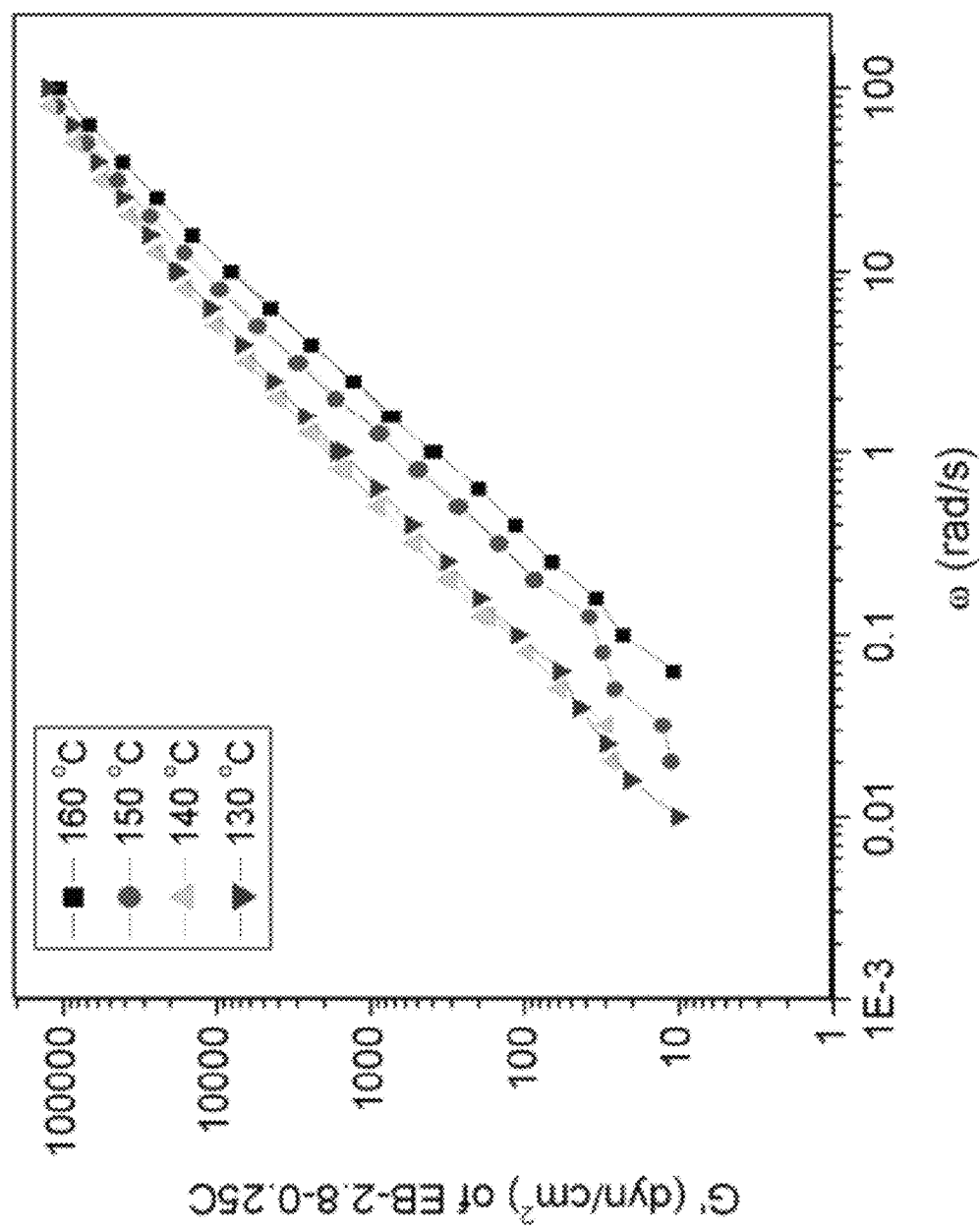
FIGS. 19-22 show a frequency sweep for each blend at 160° C., 150° C., 140° C., and 130° C. which shows that at the lowest temperature investigated (130° C.) the higher concentration blends (at C* and 2C*) exhibit a dramatic increase in G' which can be due to onset of crystallization of the UHMW-PE chains and their association with each other through physical cross-linking.
Figure 20:
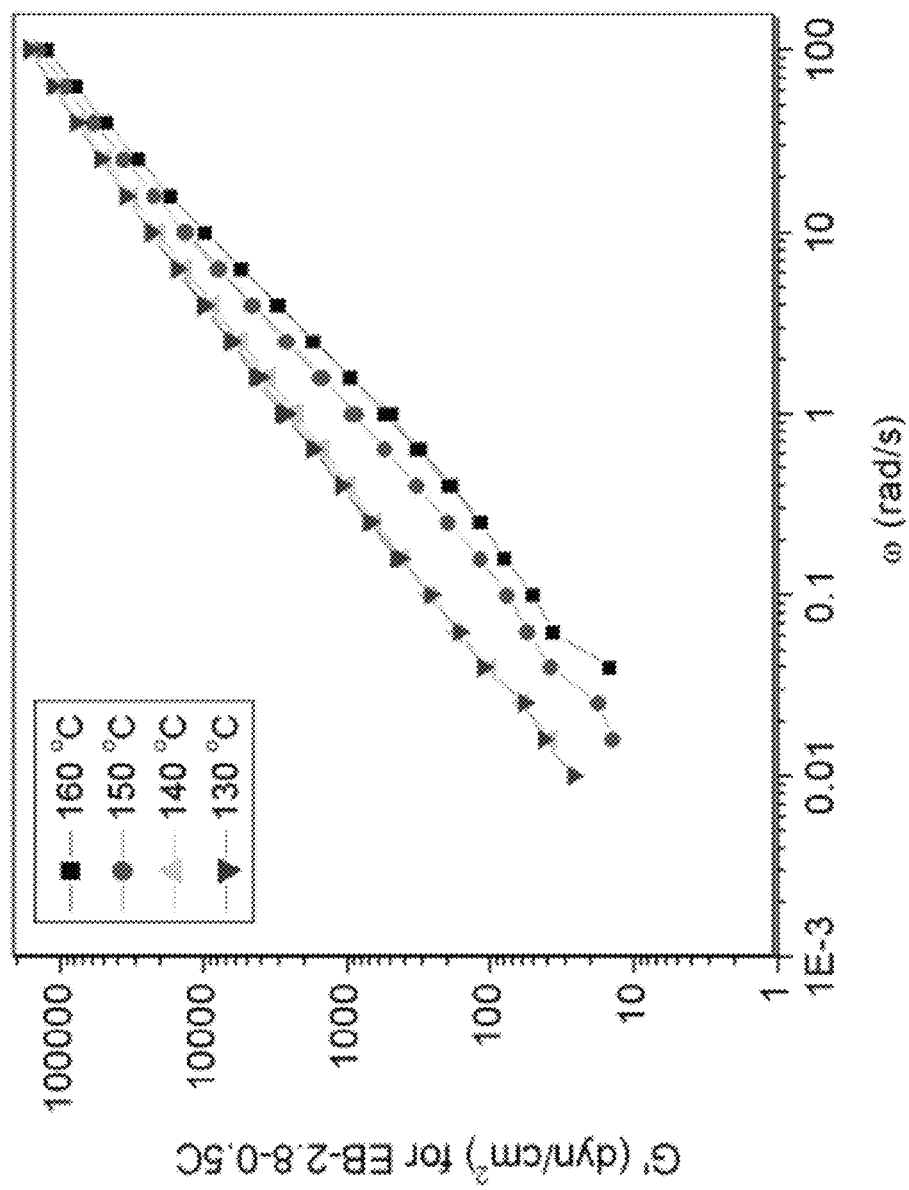
Figure 21:
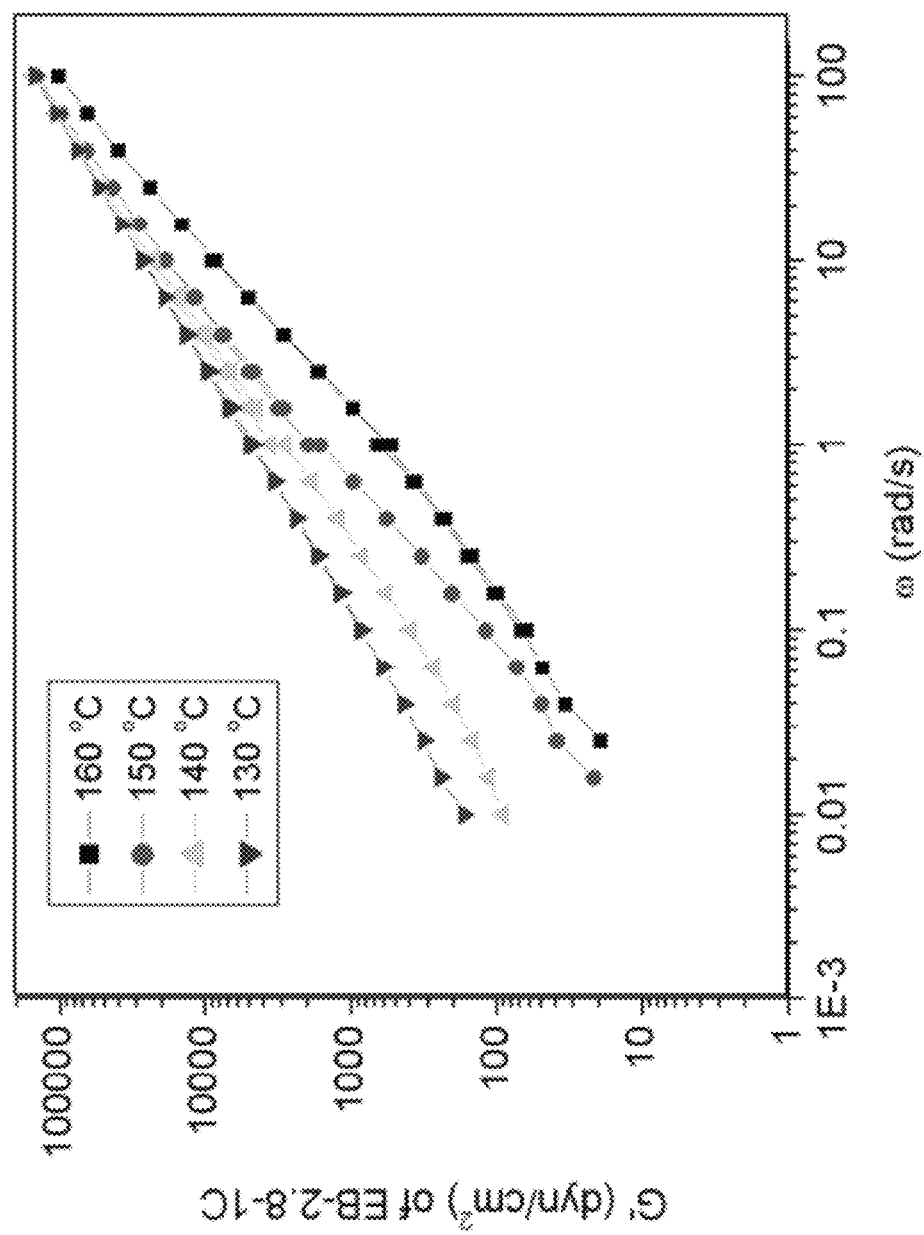
Figure 22:
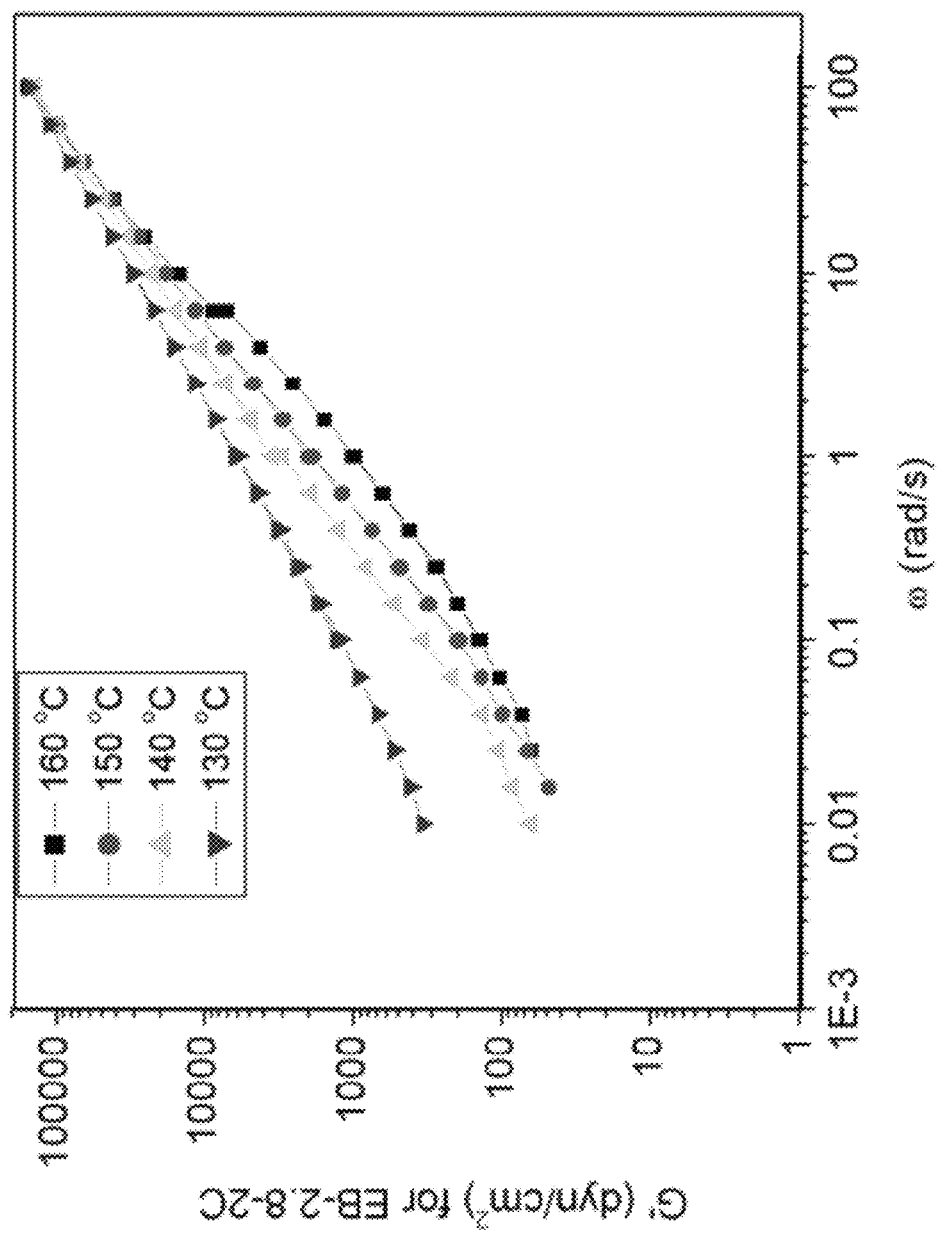
Figure 27:
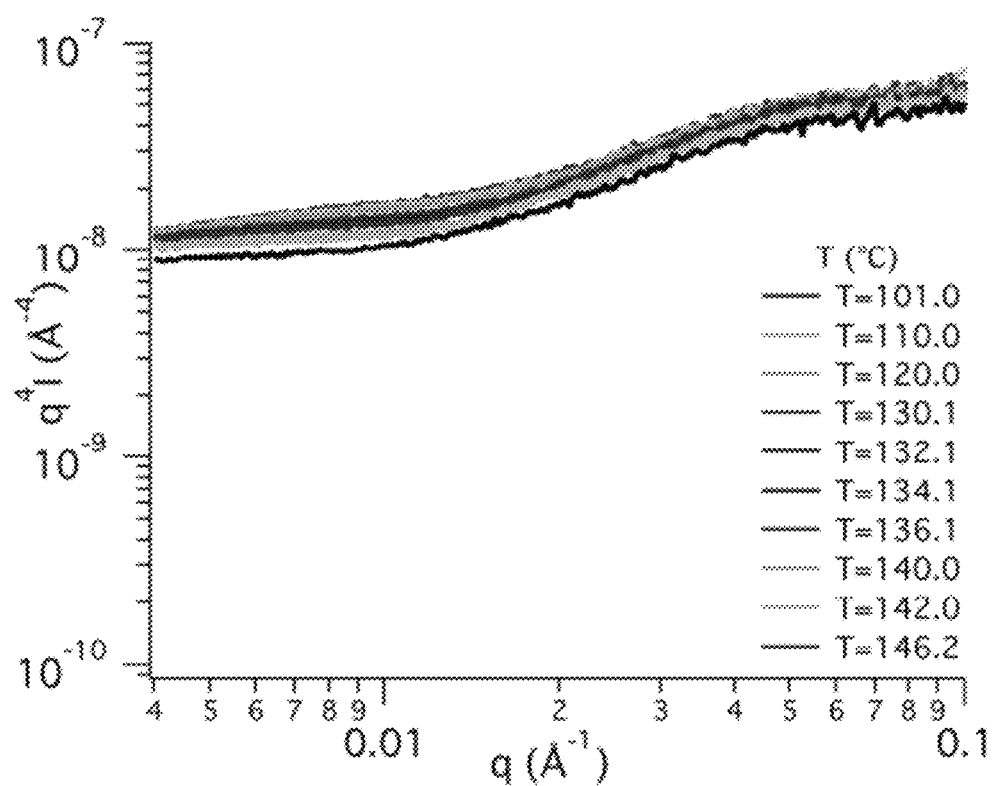
FIG. 27 shows a diagram illustrating SAXS Porod scattering of UH 0, which indicates that no lamellar stacks are present for the nascent polymer prepared without additive and that the nascent particles are highly porous.
Figure 28:
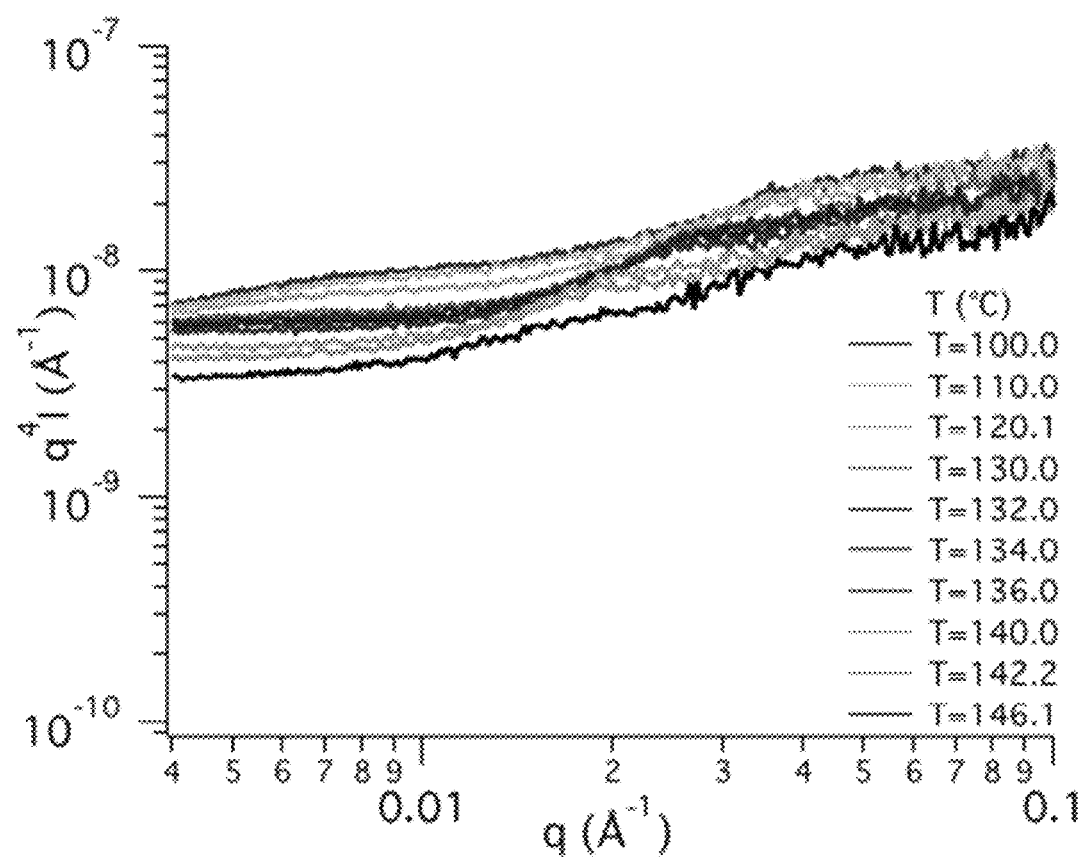
FIG. 28 shows a diagram illustrating SAXS Porod scattering of UH 16.7, which indicates that lamellar stacks are present for the nascent polymer prepared with additive.
Figure 29:
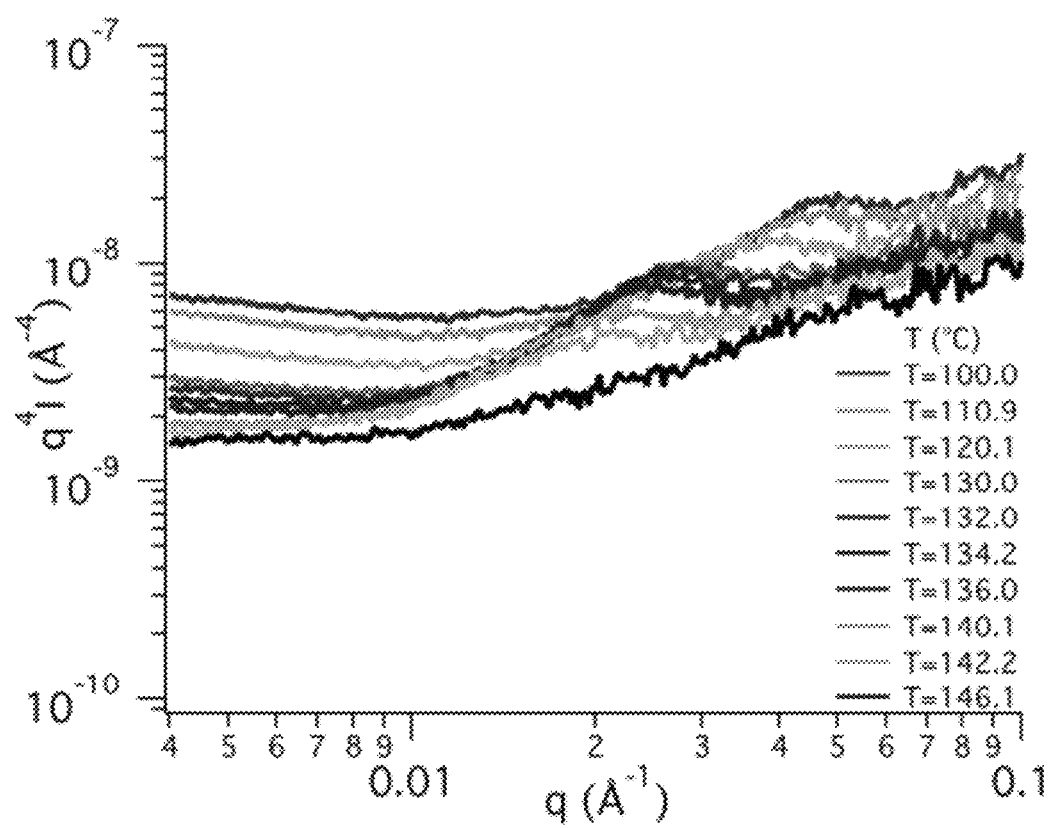
FIG. 29 shows a diagram illustrating SAXS Porod scattering of UH 44.4, indicating an increase in lamellar stacks in the nascent polymer prepared with an increasing amount of additive.

FIGS. 27-29 show changes in nanostructures of the materials seen in FIGS. 5-6 and 8 (i.e. UH0, UH 16.7, and UH 44.4) upon melting by a change in an integrated SAXS (small angle X-ray scattering) intensity at their respective melting points. A rise in integrated intensity curves between q=0.01 and q=0.05, where q is a scattering vector, can be due to an expansion of the lamellar "butterfly" bundles prior to melting. Once the crystals start to melt, the integrated intensity starts decreasing as seen in both FIGS. 17 and 18.

The large precipitated particles that form without copolymer are highly porous and no lamellar stacks are observed in SAXS, whereas the stable colloidal particles (FIGS. 6 and 8) that form with copolymer are submicron "butterfly-type" structures.

The interfacial area remains large, even when the material melts. The large interfacial area gives a strong Porod-type scattering (note SAXS is presented as $q^4I$)—which persists even after all crystallites have melted.

Example 6

WAXD Data

Wide angle X-ray diffraction (WAXD) or wide angle x-ray scattering (WAXS) can provide information about structural features of a polymer on an Angstrom scale. Therefore WAXD, as with SAXS and SEM, can indicate which parameters (rate of polymerization, additive identity, and additive concentration) should be adjusted and how, in order to achieve a desired effect.

Figure 24:
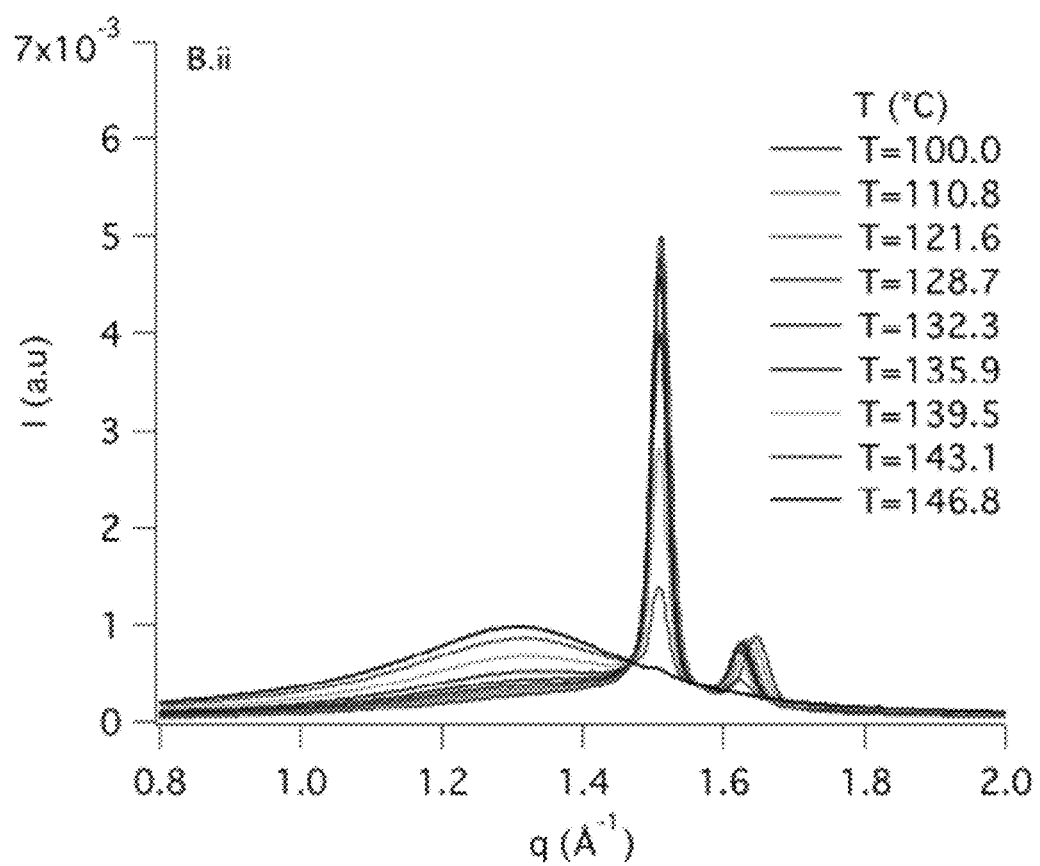
FIG. 24 shows a diagram illustrating melting of UHMW-PE with 0 wt % copolymer (UH0) by WAXS for comparison of crystalline order and stability of nascent polymer samples with varying amounts of copolymer and to confirm the presence of UHMW-PE in the sample.
Figure 25:
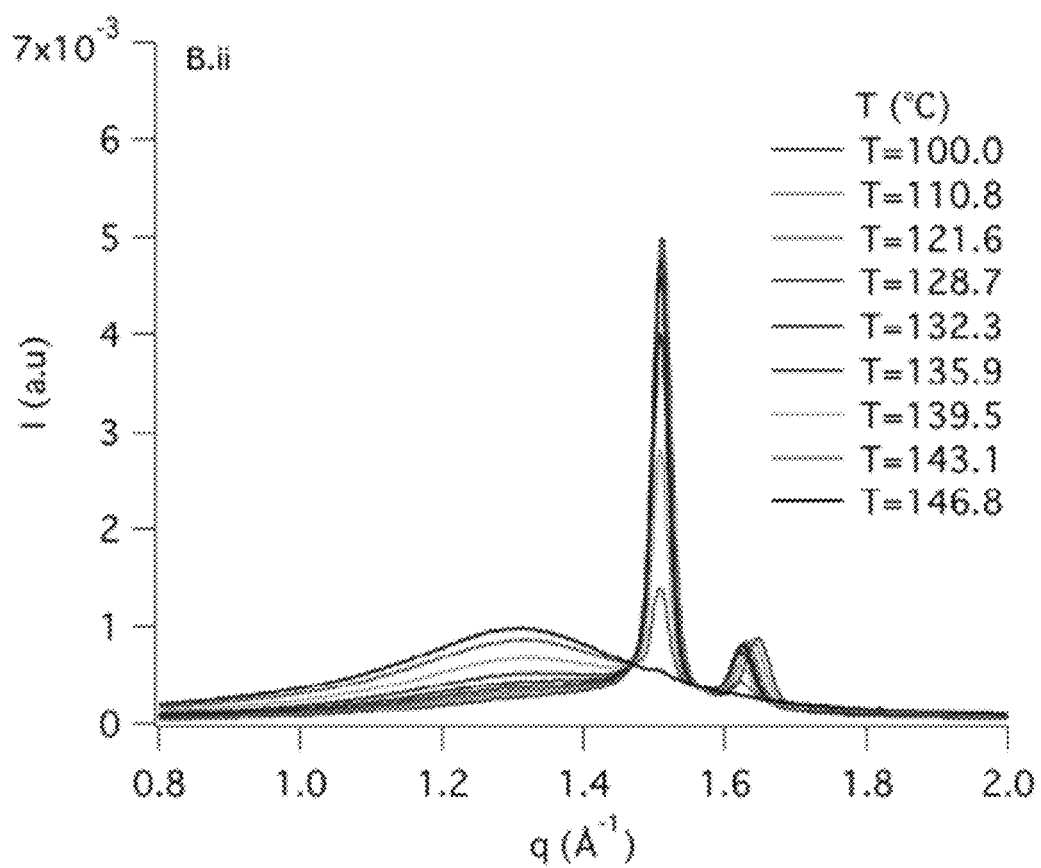
FIG. 25 shows a diagram illustrating a melting of UHMW-PE with 16.7 wt % copolymer (UH16.7) by WAXS for comparison of crystalline order and stability of nascent polymer samples with varying amounts of copolymer and to confirm the presence of UHMW-PE in the sample.
Figure 26:
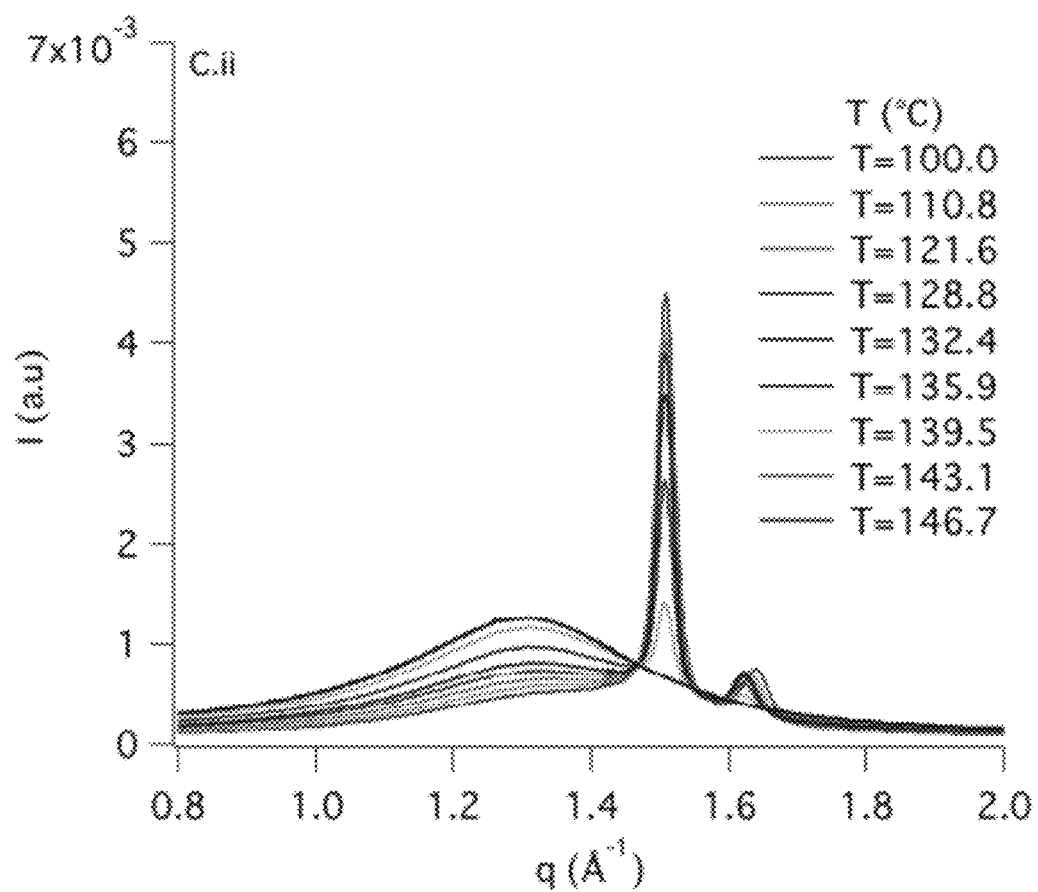
FIG. 26 shows a diagram illustrating a melting of UHMW-PE with 44.4 wt % copolymer (UH44.4) by WAXS for comparison of crystalline order and stability of nascent polymer samples with varying amounts of copolymer and to confirm the presence of UHMW-PE in the sample.

Crystalline order and stability of the nascent crystallites are not altered by the copolymer as seen by the WAXD (wide angle x-ray scattering) peaks of FIGS. 24-26 that remain similarly narrow up to 44% copolymer. The first melting retains high Tm—at 139.5° C. (based on when [110]-intensity decrease to 50%) even with 44% copolymer; this indicates that UHMMW-PE is synthesized during the polymerization in the presence of the copolymer.

Example 7

Confirming Formation of UHMW-PE with a DSC Thermogram

DSC thermograms can be used to measure the melting point of a polymer and can thus confirm whether or not a particular polymer is present in a sample.

DSC is not quantitative with respect to the molar mass (it is indirectly related as will be understood by a skilled person. In particular, DSC thermograms can be recorded to determine if UHMW-PE has been produced in a polymerization reaction. It is known that when UHMW-PE melts, the thermogram has a peak at 141° C., which is the equilibrium melting point of a single extended chain polyethylene crystal.

Example 8

Comparison of a UHMW-PE Prepared with a Copolymer with Pure UHMW-PE and the Pure Copolymer As a further example of the properties of UHMW-PE obtained by the disclosed method, properties of a UHMW-PE polymer with mass ratio of 1 with respect to copolymer EB-5 (UHMW-PE/copolymer EB-5), herein referred to as UHMW-PE-1 is now described in comparison to UHMW-PE without copolymer, herein referred to as UHMW-PE-0, and copolymer EB-5 alone, herein referred to as EB-5.

Figure 10:
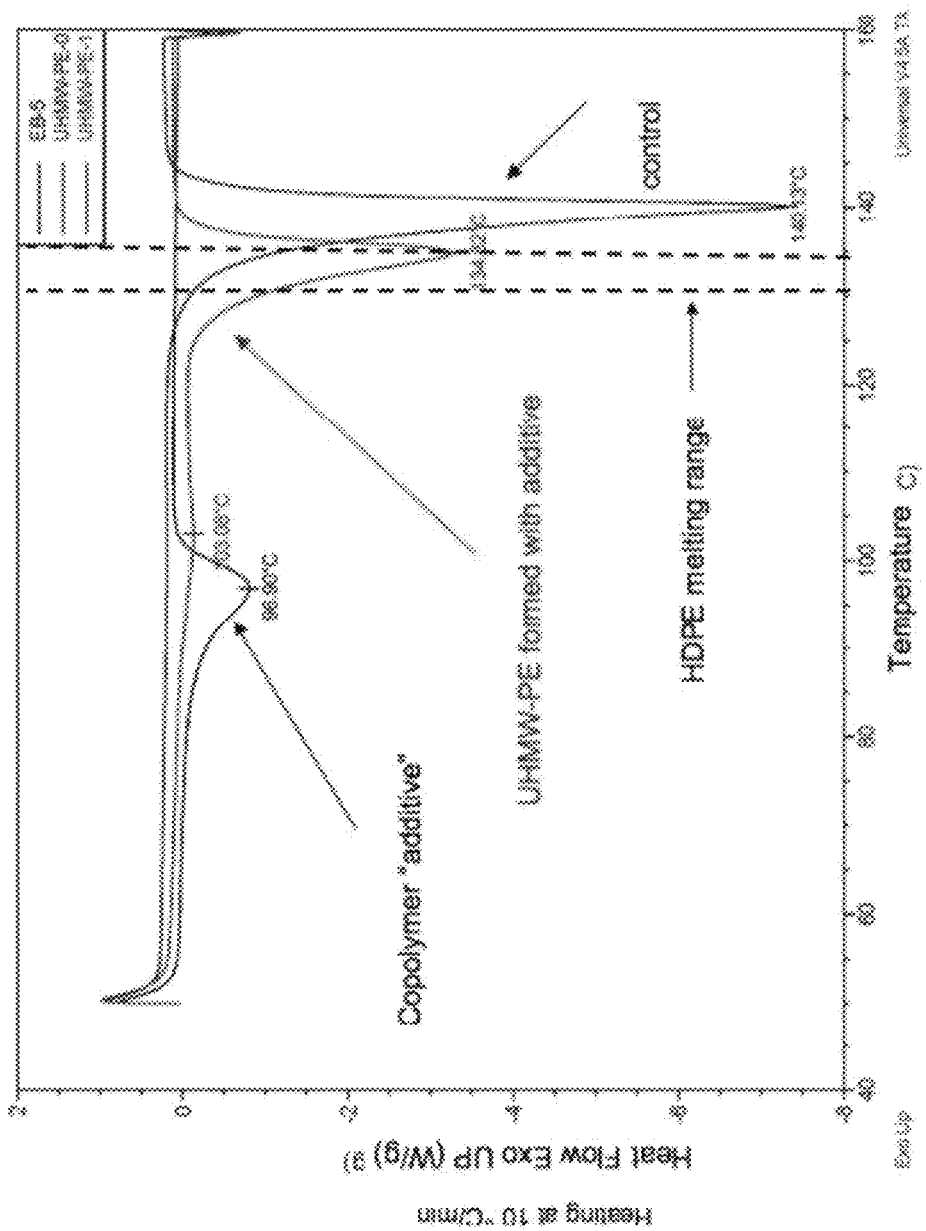
FIG. 10 shows a diagram illustrating molecular properties of a polymer produced according to an embodiment herein described. In particular, the diagram of FIG. 10 illustrates the first melt of nascent UHMW-PE prepared using EB-5 by differential scanning calorimetry (DSC). The nascent UHMW-PE-0 with 0% EB-5 has a melting peak of 140.3° C., the nascent UHMW-PE-1 with 44.4% EB-5 has a melting peak of 134.4° C. The melting peak of the EB-5 copolymer is 96.9° C.

FIG. 10 shows a first melting of nascent UHMW-PE-1 by differential scanning calorimetry (DSC). FIG. 10 also shows a first melting of EB-5 and UHMW-PE-0 for comparison. UHMW-PE-1 shows both a shallow endotherm at a temperature slightly higher than the melting point of EB-5 and a melting peak at the higher end of the HDPE melting range. The melting point of the UHMW-PE-1 is lower than 141° C. but it is at the higher end of HDPE melting range.

If the copolymer and the UHMW-PE had phase separated during crystallization, then a melting thermogram of UHMW-PE-1 would (a) exhibit two distinct peaks at the same temperature as the controls and (b) the relative peaks would have magnitudes corresponding to the volume fraction of crystals formed by the UHME-PE and the EB-5 copolymer respectively. Instead, locations of the melting peak and the shallow endotherm show that EB-5 cannot simply present in the reactor product but rather, the copolymer can be incorporated into the crystals formed during the polymerization.

Figure 11:
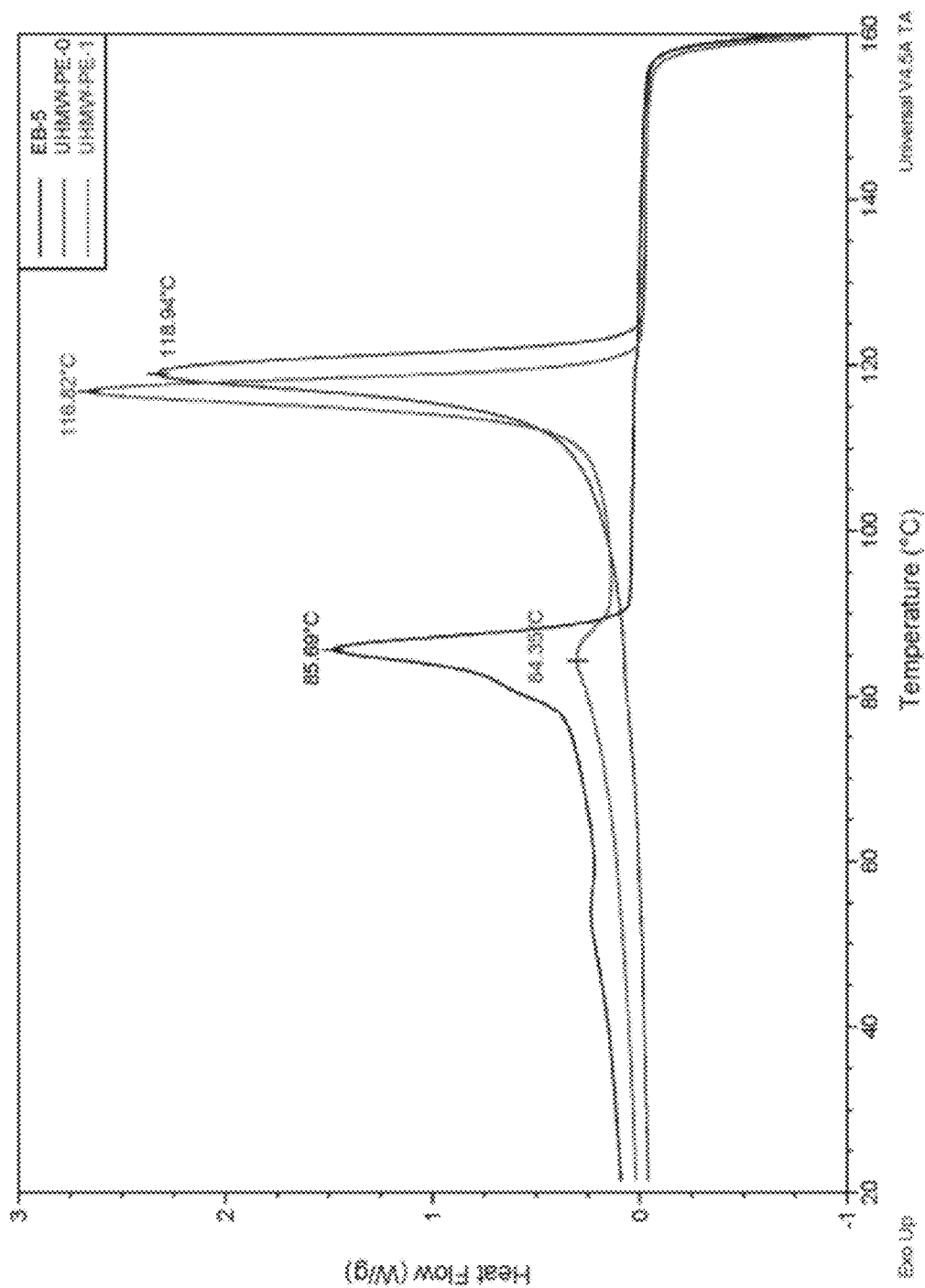
FIG. 11 a diagram illustrating molecular properties of a polymer produced according to an embodiment herein described. In particular, the diagram of FIG. 11 illustrates crystallization of EB-5, UHMW-PE-0, and UHMW-PE-1.

FIG. 11 shows a decrease in the crystallization point of the UHMW-PE-1 synthesized in the presence of EB-5 and also shows a second crystallization peak observed close to the crystallization peak of EB-5.

Figure 9:
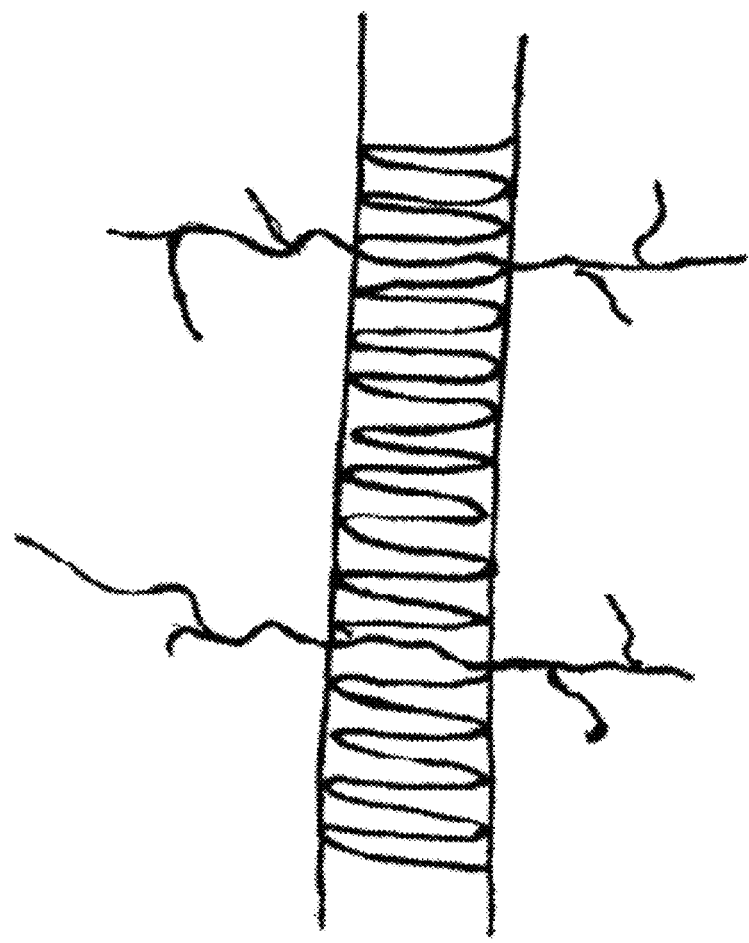
FIG. 9 is a schematic representation of a crystal structure of a polymer according to an embodiment herein described nascent UHMW-PE powders prepared using copolymer EB-5.

A possible crystal structure, based on the data shown in FIGS. 10 and 11 is shown in FIG. 9.

Figure 12:
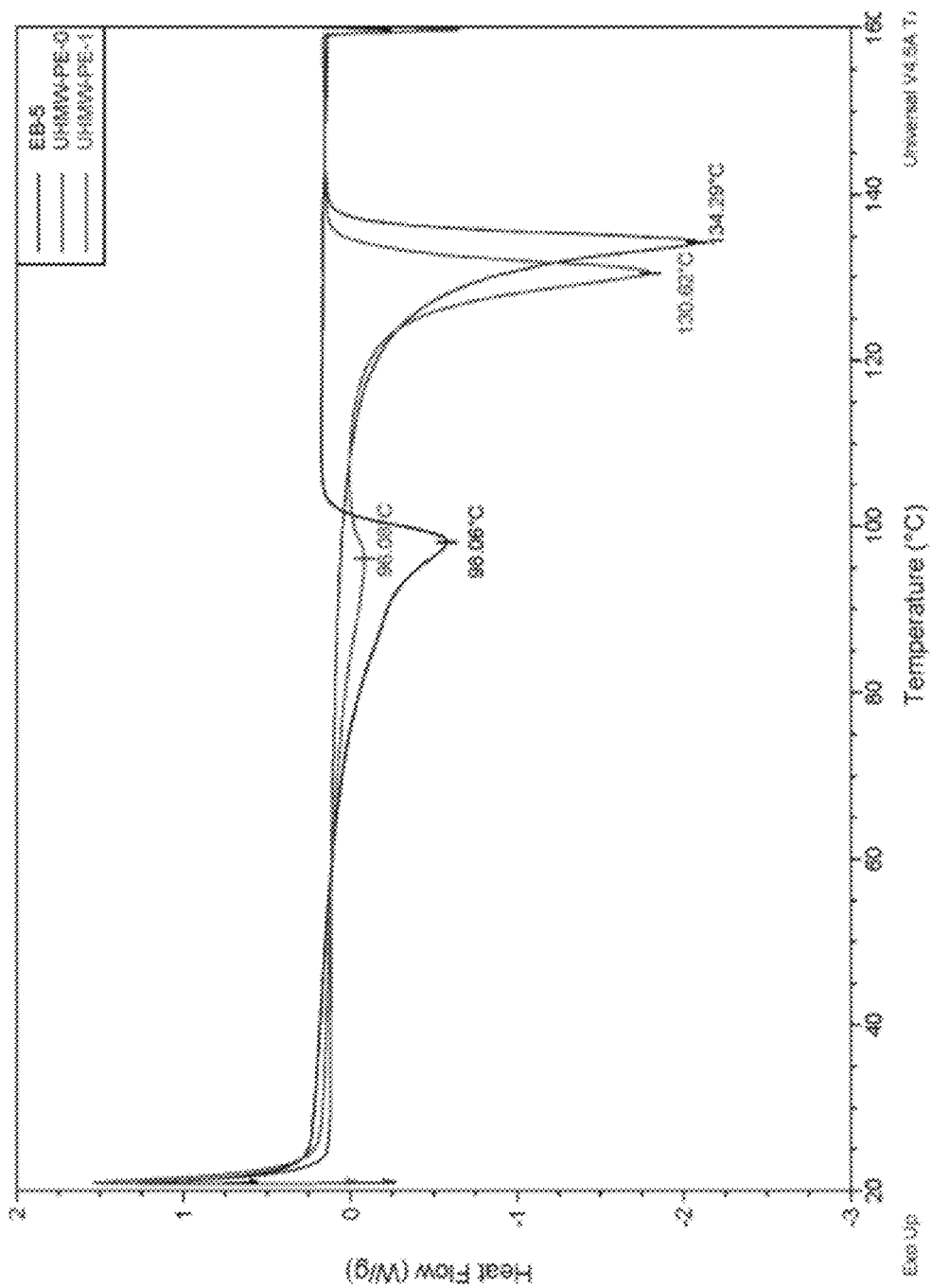
FIG. 12 shows a diagram illustrating molecular properties of a polymer produced according to an embodiment herein described. In particular, the diagram of FIG. 12 illustrates second melting of EB-5, UHMW-PE-0, and UHMW-PE-1.

FIG. 12 shows a second melt thermogram for the UHMW-PE-1. FIG. 12 shows a depression of the melting point with an increase in the content of the EB-5 and also shows an additional small melting peak near the nominal melting point of EB-5.

The melting and crystallization behavior of the UHMW-PE-1 shows that long ethylene sequences can incorporate copolymer into crystals even under conditions that would otherwise keep the copolymer dissolved. This correlates with maintaining submicron size particles in the milky white colloidal suspension of UHMW-PE-1 polymerization.

Example 9

Preparation of Polymer Blends

UHMW-PE blends can be prepared by first preparing UHMW-PE in the presence a copolymer followed by blending various concentrations of the dispersed UHMW-PE with another copolymer. The blends herein described have blend concentrations with UHMW-PE that are multiples of overlap concentration (C*) for UHMW-PE (0.25×, 0.5×, 1× and 2×C*, where 0.3 wt %), herein referred to as EB-2.8-0.25C, EB-2.8-0.5C, EB-2.8-1C, EB-2.8-2C. The matrix is a copolymer of $M_w \approx 50$ kg/mol with 2.8 mol % short chain branching (SCB).

The term "overlap concentration" as used herein is defined to mean a concentration of a solution of a polymer in a solvent beyond which, the polymer's chains will become entangled.

It should be noted that other blends can be prepared with varying amounts of short chain branching and by using other multiples of overlap concentration for an added copolymer.

Example 10

Characterization of Polymer Blends

Figure 13:
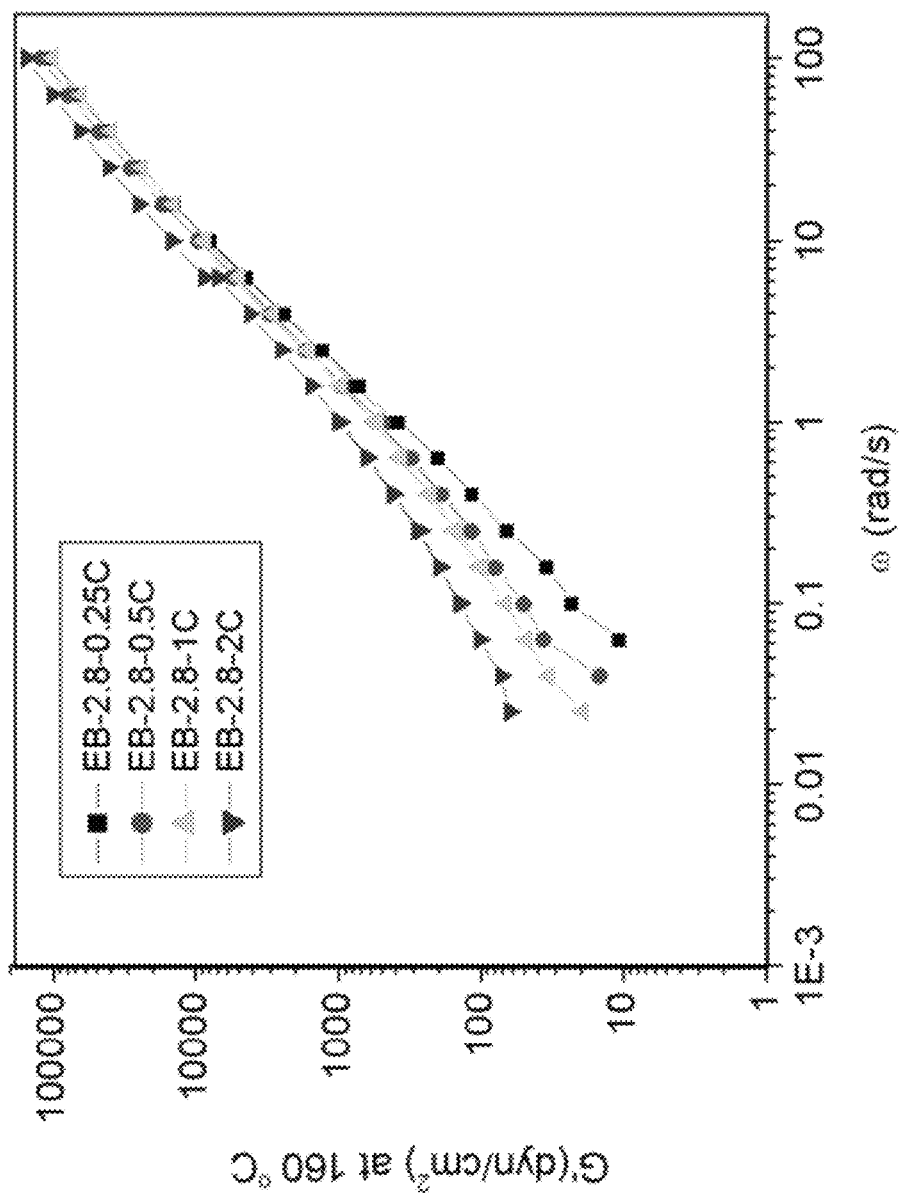
FIGS. 13-16 show diagrams illustrating a frequency sweep at 160° C., 150° C., 140° C., and 130° C. for each of the polymer blends EB-2.8-0.25C, EB-2.8-0.5C, EB-2.8-1C, and EB-2.8-0.2C.
Figure 14:
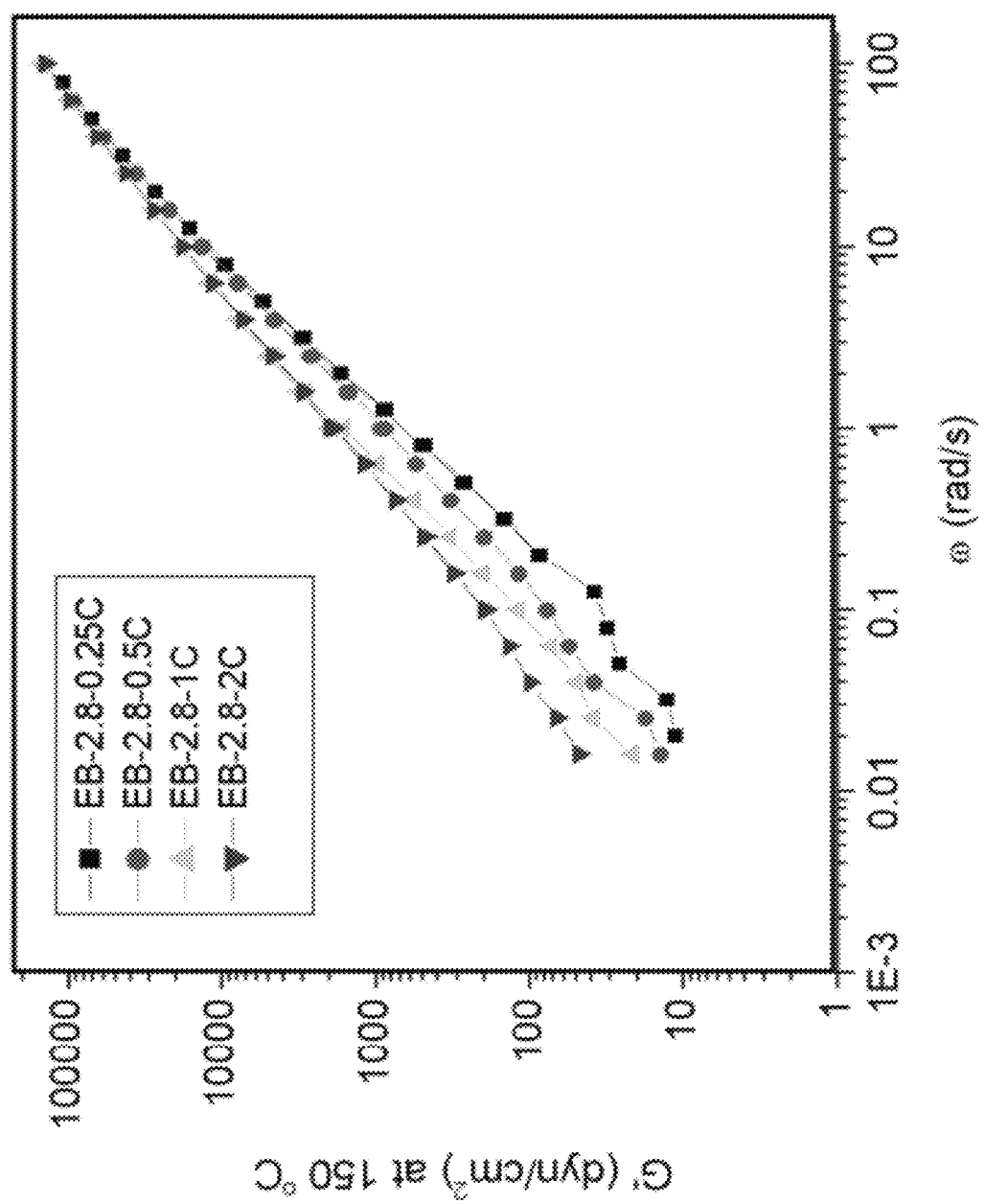
Figure 15:
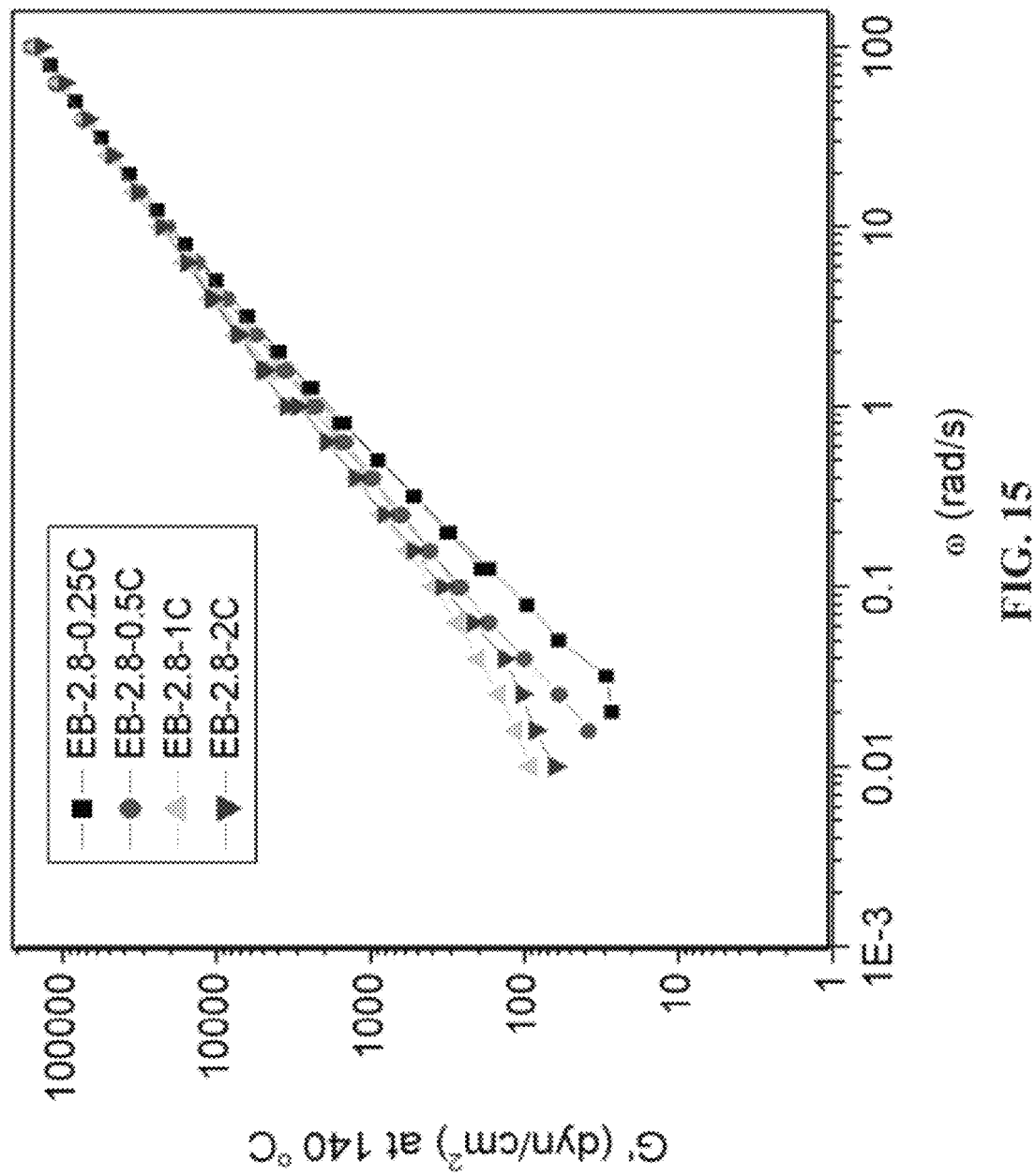
Figure 16:
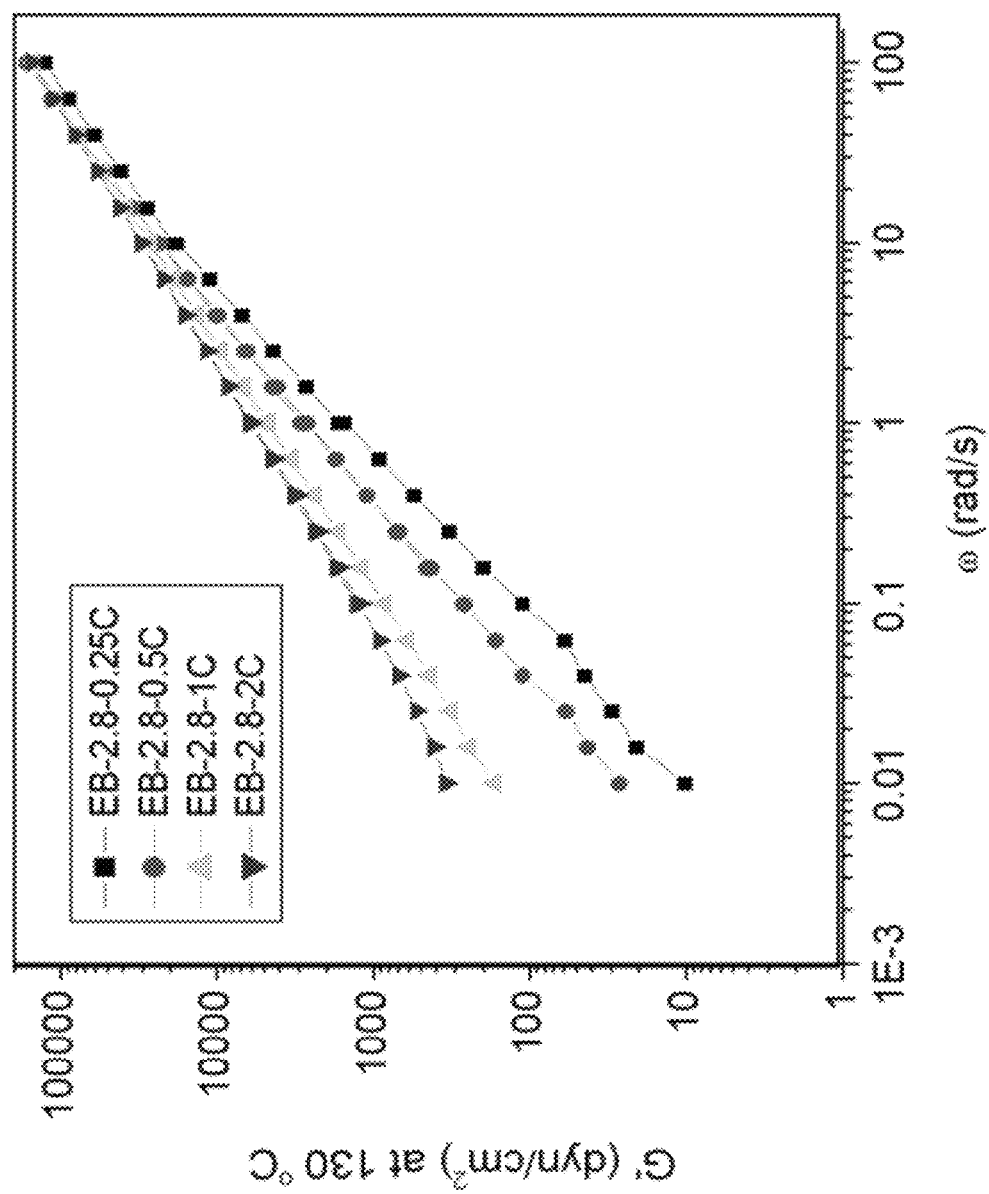

Experiments were carried out in an ARES melt rheometer under $N_2$ atmosphere, using 8 mm parallel plates and sample disks 1 mm thick. Frequency sweeps were run at 160° C., 150° C., 140° C. and 130° C. Melt history was erased by maintaining the melt at 170° C. for 5 minutes before the frequency sweep at each temperature. Strain sweeps were performed to determine the appropriate strain for each range of frequencies to ensure that the frequency sweeps were performed in the linear viscoelastic regime. The required strain values were fairly constant in the examined temperature range; the values are shown in A Frequency sweep was performed for the EB-2.8 blends at 160° C. (FIG. 13), 150° C. (FIG. 14), 140° C. (FIG. 15), and 130° C. (FIG. 16). The storage modulus, G' was plotted vs. frequency for all the blends at each temperature. Due to a low concentration in UHMW-PE, the behavior of the EB-2.8-025C blend can resemble the matrix itself. As seen below, there is a distinction between the blends at 160° C. and 130° C. At higher temperatures (FIGS. 13 and 14), the change in the magnitude of low frequency modulus with concentration is linear, which indicates that the UHMW-PE chains are not associated with each other. At lower temperatures (FIGS. 15 and 16), the non-linear increase in G' with increasing concentration indicates that there is a structure formation. This increase in G' can be due to partial crystallization of the UHMW-PE since at 130° C. it is already under-cooled. This shows that UHMW-PE can act as a nucleating agent in the temperature range of [130° C., 140° C.] in flow-induced crystallization.

Despite a low concentration of long chains, linear viscoelastic measurements can detect the presence of long chains and their association into slow-relaxing structures even at temperatures of 130° C. and 140° C. Therefore, polymer blends obtained by the disclosed method can be relevant to industrial applications.

The term "viscoelastic" as used herein is defined to mean a property of a material, for example a polymer, showing both viscous (e.g. deformable) and elastic (e.g. returnable to an original state after deformation) properties.

Frequency sweeps in a linear viscoelastic regime were performed at 160° C. (FIG. 13), 150° C. (FIG. 14), 140° C. (FIG. 15) and 130° C. (FIG. 16) for each blend as shown in FIGS. 13-16. At lower temperatures, a non-linear increase in G' with increasing concentration shows that there can be structure formation rather than being an amorphous solid. This increase in G' is can be due to partial crystallization of the UHMW-PE since at 130° C. it is already below its melting point.

Figure 23:
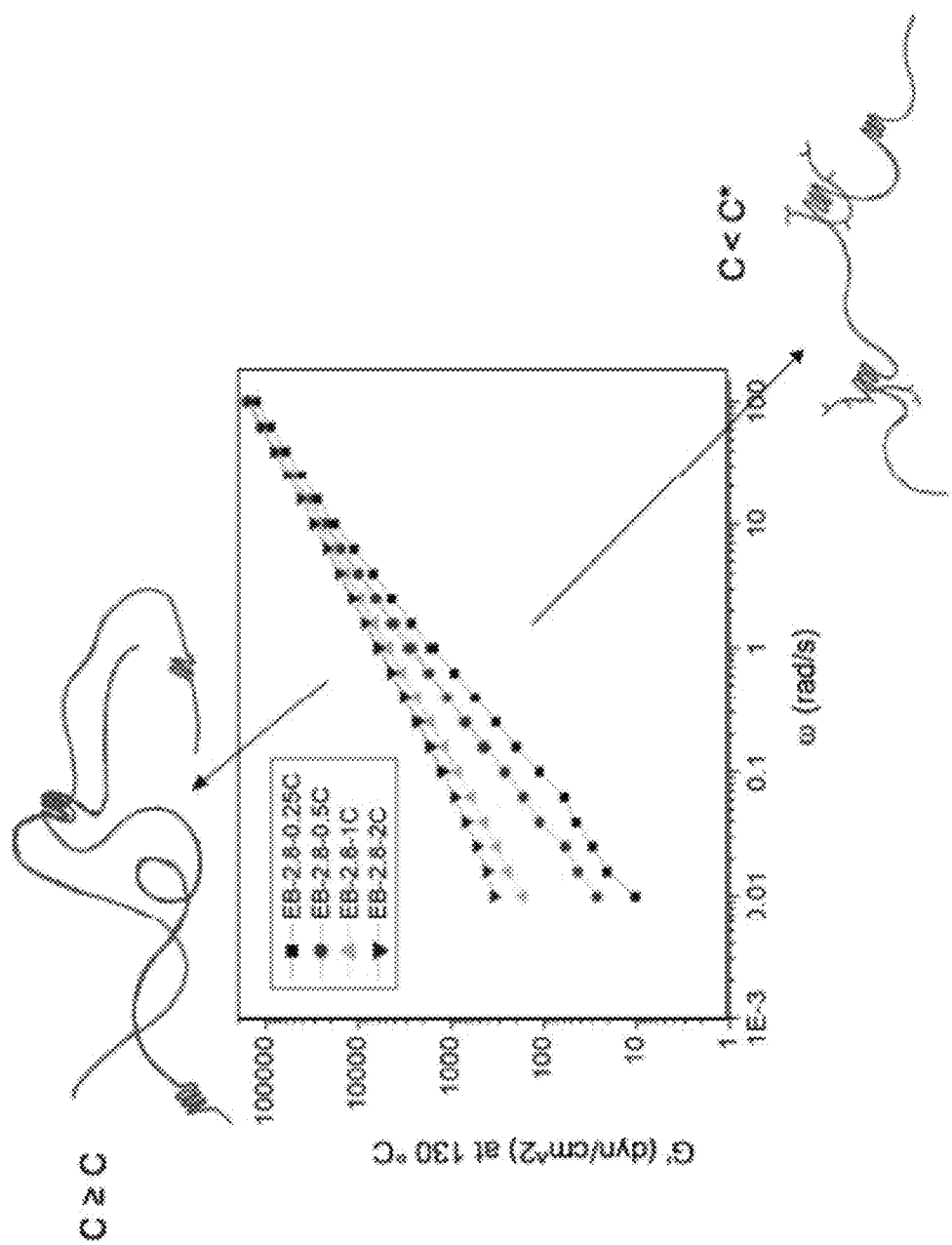
FIG. 23 shows a diagram illustrating a possible physical cross-linking among UHMW-PE chains in blends with the copolymer EB-2.8 at 130° C. At UHMW-PE concentrations lower than the overlap concentration the schematic indicates local crystallization of the UHMW-PE chains. At concentrations above the overlap concentration the schematic shows possible crystallization of UHMW-PE chains with each other.

FIGS. 13-16 also show that at the lowest temperature investigated (130° C.) the higher concentration blends (at C* and 2C*) exhibit a dramatic increase in G' which can be due to onset of crystallization of the UHMW-PE chains and their association with each other through physical cross-linking as shown in FIG. 23. In contrast, lower concentrations exhibit a linear increase in the modulus with respect to temperature, which can be attributed to the onset of local UHMW-PE crystallization. FIGS. 13-16 and 23 show that using a dispersion of UHMW-PE as herein described can be used to prepare polymer blends comprising UHMW-PE as the presence of long UHMW-PE chains are detectable even a low concentration.

FIGS. 19-22 show a frequency sweep for each blend at 160° C., 150° C., 140° C., and 130° C. which shows that at the lowest temperature investigated (130° C.) the higher concentration blends (at C* and 2C*) exhibit a dramatic increase in G' which can be due to onset of crystallization of the UHMW-PE chains and their association with each other through physical cross-linking as shown in FIG. 23. In contrast, the lower concentrations exhibit a linear increase in the modulus with respect to temperature, which can be attributed to the onset of local UHMW-PE crystallization.

DSC:

Heating and cooling ramps at 10° C./min show no appreciable difference in nominal melting and crystallization points and respective enthalpies of melting and crystallization between the four polymer blends. UHMW-PE does not appear to act as a nucleant at these conditions.

Example 11

Examples of Copolymers Suitable in Combination with UHMW-PE

An exemplary additive copolymer and an exemplary copolymer suitable for blending with a UHMW-PE herein described are listed in Table 3

TABLE 3

Examples of copolymers.

| Commercial name | Name convention | Catalyst type | $M_w$ [kg/mol] | PDI[2] | SCB/1000 backbone C | SCB[3] mol % | Density [g/cm$^3$] | MI[1] [g/10 min] |
|---|---|---|---|---|---|---|---|---|
| LL6100.17 | EB-2.8[4] | Ziegler-Natta | 56.4 | 3 | 14 | 2.8 | 0.925 | 20 |
| EXACT 3024 | EB-5[6] | Metallocene | 76.1 | 2 | 22 | 5 | 0.905 | 4 |

[1]MI = melt index,
[2]PDI = polydispersity index,
[3]SCB = short chain branching,
[4]EB-2.8 = poly (ethylene-co-butene), 2.8% SCB,
[5]EB-3.5 = poly (ethylene-co-butene), 3.5% SCB,
[6]EB-5 = poly (ethylene-co-butene), 5% SCB.

In particular, EB-5 is a copolymer suitable as an additive in polymerization reaction exemplified herein. EB-2.8 is a copolymer suitable for to be used in further processing of the UHMW-PE and in particular for blending.

Example 12

Controlling Structure and Chemical Properties of the Produced UHMW-PE

Scanning electron microscopy (SEM) provides high resolution imaging of a surface on a scale of micrometers. SEM can provide information about structural features, such as particle size and structural order or dispersion of a nascent polymer obtained by the disclosed method can be used to optimize the disclosed method toward desired structural features. For example, if the particles are smaller or larger than desired then the rate of polymerization can be adjusted. If the structures are not ordered or dispersed enough (or too much), the amount of additive can be adjusted. On the other hand, if no change in structural features is observed with increasing amounts of additive, this can indicate that the additive is not effectively co-crystallizing with the nascent polymer and that a different additive should be tested.

Linear viscoelastic measurements by rheometry can detect the presence of long chains and their association into slow-relaxing structures. Viscoelastic measurements of nascent polymer samples as well as nascent polymer blends can show the properties of the polymer sample or the polymer blend. Further, linear viscoelastic measurements can indicate a minimum or maximum amount of a polymer which would provide a particular property of interest.

Therefore, based on a desired property of a polymer or polymer blend, viscoelastic measurements can be used to indicate whether smaller or larger particle size (as indicated from SAXS, WAXD, and/or SEM imaging) gives a particular desired property and/or whether colloidal particles or finely dispersed particles (also indicated from SAXS, WAXD, and/or SEM imaging) give a particular desired property.

Depending on the properties that are desired and thus, what size and/or level of dispersion is desired (as indicated from rheometry experiments), WAXD, SAXS, and SEM imaging in combination with the information provided in FIG. 30, can allow one to control the desired properties of a polymer by way of the additive structure and concentration as well as rate of polymerization.

Example 13

Uses of Colloidal Suspension of UHMW Polymers

Applications of colloidal suspension obtainable with methods and systems herein described comprise compounding ultra-high molecular weight polymers comprise producing highly filled ultra-high molecular weight polymers; formulating coatings with ultra-high molecular weight polymer; producing polymer blends with ultra-high molecular weight polymer; Using ultra-high molecular weight polymer as an additive to tailor processing characteristics; Using UHMW Polymer particles to produce composites.

Possible further processing of ultra-high molecular weight polymers are illustrated according to the schematics of FIG. 31-34 as will be understood by a skilled person.

Example 14

Applications of UHMW-PE

UHMW-PE obtainable with the method exemplified in Examples 1 and 2 can be used in applications wherein use of UHMW-PE can be limited by the extremely high viscosity of the ethylene polymer in ultra-high molecular weight form in a melt or even in solution. For example, in certain application, the viscosity of UHMW-PE prepared with other certain methods of the art, can be too high for a desired injection molding and/or film blowing.

Certain reactors generally produce UHMWPE in the form of a powder having an average particle size diameter typically ranging from 100 to 200 microns. The particles are then sintered together using compression molding and ram extrusion processes that generate the high pressures needed to fuse UHMWPE particles together. In contrast to the highly efficient molding processes used for most plastics, UHMWPE is commercially available in stock shapes or profiles and subsequent machining is usually necessary. The large particle size of certain UHMWPE reactor powders and the high viscosity of UHMWPE melts present an obstacle to blending and compounding operations.

Therefore, UHMW-PE obtainable with the methods herein described are particularly useful in applications where processing difficulties associated with ultra-long polymers due to their very high viscosity are encountered in all known UHMW polymers. In particular, applications wherein use of UHMW-PE obtainable with methods herein described are the ones wherein control of the size of the particles of UHMW polymers created during the polymerization reaction is desired. For example suitable applications comprise applications wherein particle sizes in the range from about 0.1 to about 10 microns enable production of new materials, including UHMW polymer with colorant and/or filler incorporated in it, blends of UHMW polymer with a less expensive polymer to achieve desired balance of properties and cost, composites in which UHMW polymer is used as a reinforcing particle.

In summary, in several embodiments, ultra high molecular weight polymers and related compositions, methods and systems are described. In particular, in several embodiments, a method for controlling the physical state of an ultra-high molecular weight polymer is described to make the ultra-high molecular weight polymer suitable for further processing as well as related polymers compositions methods and systems. In particular, in several embodiments the method comprises combining a catalyst, monomers, and an additive, for a time and under condition to allow synthesis of a nascent polymer and co-crystallization of the nascent polymer with the additive.

The examples set forth above are provided to give those of ordinary skill in the art a complete disclosure and description of how to make and use the embodiments of the polymers, compositions, arrangements, devices, systems and methods of the disclosure, and are not intended to limit the scope of what the inventors regard as their disclosure. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

A number of embodiments of the disclosure have been described. Nevertheless, it will be understood that various modifications can be made without departing from the spirit and scope of the present disclosure. Accordingly, other embodiments are within the scope of the following claims.

REFERENCES

1. Saito, J.; Mitani, M.; Mohri, J.; Yoshida, Y.; Matsui, S.; Kojoh, S.; Kashiwa, N.; Fujita, T. Living polymerization of ethylene with a titanium complex containing two phenoxy-imine chelate ligands. *Angewanth Chemistry International Edition*, 2001, 40, 2918-2920
2. Rastogi, S.; Lippits, D. R.; Peters, G. W. M.; Graf, R.; Yao, Yefeng.; Spiess, H. W. Heterogeneity in polymer melts from melting of polymer crystals. *Nature Materials* 2005, 4, 635-641
3. Rastogi, S.; Kurelec, Lada.; Cuijpers, J.; Lippits, D.; Wimmer, M.; Lemstra, P. Disentangled State in Polymer Melts; a Route to Ultimate Physical and Mechanical Properties. *Macromol. Mater. Eng.* 2003, 288, 964-970
4. Rastogi, S.; Lippits, D. R.; Hohne, G. W. H.; Mezari, B.; Magusin, P. C. M. M. The role of the amorphous phase in melting of linear UHMW-PE; implication for chain dynamics *J. Phys.: Condens. Matter* 2007, 19, 205122-205131

The invention claimed is:

1. A method to synthesize an ultra-high molecular weight polymer, the method comprising:
combining an ethylene monomer, an additive, and a catalyst suitable for polymerization of monomers with a solvent in a mixture comprising a liquid phase,
wherein
the additive is a colloidal stabilizer capable of a crystal forming interaction with a nascent polymer comprising the monomer, the colloidal stabilizer comprising a solvophilic portion soluble in the solvent and a crystalphilic portion capable of interacting with the polymer to form a co-crystal comprising the polymer and the crystalphilic portion;
the additive being chemically inert with respect to the catalyst, the monomers, the nascent polymer and the ultra-high molecular weight polymer; and
the combining is performed in the liquid phase for a time and under conditions to allow synthesis of the nascent polymer, and co-crystallization of the nascent polymer with the additive thereby resulting in a colloidal suspension of the ultra-high molecular weight polymer comprising detectable crystals.

2. The method of claim 1 further comprising separating the solvent from the colloidal suspension and collecting the ultra-high molecular weight polymer at a desired concentration.

3. The method of claim 2 wherein the separating is performed by filtering the colloidal suspension and collecting a solid filtrate, the solid filtrate comprising the polymer.

4. The method of claim 1, wherein the additive is a compound of formula

-[(crystal forming moiety)$n_x$-(colloid stabilizing moiety)$n_s$]$_M$;

where $n_x \geq$, $n_s \geq$, $M \geq 1$, in any statistical distribution.

5. The method of claim 1, wherein the additive is a compound of formula

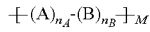

wherein A is a solvophilic block; B is a crystalphilic block and M is any positive integer.

6. The method of claim 5, wherein A is a moiety of formula

A = 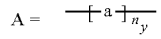

wherein a is a monomer repeating units of A, where $n_y$ is any positive integer.

7. The method of claim 6, wherein a is a compound produced by polymerizing a compound a' of formulas

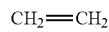

-continued

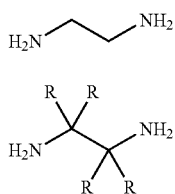 and  6

7

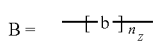

wherein R is independently selected from the group consisting of $C_0$ to $C_{10}$ branched or unbranched alkyl, phenyl, aryl, alkoxy, thiol, thioether, amino, and alkylamino groups.

8. The method of claim 5, wherein B is a moiety of formula $$B = \;\;\text{—}\!\!\left(\!\text{b}\!\right)_{\!\!n_z}\!\text{—}$$

wherein b is a monomer repeating unit of B, where $n_z$ is any positive integer.

9. The method of claim 8, wherein b is a compound produced by polymerizing a compound b' of formulas

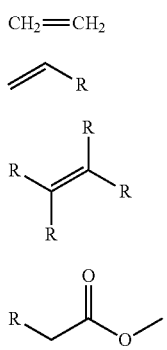

1

2

3

4

-continued

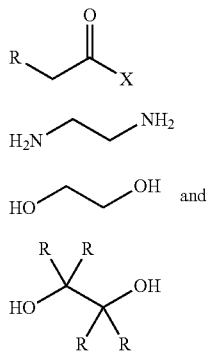

5

6

8

9 wherein R is independently selected from the group consisting of $C_0$ to $C_{10}$ branched or unbranched alkyl, phenyl, aryl, alkoxy, thiol, thioether, amino, and alkylamino groups.

10. The method of claim 5, wherein the additive is selected from the group consisting of: block copolymer, graft copolymer, statistical copolymer and gradient copolymer.

11. The method of claim 1, wherein the additive is comprised in the mixture at a concentration of about 1% by weight or less with respect to the solvent.

12. The method of claim 1, wherein the catalyst is a group 4 metal phenoxyimine complex.

13. The method of claim 1, wherein the additive is a copolymer comprising ethylene and an alpha olefin containing 8 or fewer carbons.

14. The method of claim 13, wherein the additive is an ethylene-co-butene copolymer.

15. The method of claim 1, wherein the additive is a copolymer comprising ethylene and a polar comonomer such as methyl acrylate.

16. The method of claim 1, wherein the additive is a copolymer of ethylene and a higher alpha olefin.

17. The method of claim 1, wherein the co-crystallization of the additive and the nascent polymer spontaneously forms a colloidal stabilizing layer that delays aggregation or precipitation for a set amount of time.

\* \* \* \* \*